United States Patent [19]

Koza et al.

[11] Patent Number: 5,343,554
[45] Date of Patent: Aug. 30, 1994

[54] NON-LINEAR GENETIC PROCESS FOR DATA ENCODING AND FOR SOLVING PROBLEMS USING AUTOMATICALLY DEFINED FUNCTIONS

[75] Inventors: John R. Koza, 25372 La Rena La., Los Altos, Calif. 94022; James P. Rice, Redwood City, Calif.

[73] Assignee: John R. Koza, Los Altos, Calif.

[21] Appl. No.: 881,507

[22] Filed: May 11, 1992

Related U.S. Application Data

[63] Continuation-in-part of Ser. No. 787,748, Nov. 5, 1991, which is a continuation of Ser. No. 500,791, Mar. 28, 1990, abandoned, which is a continuation-in-part of Ser. No. 196,973, May 20, 1988, Pat. No. 4,935,877.

[51] Int. Cl.$^5$ .............................................. G06F 15/00
[52] U.S. Cl. ..................................................... 395/13
[58] Field of Search .......................................... 395/13

[56] References Cited

U.S. PATENT DOCUMENTS 4,697,242  9/1987  Holland et al. ...................... 395/13

OTHER PUBLICATIONS

Towards the Evolution of Symbols; Proc. of the 2nd Int. Conf. on Genetic Algorithms; Dolan et al.; Jul. 28-31, 1987; pp. 123-131.
Symbolic Schemata in Connectionist Memories: Role Binding and the Evolution of Structure; UCLA-Al-8-7-11; Dolan et al.; pp. 1-23.
Cognitive Systems Based on Adaptive Algorithms; Cognitive Systems; Holland et al.; 1978; pp. 313-329.
On Using Genetic Algorithms to Search Program Spaces; Proc. of the 2nd Int. Conf. on Genetic Algorithms; De Jong; Jul. 28-31, 1987; pp. 210-216.
Tree Structured Rules in Genetic Algorithms; Proc. of the 2nd Int. Conf. on Genetic Algorithms; Bickel et al.; Jul. 28-31, 1987; pp. 77-81.
An Adaptive Crossover Distribution Mechanism for Genetic Algorithms; Proc. of the 2nd Int. Conf. on Genetic Algorithms; Schaffer et al.; Jul. 28-31, 1987; pp. 36-40.

(List continued on next page.)

Primary Examiner—Allen R. MacDonald
Attorney, Agent, or Firm—Blakely, Sokoloff, Taylor & Zafman

[57] ABSTRACT

An apparatus and method for solving problems using automatic function definitions, for solving problems using recursion and for performing data encoding. The present invention includes an apparatus and process for creating a population and then evolving that population to generate a result. When solving problems using automatic function definition, the apparatus and process initially creates a population of entities. Each of said entities has sub-entities of internally and externally invoked sub-entities. The externally invoked sub-entities are capable of having actions, invocations of sub-entities which are invoked internally, and material. Also, each sub-entity which is invoked internally is capable of including actions, invocations of internally invocable sub-entities, material provided to the externally invocable sub-entity, and material. The population is then evolved to generate a solution to the problem. When using the process to solve problems using recursion, the entities in the population are constructed in such a manner as explicitly to represent the termination predicate, the base case and the non-base case of the recursion. Each entity has access to a name denoting that entity so as allow recursive references. The population is then evolved to generate a solution to the problem. When encoding a set of data values into a procedure capable of approximating those data values, the apparatus and process initially creates a population of entities. The population is then evolved to generate a solution to the problem.

61 Claims, 25 Drawing Sheets

OTHER PUBLICATIONS

The Argot Strategy: Adaptive Representation Genetic Optimizer Technique; Proc. of the 2nd Int. Conf. on Genetic Algorithms; Sheafer; Jul. 28–31, 1987; pp. 50–58.

Using the Genetic Algorithm to Generate LISP Source Code to Solve the Prisoner's Dilemma; Proc. of the 2nd Int. Conf. on Genetic Algorithms; Fujiki et al.; Jul. 28–31, 1987; pp. 236–240.

A Darwinian Approach to Artificial Neural Systems; Proc. of Systems, Man, and Cybernetics Conference; Knisley; 1987; pp. 572–577.

Sims, Karl, "Artificial Evolution for Computer Graphics", *Computer Graphics*, vol. 25, No. 4, pp. 319–328, Jul. 1991.

Storer, James A. and Cohn, Martin, "The Use of Factual Theory in a Video Compression System", *Data Compression Conference DCC '92*, pp. 259–268, 1992.

FIG_1
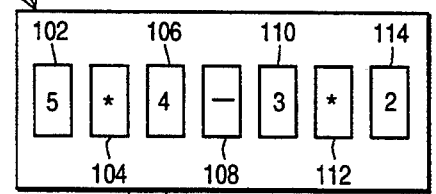
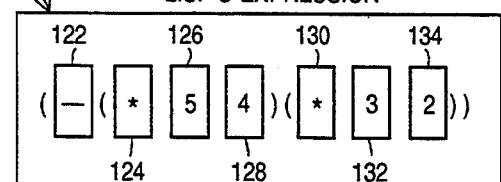
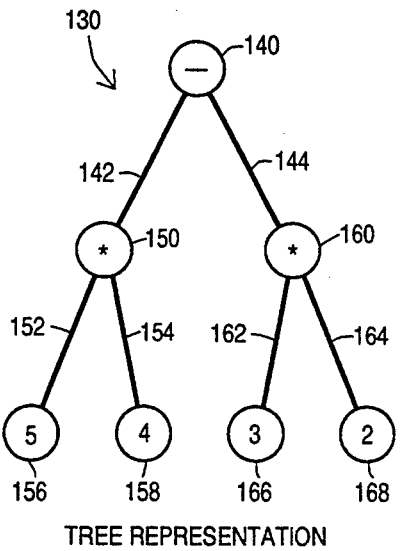
TREE REPRESENTATION
FIG_10
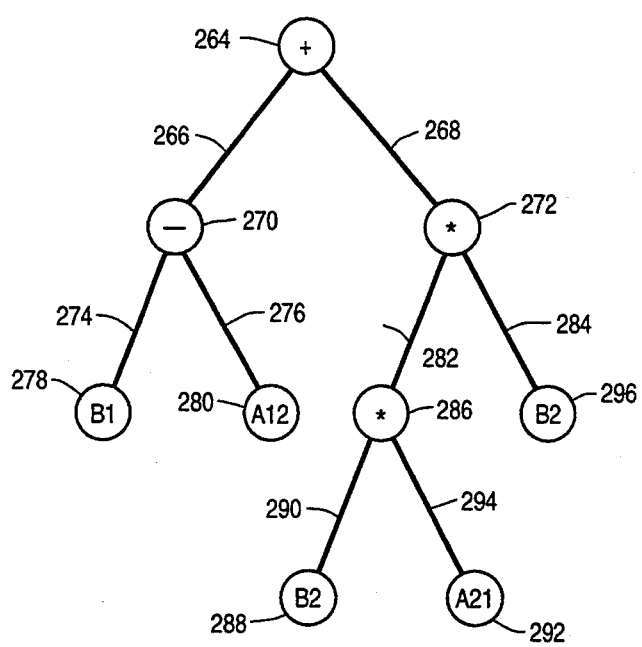

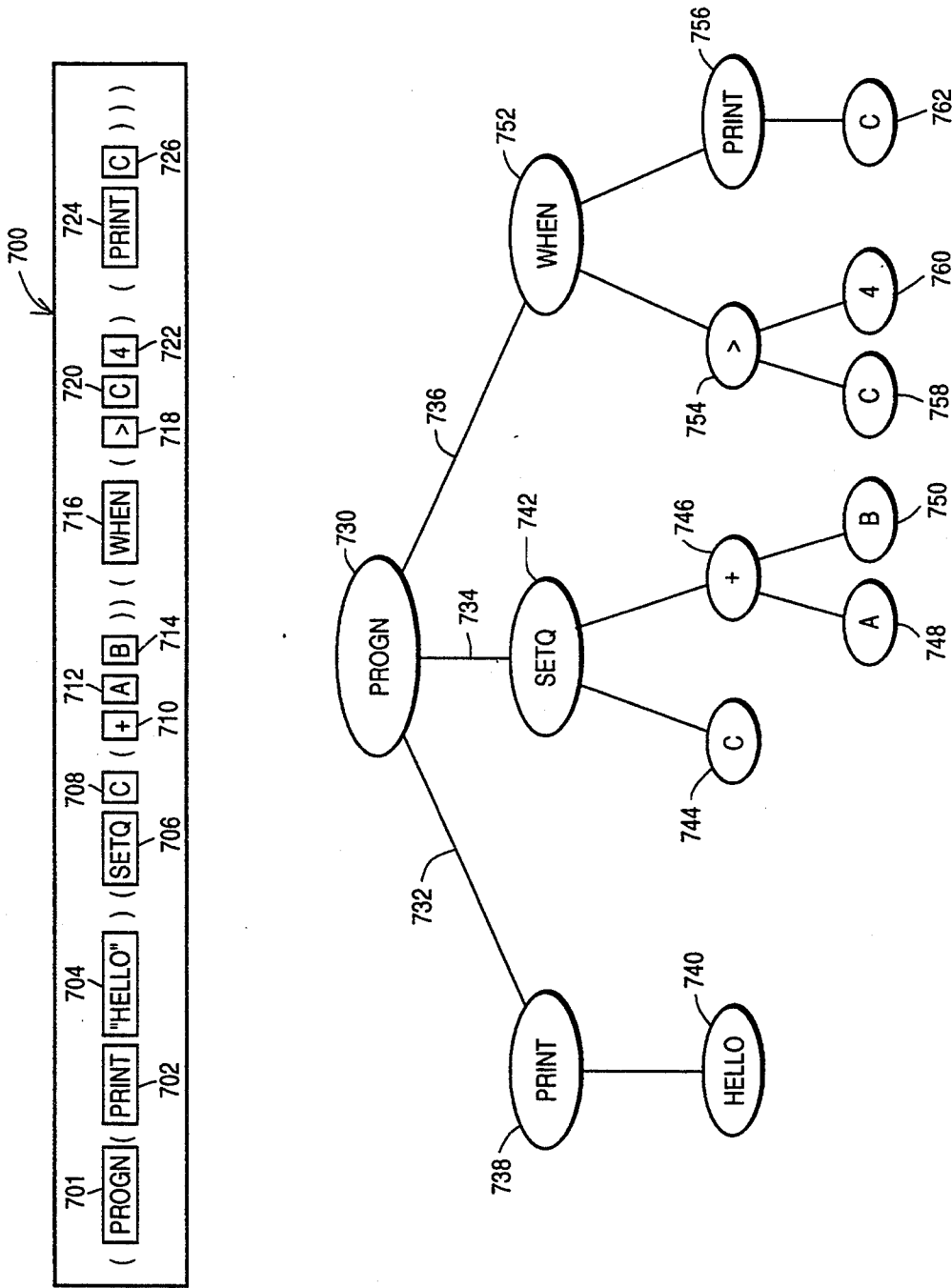
FIG_2

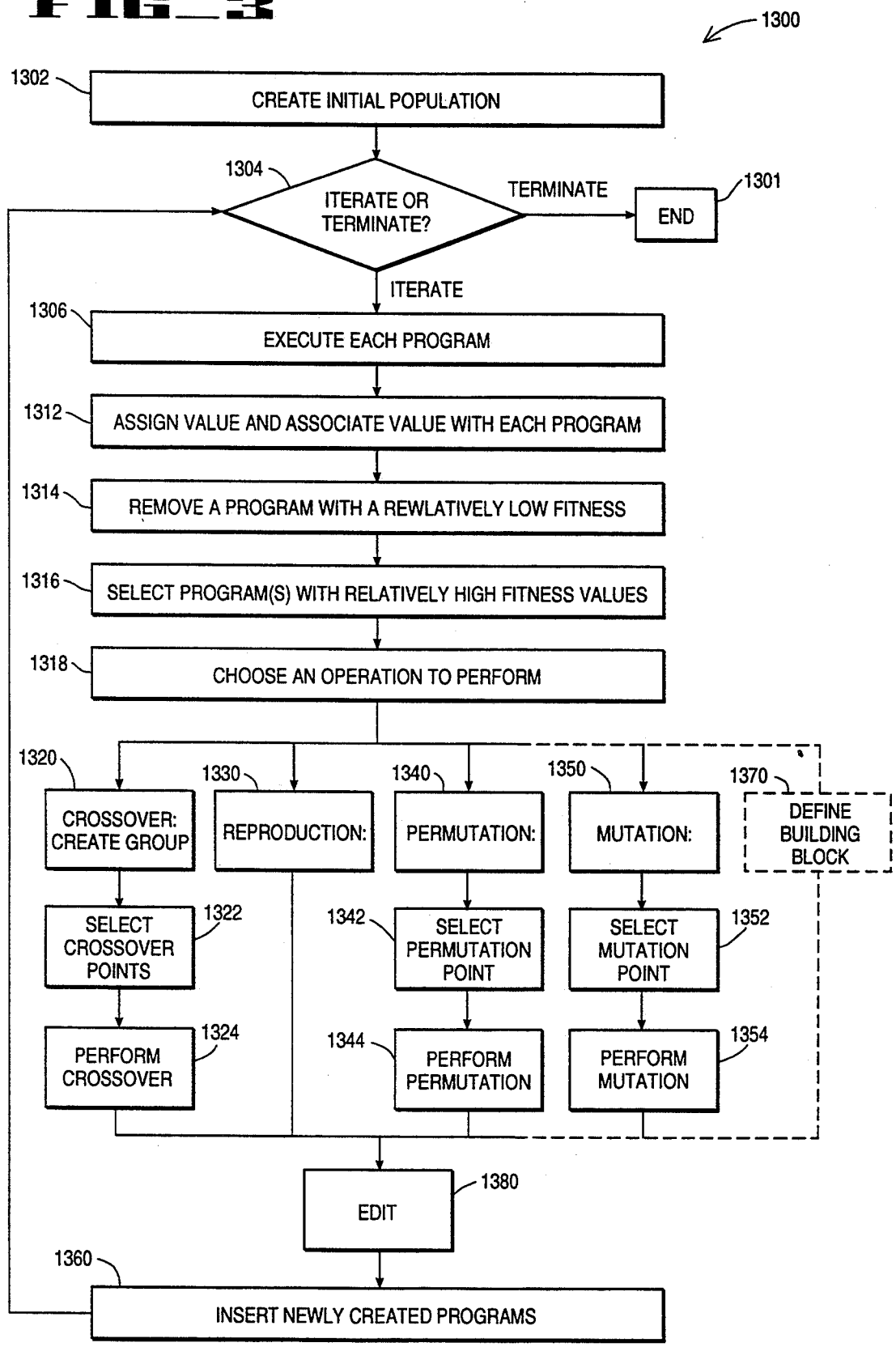

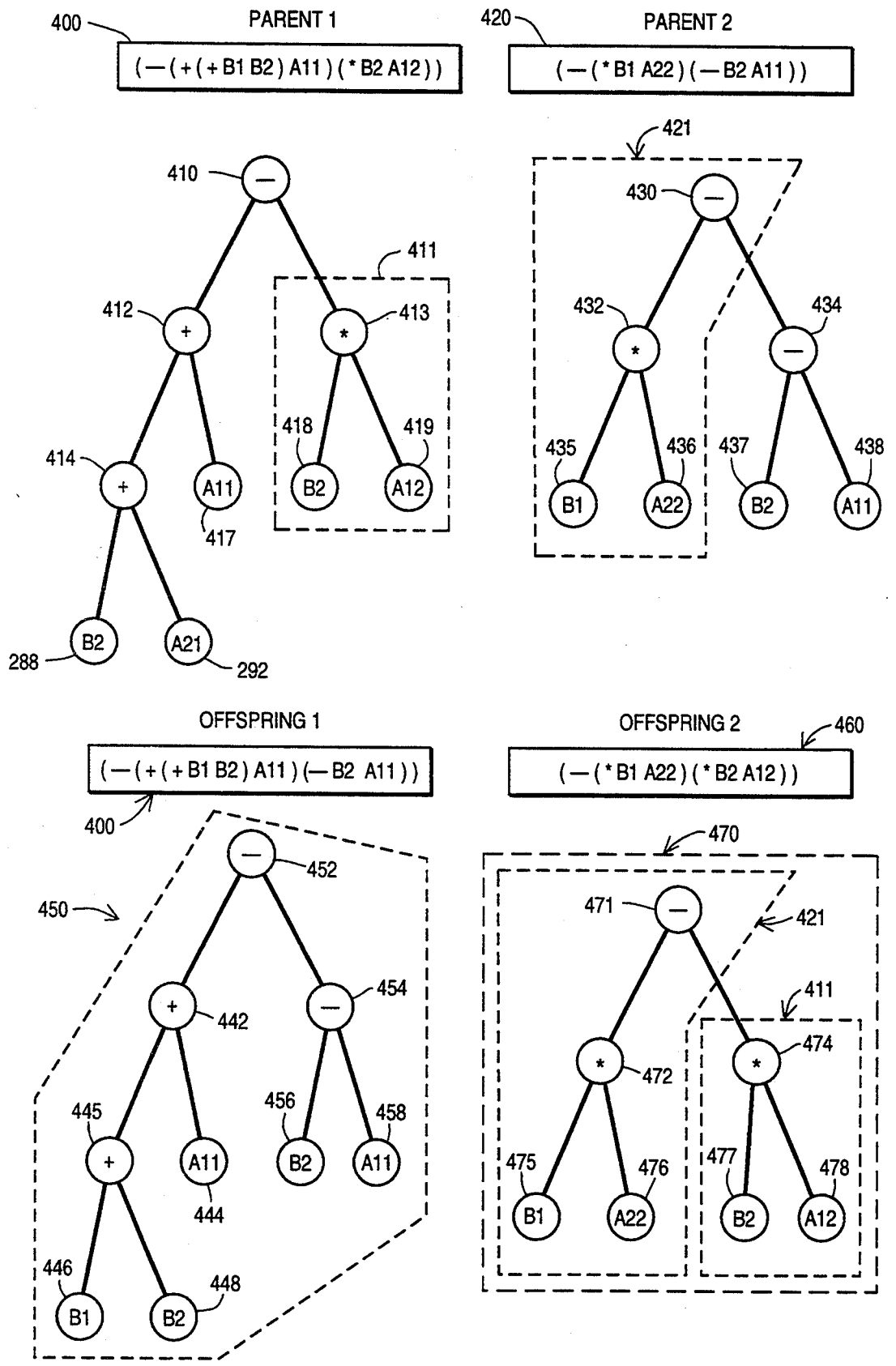
FIG_4

FIG_5
500 — PARENT 1
$(-(*A11\ A12\ A21)\ B1)$
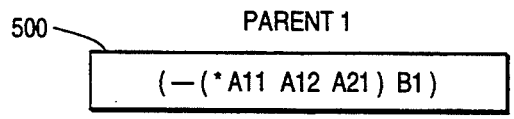
520 — PARENT 2
$(-\ A22\ B2)$
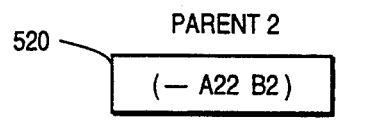
540 — OFFSPRING 1
$(-(*A11\ A12\ A21)\ B2)$
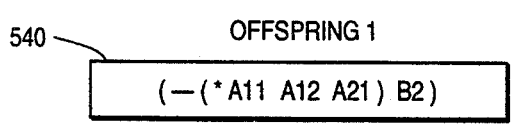
560 — OFFSPRING 2
$(-\ A22\ B1)$
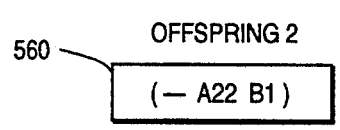

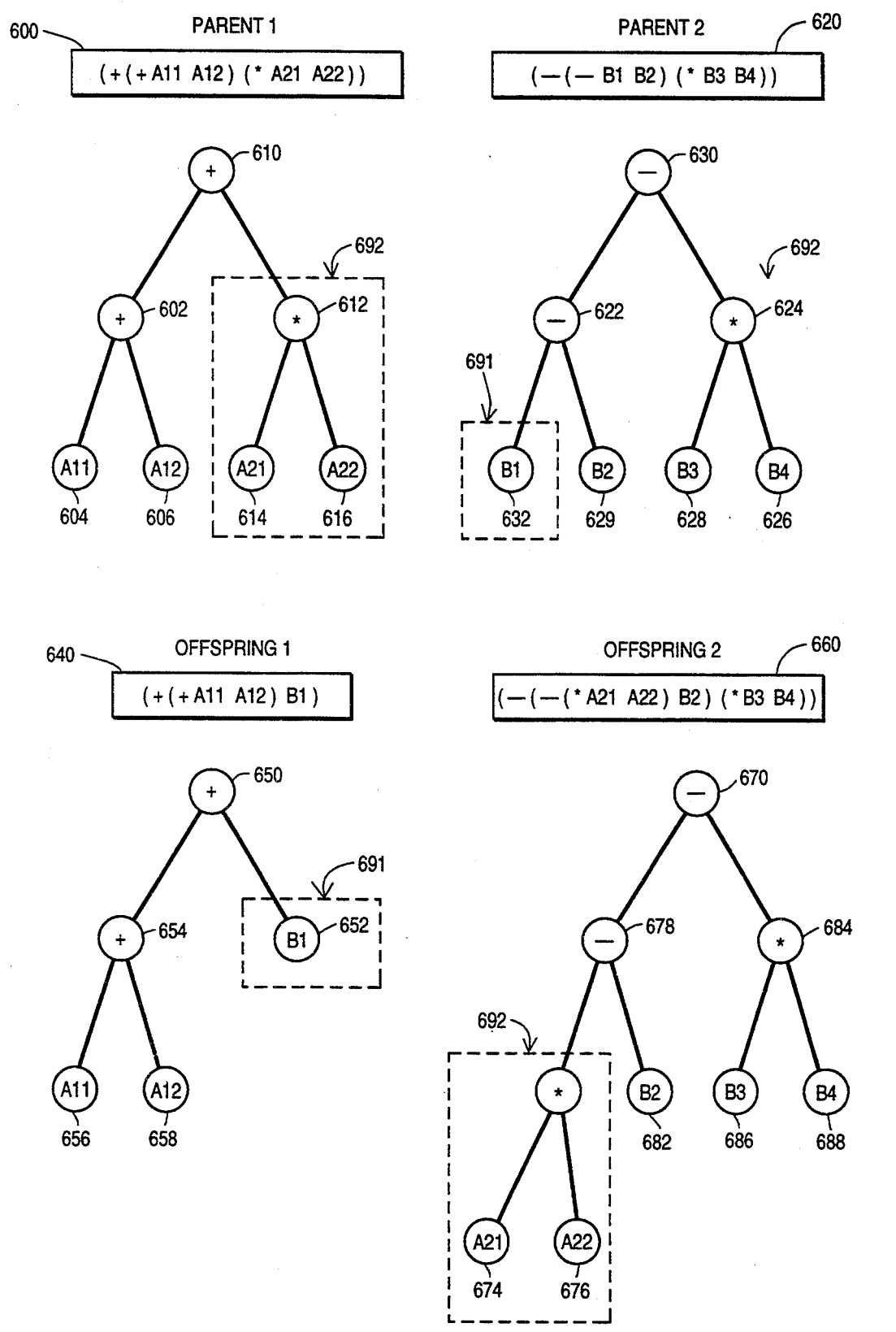

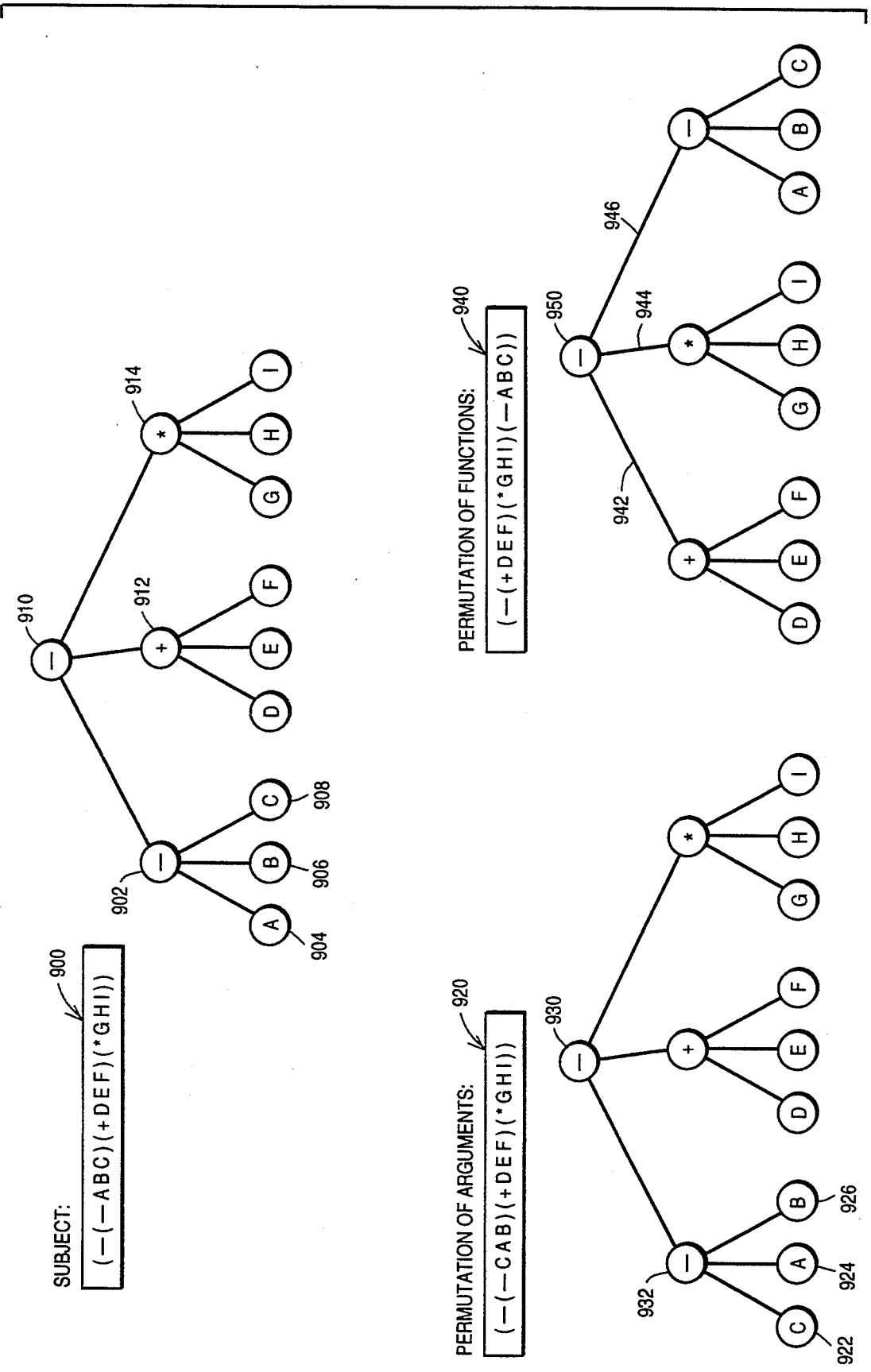

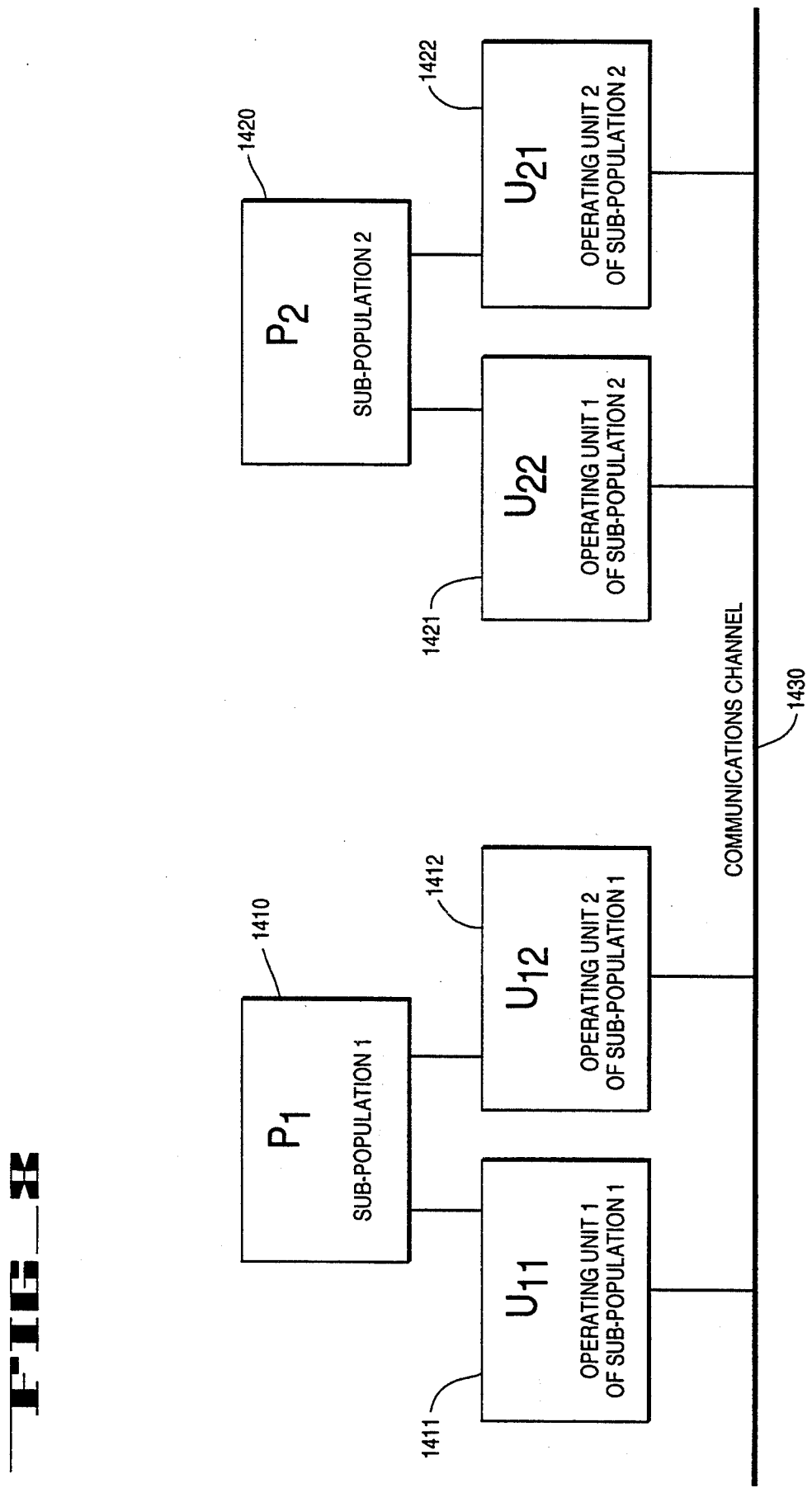

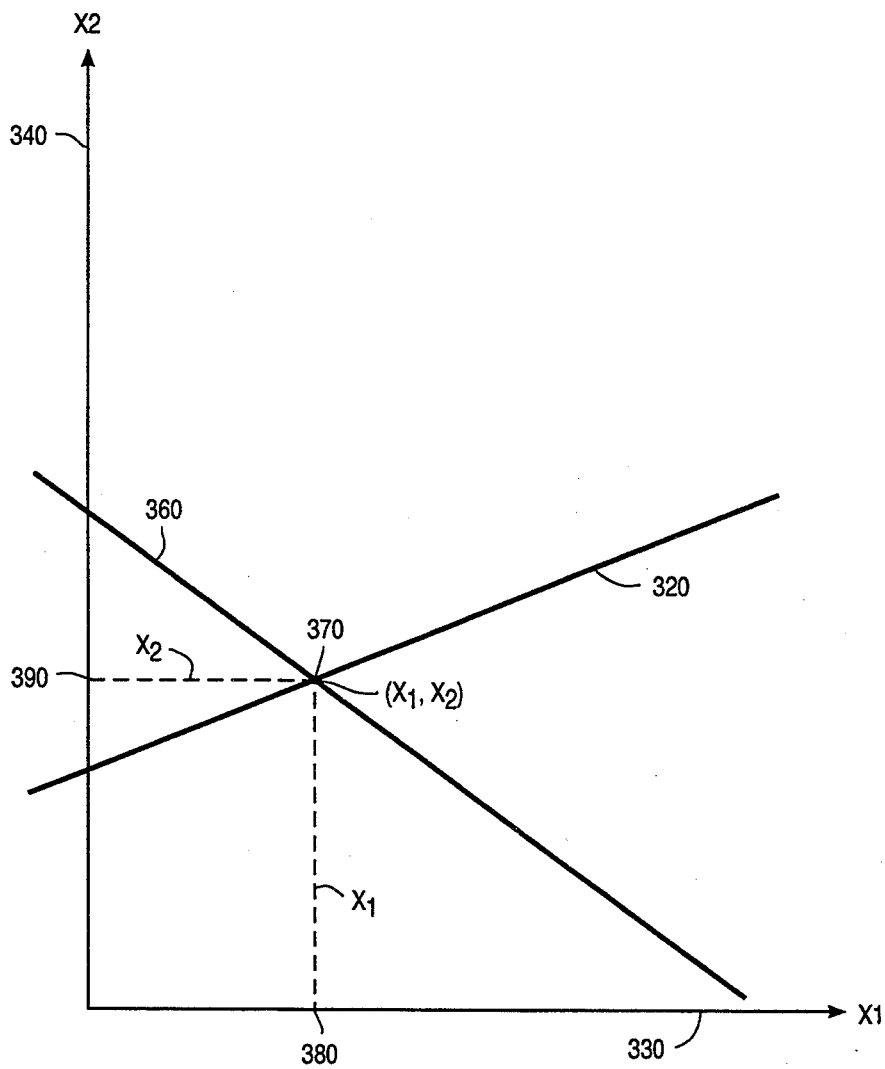
FIG_9

FIG_11
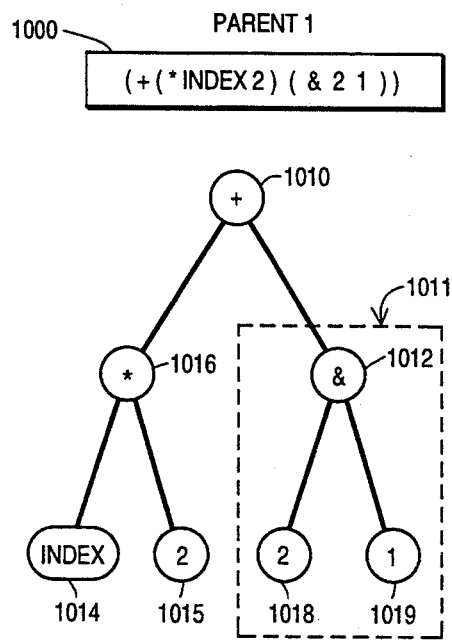
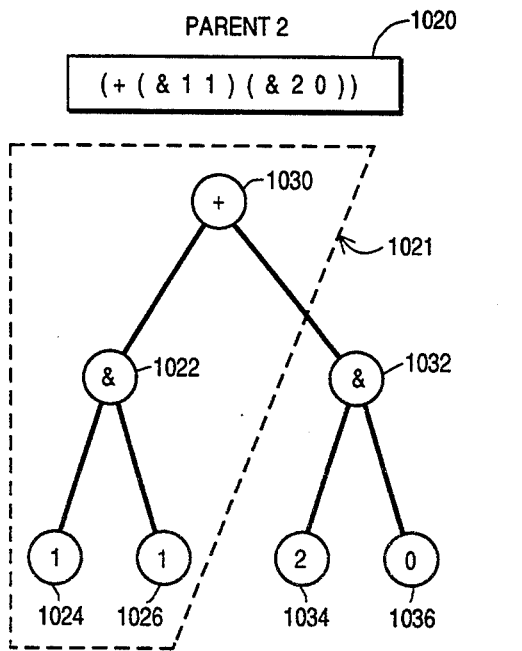
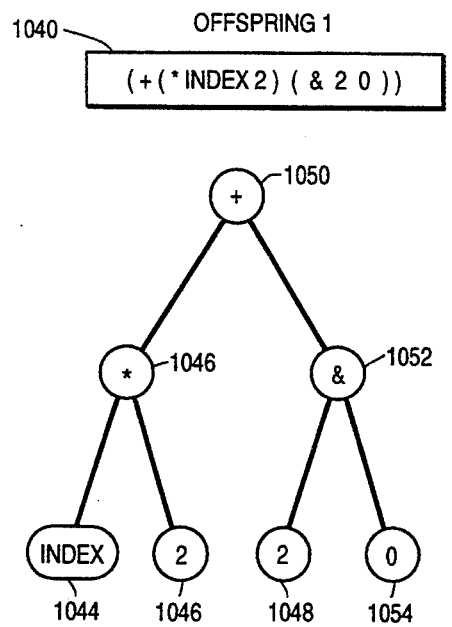
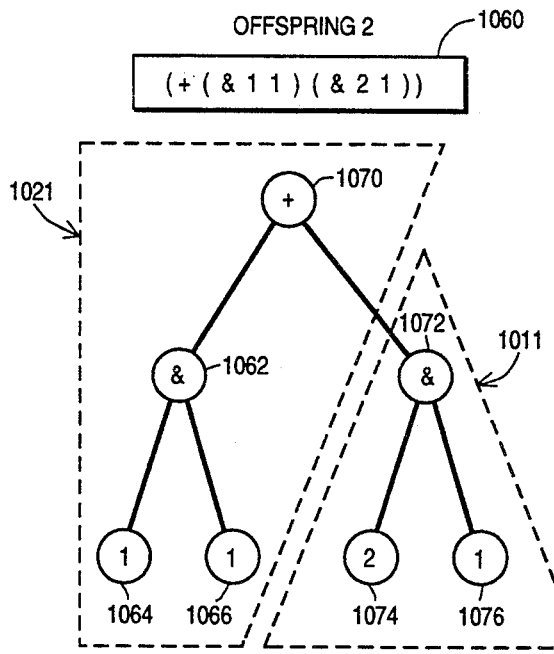

FIG_12
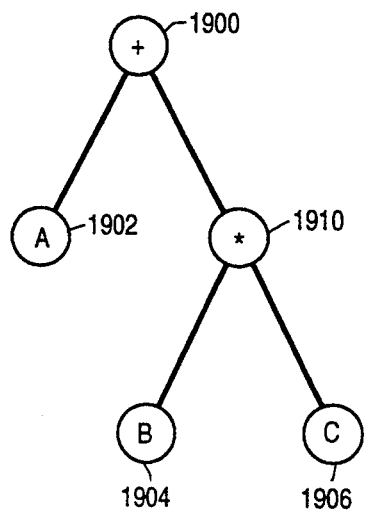
FIG_13
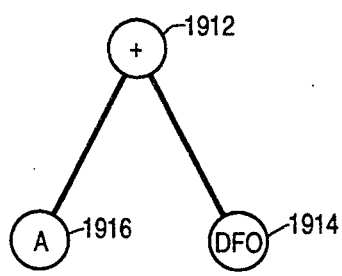
FIG_14
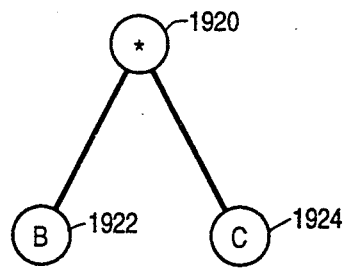
FIG_15   ENTITY 1501
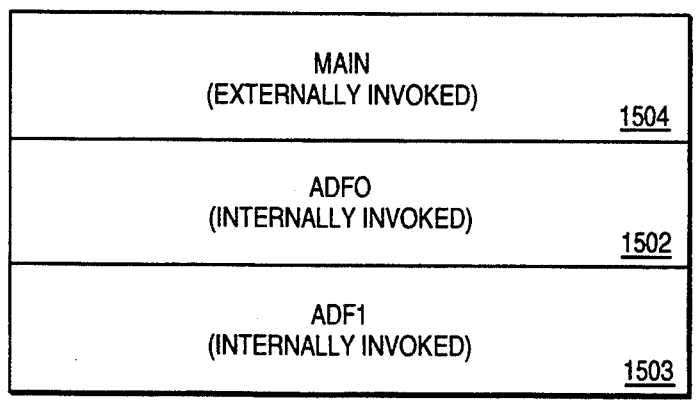

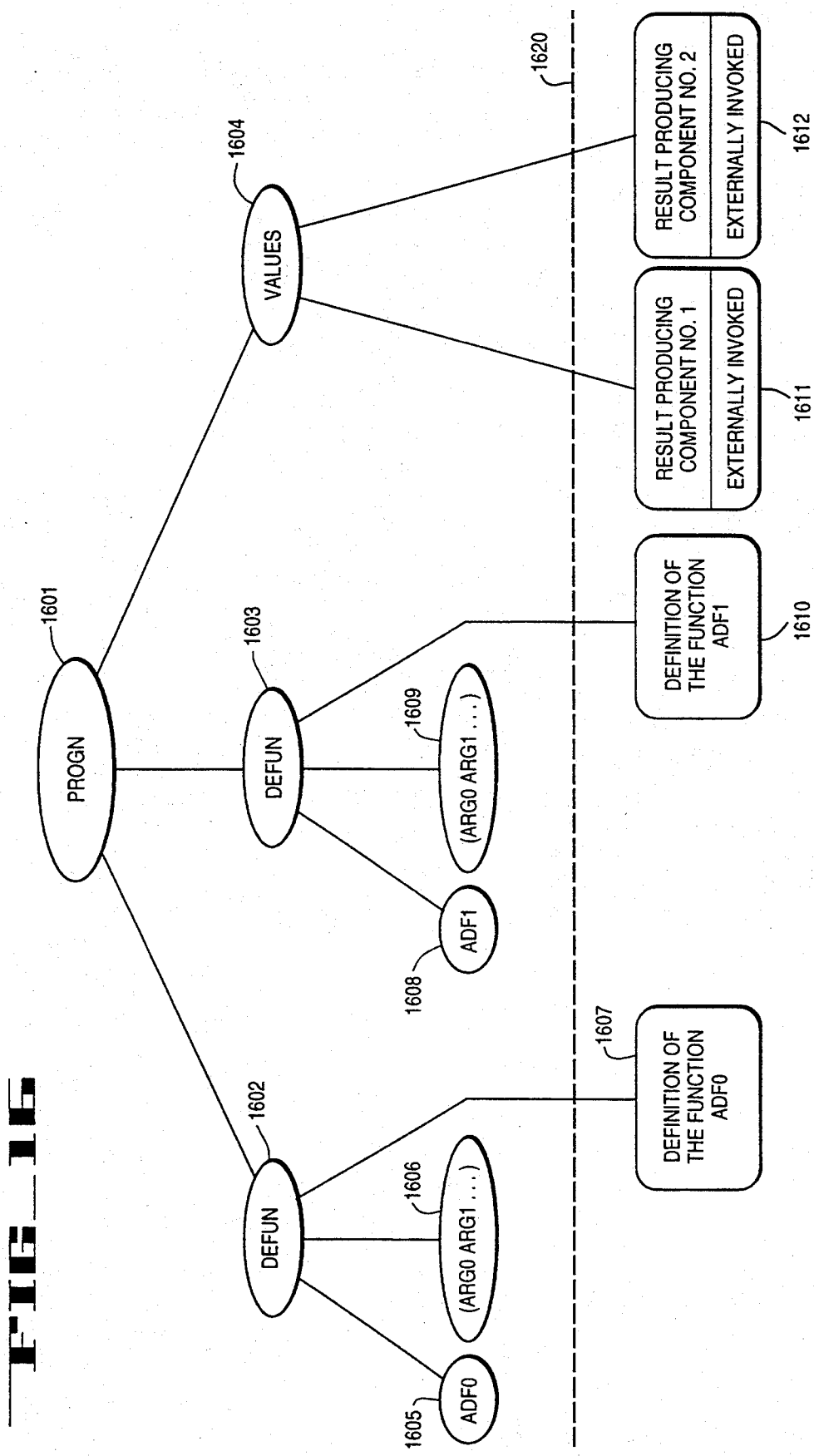
FIG_16

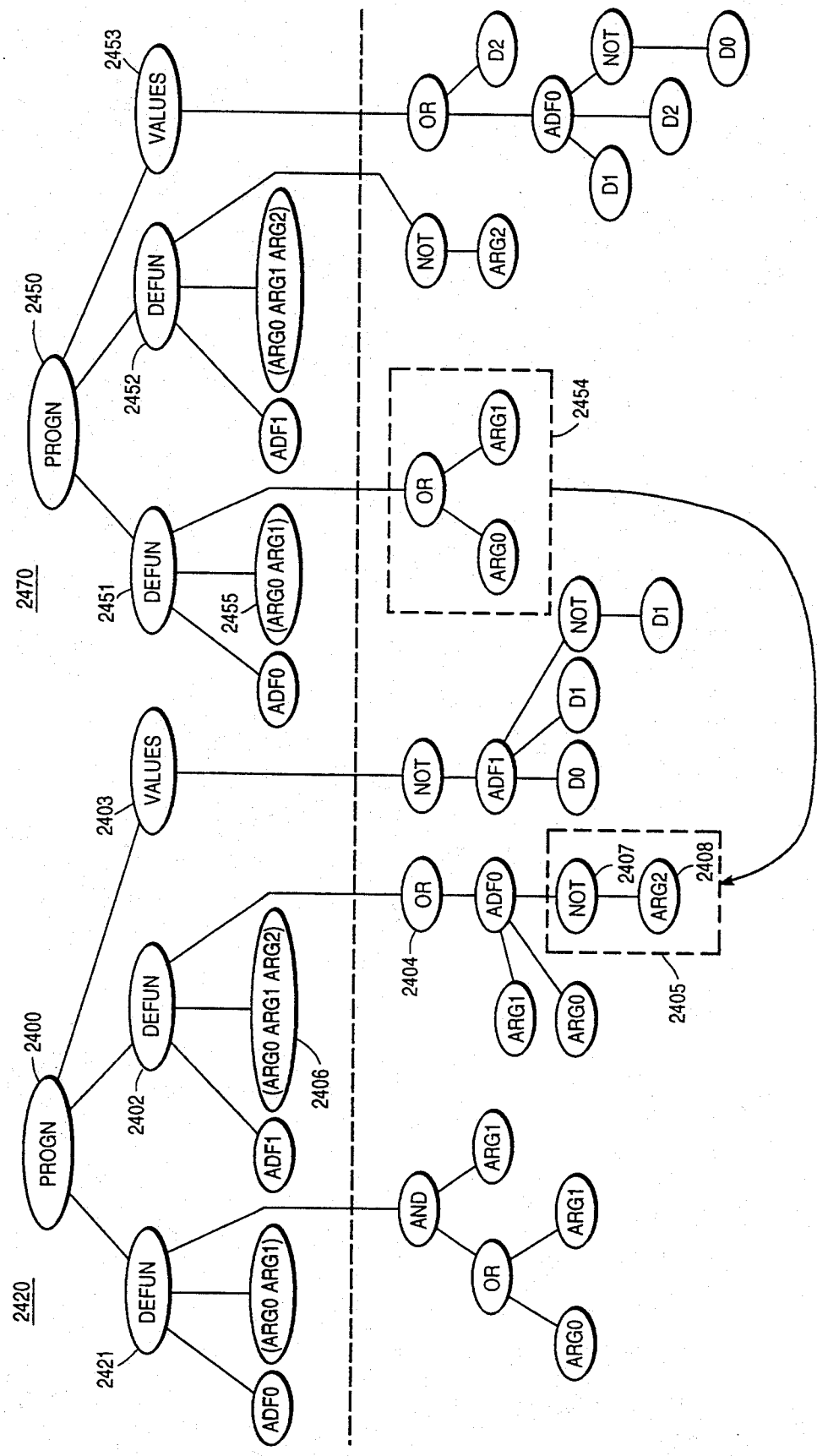
FIG_17

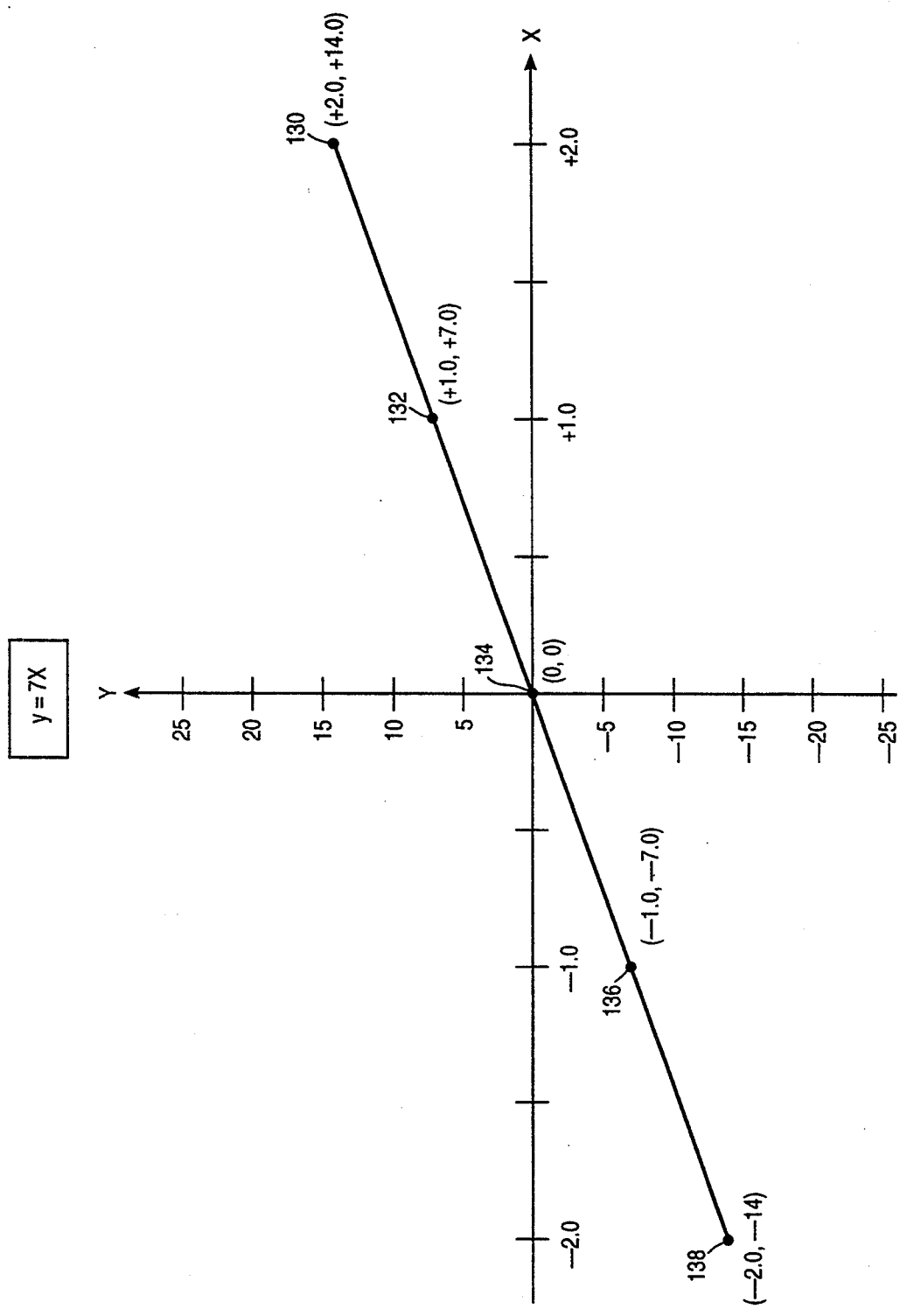

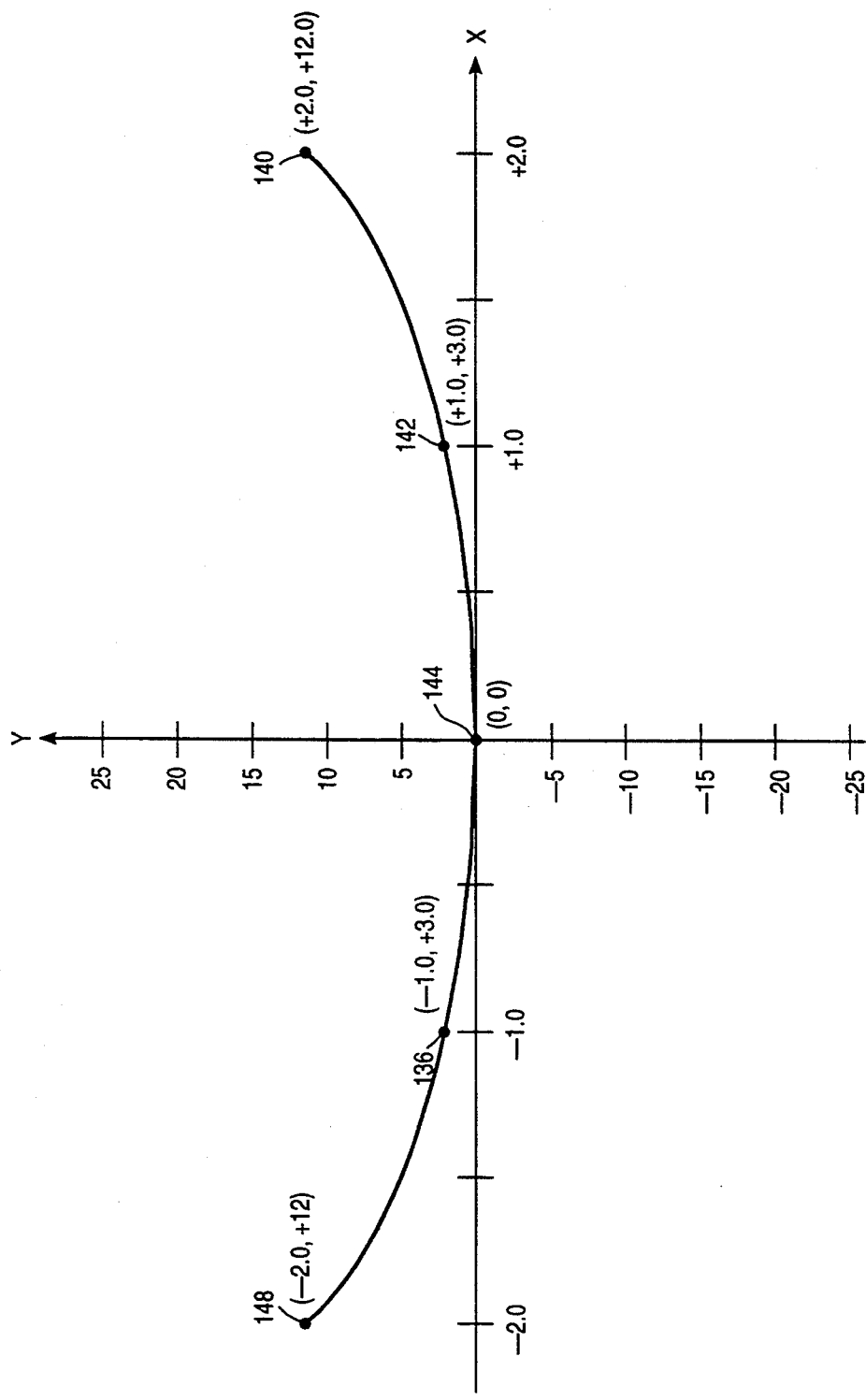
FIG_21

FIG_22
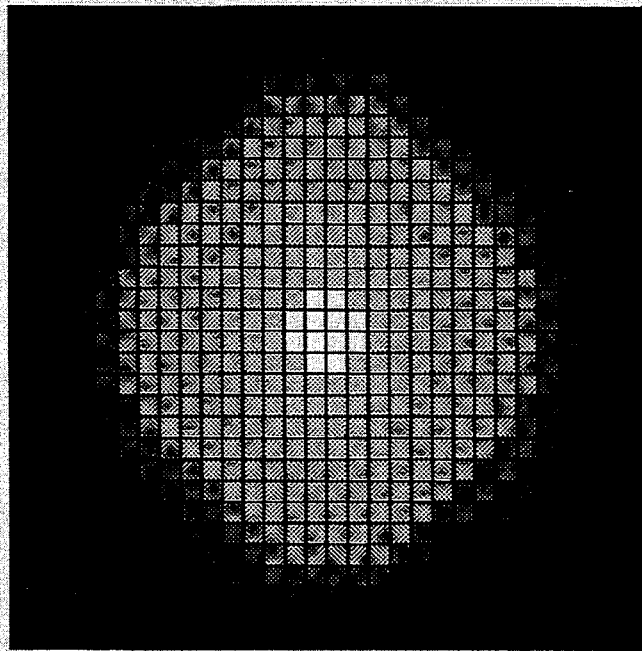
FIG_23
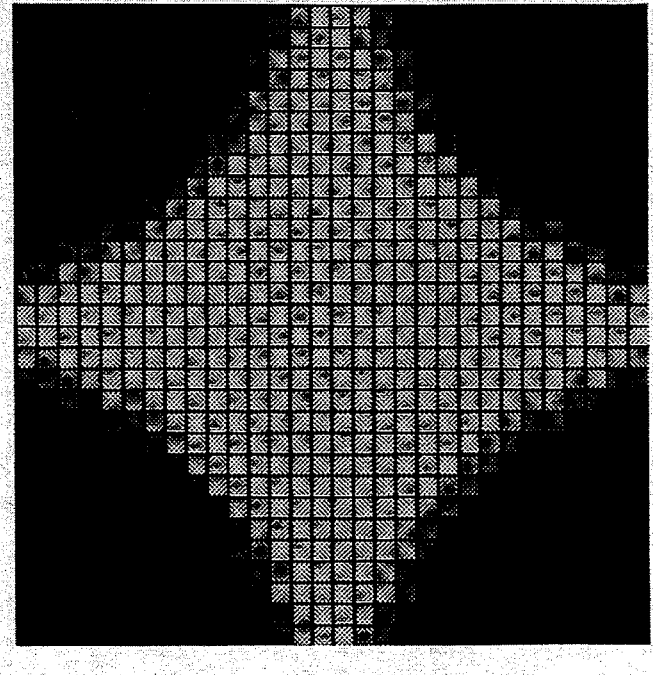

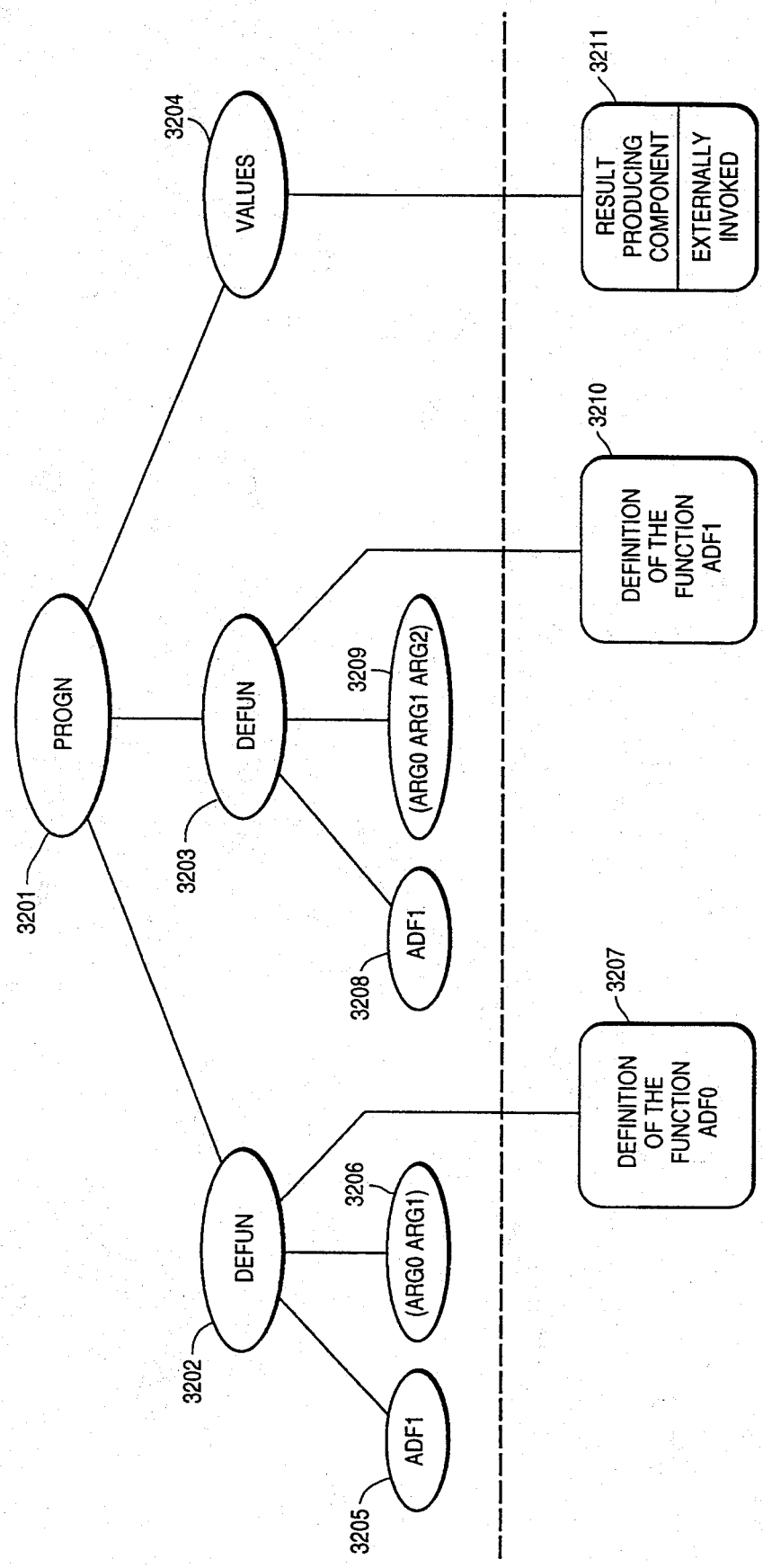

FIG_26

FIG_29
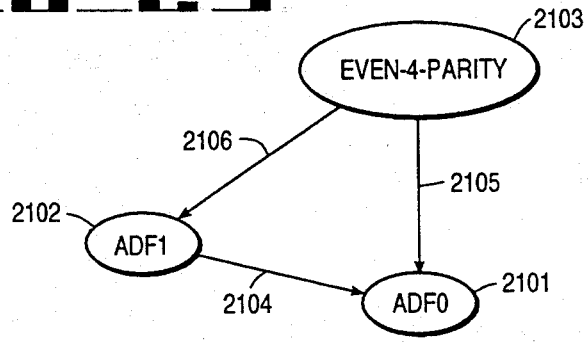
FIG_30
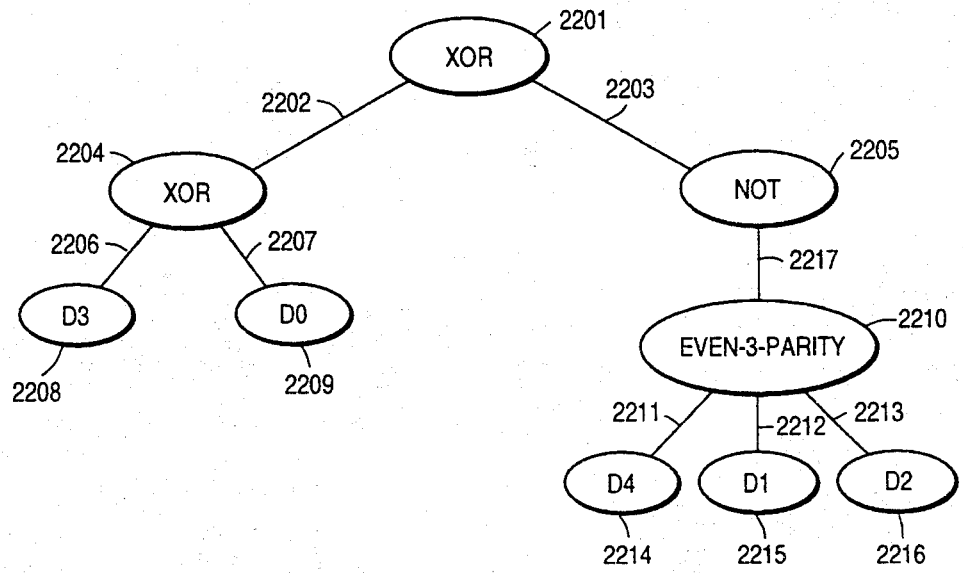
FIG_31
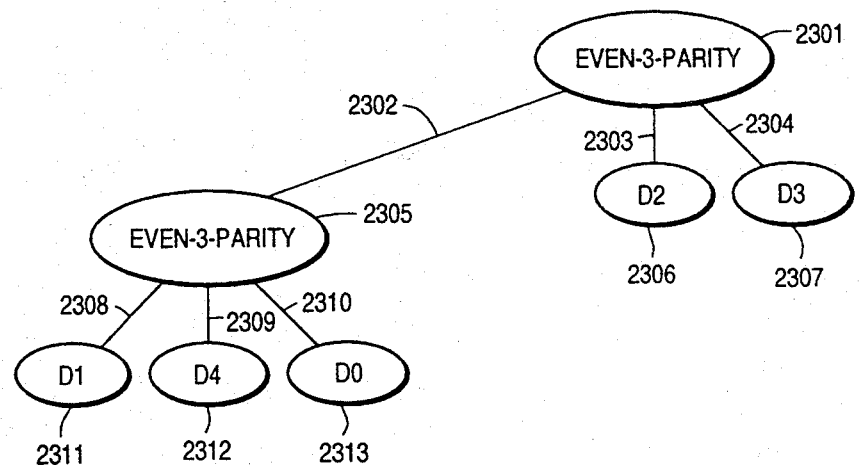

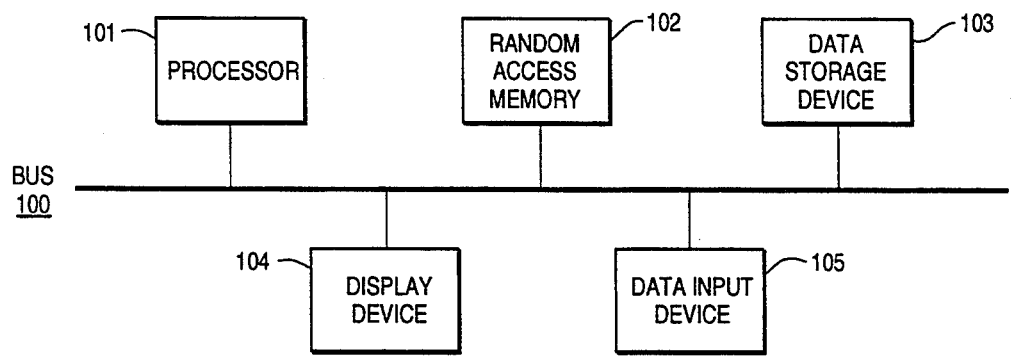
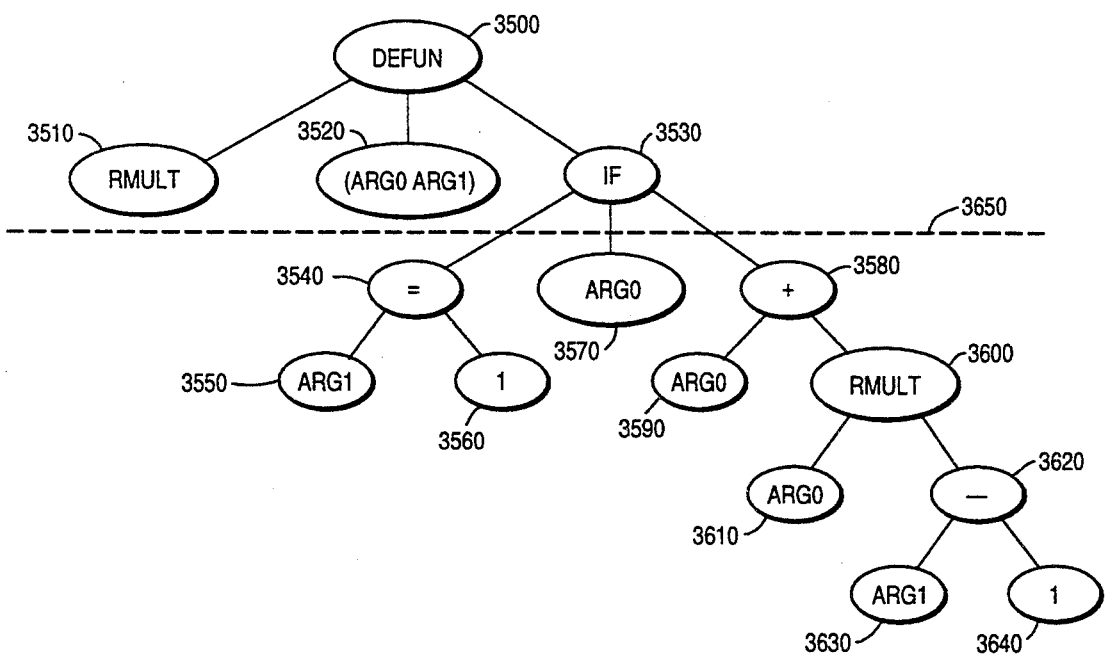
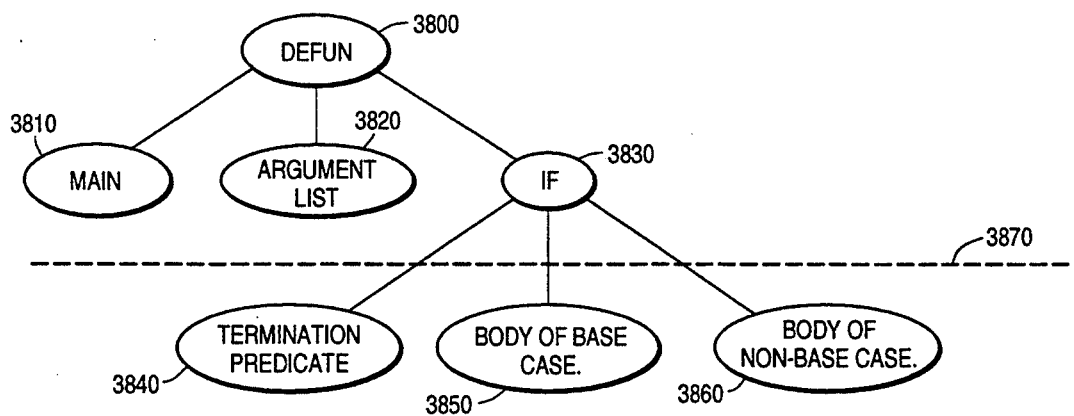

NON-LINEAR GENETIC PROCESS FOR DATA ENCODING AND FOR SOLVING PROBLEMS USING AUTOMATICALLY DEFINED FUNCTIONS

This application is a continuation-in-part of co-pending U.S. patent application Ser. No. 07/787,748, filed Nov. 5, 1991, which is a continuation of U.S. patent application (continuation-in-part) Ser. No. 07/500,791, filed Mar. 28, 1990now abandoned, titled Non-linear Genetic Algorithms for Solving Problems by Finding a Fit Composition of Functions, which is a continuation-in-part of Ser. No. 07/196,973, filed May 20, 1988, now U.S Pat. No. 4,935,877, issued Jun. 19, 1990, titled Non-linear Genetic Algorithms for Solving Problems.

BACKGROUND OF THE INVENTION

1. The Field of the Invention

The field of the invention is computer-implemented genetic algorithms. More specifically, the field is genetic algorithms useful for problem solving. The field spans the range of problems wherein a fit composition of functions may be found as a solution to the problem.

2. The Prior Art

The Natural Selection Process in Nature

The natural selection process provides a powerful tool for problem solving. This is shown by nature and its various examples of biological entities that survive and evolve in various environments. In nature, complex combinations of traits give particular biological populations the ability to adapt, survive, and reproduce in their environments. Equally impressive is the complex, relatively rapid, and robust adaptation and relatively good interim performance that occurs amongst a population of individuals in nature in response to changes in the environment. Nature's methods for adapting biological populations to their environment and nature's method of adapting these populations to successive changes in their environments (including survival and reproduction of the fittest) provides a useful model. This model can be used to develop methods to solve a wide variety of complex problems which are generally thought to require "intelligence" to solve.

In nature, a gene is the basic functional unit by which hereditary information is passed from parents to offspring. Genes appear at particular places (called gene "loci") along molecules of deoxyribonucleic acid (DNA). DNA is a long thread-like biological molecule that has the ability to carry hereditary information and the ability to serve as a model for the production of replicas of itself. All known life forms on this planet (including bacteria, fungi, plants, animals, and humans) are based on the DNA molecule.

The so-called "genetic code" involving the DNA molecule consists of long strings (sequences) of 4 possible gene values that can appear at the various gene loci along the DNA molecule. For DNA, the 4 possible gene values refer to 4 "bases" named adenine, guanine, cytosine, and thymine (usually abbreviated as A, G, C, and T, respectively). Thus, the "genetic code" in DNA consists of a long strings such as CTCGACGGT.

A chromosome consists of numerous gene loci with a specific gene value (called an "allele") at each gene locus. The chromosome set for a human being consists of 23 pairs of chromosomes. The chromosomes together provide the information and the instructions necessary to construct and to describe one individual human being and contain about 3,000,000,000 genes. These 3,000,000,000 genes constitute the so-called "genome" for one particular human being. Complete genomes of the approximately 5,000,000,000 living human beings together constitute the entire pool of genetic information for the human species. It is known that certain gene values occurring at certain places in certain chromosomes control certain traits of the individual, including traits such as eye color, susceptibility to particular diseases, etc.

When living cells reproduce, the genetic code in DNA is read. Sub-sequences consisting of 3 DNA bases are used to specify one of 20 amino acids. Large biological protein molecules are, in turn, made up of anywhere between 50 and 500 such amino acids. Thus, this genetic code is used to specify and control the building of new living cells from amino acids.

The organisms consisting of the living cells created in this manner spend their lives attempting to deal with their environment. Some organisms do better than others in grappling with (or opposing) their environment. In particular, some organisms survive to the age of reproduction and therefore pass on their genetic make-up (chromosome string) to their offspring. In nature, the process of Darwinian natural selection causes organisms with traits that facilitate survival to the age of reproduction to pass on all or part of their genetic make-up to offspring. Over a period of time and many generations, the population as a whole evolves so that the chromosome strings in the individuals in the surviving population perpetuate traits that contribute to survival of the organism in its environment.

Prior Art Genetic Algorithms

Genetic algorithms are highly parallel algorithms that transform populations of individual mathematical objects (typically fixed-length binary character strings) into new populations using operations patterned after (1) natural genetic operations such as sexual recombination (crossover) and (2) fitness proportionate reproduction (Darwinian survival of the fittest). Genetic algorithms begin with an initial population of individuals (typically randomly generated) and then iteratively (1) evaluate the individuals in the population for fitness with respect to the problem environment and (2) perform genetic operations on various individuals in the population to produce a new population. John Holland of the University of Michigan presented the pioneering formulation of genetic algorithms for fixed-length binary character strings in *Adaptation in Artificial and Natural Systems*, by Professor John H. Holland, 1975. Holland established, among other things, that the genetic algorithm is a mathematically near optimal (minimax) approach to adaptation in that it maximizes expected overall average payoff when the adaptive process is viewed as a multi-armed slot machine problem requiring an optimal allocation of future trials given currently available information. Recent work in genetic algorithms and genetic classifier systems can be surveyed in Grefenstette (1985), Grefenstette (1987), Goldberg (1989), Davis (1987), and Schaffer (1989).

In *Adaptation in Artificial and Natural Systems*, Holland summarizes his research in genetic algorithms and presents an overall mathematical theory of adaptation for both natural and artificial systems. A key part of this book described a "genetic algorithm" patterned after nature's methods for biological adaptation. However, a limitation of this work resides in using fixed length binary strings to represent the population. U.S. Pat. No. 4,697,242 (Holland) and U.S. Pat. No. 4,881,178 (Holland) are examples of processes which use fixed length binary strings with a genetic algorithm.

Empirical studies by various researchers have demonstrated the capabilities of such genetic algorithms in many diverse areas, including function optimization (De Jong 1980), operation of a gas pipeline (Goldberg 1983), and many others reviewed in Goldberg (1989).

In the chapter entitled "An Overview" contained in the 1987 collection *Genetic Algorithms and Simulated Annealing*, Lawrence Davis and Martha Steenstrup stated, "In all of Holland's work, and in the work of many of his students, chromosomes are bit strings—lists of 0's and 1's." In addition, they continue, "Some researchers have explored the use of other representations, often in connection with industrial algorithms. Examples of other representations include ordered lists (for bin-packing), embedded lists (for factory scheduling problems), variable-element lists (for semiconductor layout), and the representations used by Glover and Grefenstette in this volume."

Some researchers have attempted to solve search and optimization problems using schemes patterned after evolution that employed mutation-plus-save-the-best strategies. Examples are Box (1957), Hicklin (1986), and the 1966 book by Fogel, Owens, and Walsh entitled *Artificial Intelligence Through Simulated Evolution*. The few results obtained from these efforts were highly specific to particular application domains and largely reflect the cleverness of implementation rather than its usefulness as a general technique for achieving adaptive increases in fitness in populations. It is important to note that mutation is not the primary means by which biological populations in nature improve their fitness and it is not the primary means used in the present invention.

Since Holland's 1975 book, Holland and various colleagues have developed a novel application of conventional genetic algorithms called a "genetic classifier system". A classifier system is a group of rules. Each rule consists of a condition part and an action part (i.e. an IF-THEN rule). Both the condition part and action part of each rule are like the individuals in the conventional genetic algorithm in that they are a strings of 0's and 1's of fixed length. In a classifier system, messages (consisting of binary strings) are received from the environment and invoke those rules whose conditional part ("IF" part) match the message (binary string) coming in. This invokation triggers the action part ("THEN" part) of the rule. The action part of a rule sends out a new message (binary string).

Classifier Systems are described in the 1978 article "Cognitive Systems based on Adaptive Algorithms" (by Holland and Judith S. Reitman) published in *Pattern-Directed Inference Systems*, edited by D. A. Waterman and Frederick Hayes-Roth; and David E. Goldberg's 1983 dissertation entitled *Computer-Aided Gas Pipeline Operations Using Genetic Algorithms and Rule Learning*. In classifier systems, credit is assigned to chains of individual rules that are invoked using a credit allocation scheme known as the "bucket brigade". The Holland process is a combination of a classifier system and a "bucket brigade algorithm". A 1987 paper by Cory Fujiki and John Dickinson in *Genetic Algorithms and Their Applications: Proceedings of the Second International Conference on Genetic Algorithms*, (John J. Grefenstette, 1987) describes a computer program written in LISP for solving the Prisoner's Dilemma using binary strings of fixed length and IF-THEN classifier rules. In addition, Smith (1980, 1983) has placed IF-THEN rules in genetic strings in lieu of individual characters.

We call conventional genetic algorithms "linear" because they manipulate strings (sequences) of characters over a fixed alphabet (typically strings of binary digits 0 and 1). This is in contrast to the "non-linear" situation in which the objects being manipulated are hierarchical expressions consisting of a hierarchical arrangement of functions and terminals.

The reasons for limiting the conventional genetic algorithm to binary strings of fixed length appear in the literature. First, in his 1983 dissertation entitled *Computer-Aided Gas Pipeline Operation Using Genetic Algorithms and Rule Learning*, David E. Goldberg argues that any binary string of the common fixed length always has an interpretation (via a well-defined representation scheme) to the problem being solved. This might be called the property of being "well defined" and it is a desirable property.

Secondly, if each individual in the population consists of a binary string of fixed length, then the crossover operation will always produce another binary string of fixed length when applied to any two individuals in the population. This might be called a "closure" property and it is also a desirable property. Of course, binary strings of fixed length are not the only way of achieving these desirable properties of closure and being well-defined.

In *Adaptation in Natural and Artificial Systems* (1975, page 71), Holland argues in favor of strings consisting only of 0's and 1's (i.e. binary strings) in the conventional genetic algorithm on the basis that the number of strings in the search space that are searched automatically using what he calls the "implicit parallelism" of the conventional genetic algorithm is highest when the strings consist only of two possibilities. This point is true; however, it should not be the controlling consideration. For various reasons cited hereinafter, limiting the genetic algorithm to the one dimensional world of linear strings of fixed length (and, in particular, binary strings of fixed length) precludes solving many problems. The field of computer science is replete with other situations where it is highly unrealistic to assume that the size or shape of a problem is known in advance to the solver so that he can use this information to rigidly pre-specify the size and shape of his search in advance.

Using fixed length binary strings in conventional genetic algorithms limits their ability to solve many problems. The following two separate example problems illustrate additional limitations of conventional genetic algorithms.

First, suppose we want a computer to program itself to solve the problem of finding the point at which two intersecting straight lines intersect. The point of intersection of two straight lines is the pair of numbers that satisfy the two linear equations in two variables that represent the lines. Thus, the computer program we are seeking would use the coefficients of the two equations and various mathematical operators (such as multiplication, subtraction, etc.) to produce the desired answer. To make the problem of having a computer learning to program itself more realistic, it is best not to specify in advance the size or shape of the mathematical expression needed to solve the problem. It is also more realistic if the computer had access to various irrelevant inputs and extraneous mathematical operations that might confuse its search to find the solution to the problem.

There is no simple or convenient way to uniquely associate a binary string whose length is predetermined in advance with an arbitrary mathematical expression composed of specified mathematical operations (functions) and terminals. A binary string of length n can only represent $2^n$ different things (no matter what the representation scheme). No matter how large an n is pre-selected in advance, there are always additional mathematical expressions.

Before continuing, it should be emphasized that it is not necessary to represent things of infinite size. Rather, what should be avoided is arbitrarily pre-setting a limit on the size and shape of the things being represented (even though any particular thing will itself be finite in size). In most problems, the size and shape of the solution are not necessarily known in advance. The process of solving the problem should be free to develop proposed solutions without any pre-set limit on the size and shape of the solution.

Even if an arbitrary maximum length specified in advance were acceptable, the method for associating each arbitrary mathematical expression (for example: A*B+C−D*E*F) with a binary string would necessarily obscure the underlying mathematical operations involve. The highly complex method used by Godel in 1931 in his proof of the Incompleteness Theorem is an example of such a method for making this kind of association. Thus, this first example problem highlights the need to be able to represent arbitrary mathematical expressions (involving various functions and terminals) whose length is not arbitrarily limited in advance (rather than merely strings of 0's and 1's of the same fixed length).

Let us now consider the problem of solving a system of two linear equations and also the problem of sequence induction.

It should be noted that if it is assumed that the two straight lines in this problem always intersect, the problem is entirely numerical. However, if the two lines might possibly be parallel, the answer from a computer program to this expanded version of the problem might appropriately be a symbolic response (e.g. "The Equations are inconsistent and the lines are parallel") rather than the numeric location of the point of intersection. This situation can be easily recognized by a computer program by checking to see if a certain computed value (the determinant) is zero. Thus, this expanded version of this first example problem highlights the need occasionally to accommodate symbolic processing and symbolic output from a computer program that normally produces a numeric output.

Second, consider the problem of predicting the future elements of a sequence of numbers from a sampling of early numbers from the sequence. This problem is an example of induction. Induction is the logical process by which one observes specific examples of some process (e.g. "The sun has come up every morning so far during my life") and then "induces" a reasonable underlying rule for the process (e.g. "The sun always comes up in the morning"). In applying inductive reasoning, there is no proof that the result is correct. Nonetheless, the process of induction is very important and indeed lies at the heart of all learning.

In contrast, deduction is the logical process in which one starts with some given premises (or facts) and some deductive rules of inference and then reaches a logical conclusion by repeatedly applying the deductive rules to the original given premises or facts. The sequence of steps used in deduction to reach a conclusion is called the proof.

If one is given a sampling of a sequence of numbers such as 0, 2, 4, 6, 8, 10, 12, 14 it is not difficult to reasonably induce that the next number in the sequence is 16. The number 16 is a reasonable induction because each previous element of the sequence is 2 times the element's position in the sequence (counting the first element as position 0). Note, however, that even elements of this simple numerical sequence cannot be represented with strings whose length has been specified in advance.

More interesting sequences involve more complicated mathematical operations. For example, the 6th element of the sequence 2, 4, 8, 16, 32, can be expressed directly in mathematics as 2 raised to the 6th power (i.e. 64). This sequence can also be expressed in mathematics using a recursion—that is, by defining the 6th element in terms of previous element(s) in the sequence. In this case, the $m^{th}$ element of the sequence is 2 times element m−1 of the sequence (that is, 2 times 32 is 64).

For some important mathematical sequences of integers, there is no known non-recursive expression for each element of the sequence, and the use of a recursion becomes a necessity, not merely an option. The well-known Fibonacci sequence 1, 1, 2, 3, 5, 8, 13, 21, 34, 55, is constructed by adding the 2 previous elements of the sequence. For example, 8 is the sum of 3 and 5, and 13 is the sum of 5 and 8. In general, the $m^{th}$ element of the Fibonacci sequence is the sum of element m−1 and element m−2 of the sequence (with the understanding that the first two elements of the sequence are a "default" value of 1).

Thus, the problem of sequence induction highlights the need to be able to represent recursions as well as arbitrary mathematical expressions (involving functions and terminals). It also re-emphasizes the need to be able to represent strings whose length has not been pre-specified in advance.

Many problems are best approached by developing hierarchies in which solutions to sub-problems are manipulated and assembled hierarchically into solutions to the original main problem. In fact, many mathematical problems are solved by first "decomposing" a larger problem into smaller sub-problems. Then, an attempt is made to solve each of the sub-problems. And, finally, the solutions to the sub-problems are assembled into a solution to the original problem. The problem of solving large numbers of equations with many variables and solving polynomial equations of high order are examples of problems where decomposition can be used. In some cases, there is a symmetry between this process of assembly and the solution to the individual sub-problems. That is, in this assembly process, the solutions to the sub-problems may be manipulated as if they themselves were merely the elements of a sub-problem.

Even when no symmetry is involved, a "hierarchy" develops when a problem is solved by decomposition. At the lowest level of the hierarchy, the sub-problem is solved. The hierarchy consists of combining the solutions of the sub-problem into the solution to the larger problem. Something similar is commonplace in computer programming in general. For example, sub-routines (or sub-procedures) are typically called by a main program. The main program is at the top of the hierarchy, typically organized to provide an overview of the solution to the whole problem. Each of the sub-routines called by the main program are found at one level lower on the hierarchy. If one of the sub-routines itself happens to call upon another sub-routine, that second sub-routine is one level lower on the hierarchy than the sub-routine which called it. Complex social organizations (such as corporations and military organizations), are similarly organized into hierarchies. The ability to decompose problems into hierarchies of sub-problems is generally important for solving problems.

It should be noted, however that the conventional genetic algorithm imposes at least five important limitations which restrict its usefulness in solving a broad range of problems.

First, the requirement that each individual in the population be a string of the same length arbitrarily limits consideration to only a pre-determined number of situations, cases, or states of the problem environment.

Secondly, the use of a binary string (a string of 0's and 1's) leads to a representation scheme involving an explosively large number of "different" solutions merely to handle consideration of only a few past populations. In contrast, if the representation scheme were not required to be rigidly structured in advance prior to the start of operation of the conventional genetic algorithm, a representation scheme involving only a relative handful of relevant possible histories might have evolved.

Thirdly, the individuals in the population are representational descriptions (codings) of a solution (as opposed to being actionable procedures which directly implement the solution). Any particular solution that one envisions and wants to include in the population must be first coded into a binary string of fixed length before it can be inserted into the population. Before any solution can be implemented, the binary string must be decoded into actionable instructions.

Fourthly, the binary strings of fixed length provide no hierarchical structure for potential solutions to the problem. The binary string is one dimensional. All items in the string operate at the same level.

Fifth, it is often true that conventional genetic algorithms are extremely efficient in searching large, complex, non-linear spaces to find an area that is especially good, but that other search techniques are better than conventional genetic algorithms in zeroing in on the final, precise, global optimum value in the search space. Thus, for some problems, it is common to use conventional genetic algorithms to quickly find the best neighborhood of the overall search space and then to switch to another search technique (such as simulated annealing or hill-climbing) to zero in on the precise global optimum value. This shortcoming of conventional genetic algorithms is, for many problems, the direct result of the fixed representation scheme selected at the beginning of the process. If the representation scheme were adaptive (i.e. not fixed), it could change its size and shape after getting into the right general neighborhood of the solution. It could then become more refined so that it would be capable of finding the precise global optimum solution to the problem.

Background on Genetic Programming Paradigm

Representation is a key issue in genetic algorithm work because genetic algorithms directly manipulate the coded representation of the problem and because the representation scheme can severely limit the window by which the system observes its world. Fixed length character strings present difficulties for some problems—particularly problems in artificial intelligence where the desired solution is hierarchical and where the size and shape of the solution is unknown in advance. The need for more powerful representations has been recognized for some time (De Jong 1985, De Jong 1987, De Jong 1988).

The structure of the individual mathematical objects that are manipulated by the genetic algorithm can be more complex than the fixed length character strings. Smith (1980, 1983) departed from the early fixed-length character strings by introducing variable length strings, including strings whose elements were if-then rules (rather than single characters). Holland's introduction of the classifier system (1986) continued the trend towards increasing the complexity of the structures undergoing adaptation. The classifier system is a cognitive architecture into which the genetic algorithm is embedded so as to allow adaptive modification of a population of string-based if-then rules (whose condition and action parts are fixed length binary strings).

In addition, we have recently shown that entire computer programs can be genetically bred to solve problems in a variety of different areas of artificial intelligence, machine learning, and symbolic processing (Koza 1989, 1990). In this recently developed "genetic programming" paradigm, the individuals in the population are compositions of terminals and functions appropriate to the particular problem domain. The set of terminals used typically includes inputs (sensors) appropriate to the problem domain and various constants. The set of functions used typically includes arithmetic operations, mathematical functions, conditional logical operations, and domain-specific functions. Each function in the function set must be well defined for any element in the range of every other function in the set which may appear as an argument to that function.

Often in writing computer programs, a portion of the programming code (e.g., a subroutine) is dedicated to defining a function, such that a particular calculation can be performed on various different combinations of arguments. For example, if an exponential function in the form of an approximation of the first five terms of the Taylor series is applied to a single variable x on one occasion in a computer program, a programmer could use the following code:

$$1.0 + X + 0.5X^2 + 0.1667X^3 + 0.04167X^4,$$

or the equivalent code in whatever programming language that is being utilized. However, if the same exponential function is applied to another variable y or a quantity, such as $3z^2$, later in the same program, the programmer would have to tediously reproduce the code for the specific variables. For instance, the code for variable y would be:

$$1.0 + Y + 0.5Y^2 + 0.1667Y^3 + 0.04167Y^4$$

and the code for the quantity $3z^2$ would be:

$$1.0 + 3Z^2 + 0.5(3Z^2)(3Z^2) + 0.1667(3Z^2)(3Z^2)(3Z^2) + 0.04167(3Z^2)(3Z^2)(3Z^2)(3Z^2)$$

In order to overcome this tedious process of writing separate code for each of the three situations, a programmer would want to be able to define a function in terms of a dummy variable (i.e., formal parameter) dv to accommodate all three uses of the exponential function, such as:

Define Function exp
$(dv) = 1.0 + dv + 0.5dv^2 + 0.1667dv^3 + 0.04167dv^4$

Once a function has been defined, it can be called an arbitrary number of times from an arbitrary number of different places in the program with different instantiations of its dummy variable (i.e., formal parameter), such as x, y and $3z^2$. Thus, the process of rewriting code can be avoided. Furthermore, defining functions enhances the understandability of a program because common calculations are highlighted.

Moreover, by defining and making multiple uses of a function, a problem can be decomposed into a hierarchy of which the defined function is a part. If one defined function is allowed to make use of another, previously defined function, the hierarchical decomposition is accentuated. Moreover, if one defined function is allowed to call on itself, either directly or indirectly, through a sequence of other functions, the hierarchical decomposition may be even more accentuated As a problem increases in size and complexity, decomposition of a problem using a function definition becomes an increasingly important tool for solving problems.

What is needed is a way to apply some of the general principles of biological natural selection that are embodied in the conventional genetic algorithm (i.e. survival of the fittest and crossing over of parents's traits to offspring) to a greatly expanded class of problems. In particular, what is needed is a method for adaptively creating computer programs involving complicated combinations of mathematical functions and their arguments, recursions, symbolic processing, and complicated data structures with no advance limitations on the size, shape, or complexity of the programs, including the use of function definitions created for the particular problem domain. One object of the present invention is to provide a genetic process to provide solutions for an expanded class of problems. A further object of the present invention is to provide a genetic process without any predetermined limits on the size, shape, or complexity of the members of the subject population.

In solving problems with genetically bred computer programs using a population composed of terminals and functions appropriate to the particular problem domain, a search space is developed for solving the problem in conjunction with the computer programs. This search space is the hyperspace of all possible compositions of functions that can be recursively composed of the available functions and terminals. The symbolic expressions (S-expressions) of the LISP programming language are an especially convenient way to create and manipulate the compositions of functions and terminals described above. These S-expressions in LISP correspond directly to the "parse tree" that is internally created by most compilers.

The basic genetic operations for the genetic programming paradigm are fitness proportionate reproduction and crossover (recombination). Fitness proportionate reproduction is the basic engine of Darwinian reproduction and survival of the fittest and operates for the genetic programming paradigm in the same way as it does for conventional genetic algorithms. The crossover operation for the genetic programming paradigm is a sexual operation that operates on two parental programs (i.e. LISP S-expressions) and produces two offspring S-expressions using parts of each parent. In particular, the crossover operation creates new offspring S-expressions by exchanging sub-trees (i.e. sub-lists) between the two parents. Because entire sub-trees are swapped, this genetic crossover (recombination) operation produces syntactically and semantically valid LISP S-expressions as offspring regardless of which allowable point is selected in either parent.

This genetic programming paradigm has been successfully applied (Koza 1989, 1990) to example problems in several different areas, including, but not limited to, (1) machine learning of functions (e.g. learning the Boolean 11-multiplexer function), (2) planning (e.g. developing a robotic action sequence that can stack an arbitrary initial configuration of blocks into a specified order), (3) automatic programming (e.g. discovering a computational procedure for solving pairs of linear equations, solving quadratic equations for complex roots, and discovering trigonometric identities), (4) sequence induction (e.g. inducing a recursive computational procedure for the Fibonacci and the Hofstadter sequences), (5) pattern recognition (e.g. translation-invariant recognition of a simple one-dimensional shape in a linear retina), (6) optimal control (e.g. centering a cart and balancing a broom on a moving cart in minimal time by applying a "bang bang" force to the cart), (7) symbolic "data to function" regression, symbolic "data to function" integration, and symbolic "data to function" differentiation, (8) symbolic solution to functional equations (including differential equations with initial conditions, integral equations, and general functional equations), (9) empirical discovery (e.g. rediscovering Kepler's Third Law, rediscovering the well-known econometric "exchange equation" $MV=PQ$ from actual time series data for the money supply, the velocity of money, the price level, and the gross national product of an economy), and (10) simultaneous architectural design and training of neural networks.

Prior Art Function Definition

To applicant's knowledge, there is no known usage of automatic function definitions in conjunction with the genetic programming paradigm.

Prior Art Data Encoding

To Applicant's knowledge, genetic algorithms have not been applied to data or image compression. Numerous methods of presentation of video image information on display devices are well-known in the art. One such method involves displaying image data on a red-green-blue (RGB) display monitor. In an RGB color system, a display may be controlled by presenting pieces of color information to drive circuitry which in turn produces three electrical signals which control the red, green and blue colors on the display.

Image data for an image display device, such as a video display or a printer, is typically organized into multiple lines (e.g., scanlines), with each line holding image data for a fixed number of "pixels" (picture elements). The image data stored for each pixel can vary from a single bit for black and white images, 8 bits for representing 256 colors, or even more bits to represent even more colors. The image data stored for a pixel is often also stored as an ordered set (vector) of three such numerical values for color, each denoting the level of the various color attributes (e.g., red, green, blue, etc.). Where the number of bits representing a pixel is large, the amount of memory required to store all of the pixels corresponding to an image, and thus to store the image, is large. In order to reduce the amount of memory required to store or bandwidth required to transmit an image, image (data) compression is typically employed.

Various methods of data compression are known in the field. Known methods often rely on the removal of redundant information or the encoding of information in a more compact representation, including the method of fractal data compression. Fractal data compression and its application to image compression are discussed in *The Use of Fractal Theory in a Video Compression System* by Maaruf Ali, et al.. Another method of image compression is discussed by Karl Sims in *Artificial Evolution of Computer Graphics.*

Sims (1991) creates complex visual structures, textures, and motions on a video monitor using a three step process of random generation, personal selection, and mutation of LISP S-expressions. First, Sims randomly generates hundreds or thousands of randomly generated LISP S-expressions on a video monitor. Secondly, Sims selects those he found to have interesting visual structures, textures and motions. When an S-expression has an explicit time variable, the S-expression creates a video image which varies with time and thus presents motion. The images are presented on the video monitor of a computer workstation and Sims communicates his selections to the computer by means of the interactive features of the computer. Third, Sims modifies interesting S-expressions by random mutation of the S-expression, and, in some cases, by directed mutation. In directed mutation, Sims applies his own experience as to what specific mutations are likely to produce particular interesting or desired changes in the video image. By using his three step process of random generation, selection, and mutation (random or directed), Sims discovers an impressive variety of different visual images. Programming comparable images from scratch would have been extremely difficult or impossible.

What is needed is a way to apply some of the general principles of biological natural selection that are embodied in the conventional genetic algorithm (i.e. survival of the fittest and crossing over of parents' traits to offspring) to a greatly expanded class of problems. In particular, what is needed is a method for adaptively creating computer programs involving complicated combinations of mathematical functions and their arguments, recursions, symbolic processing, and complicated data structures with no advance limitations on the size, shape, or complexity of the programs to compress (encode) data to minimize computer storage, transmission costs or some other significant metric. One object of the present invention is to provide a genetic process to provide solutions for an expanded class of problems. A further object of the present invention is to provide a genetic process without any predetermined limits on the size, shape, or complexity of the members of the subject population.

REFERENCES CITED

U.S. Patents

U.S. Pat. No. 4,821,333, "Machine learning procedures for generating image domain feature detector structuring elements", issued Apr. 11, 1989, filed Aug. 22, 1986, Gillies.

U.S. Pat. No. 4,935,877, "Non-Linear Genetic Algorithms for Solving Problems", issued Jun. 19, 1990, filed May 20, 1988, Koza.

U.S. Pat. No. 4,697,242, "Adaptive Computing System Capable of Learning and Discovery", issued Sep. 29, 1987, filed Jun. 11, 1984, Holland et al.

U.S. Pat. No. 4,881,178, "Method of Controlling a Classifier System", issued Nov. 14, 1989, filed May 7, 1987, Holland et al.

Other Publications

Ali, Papadopoulus, Costas, et al., "The Use of Fractal Theory in a Video Compression System," in *Proceedings at the* 1992 *Data Compression Conference,* IEEE Computer Society Press, 1992.

Axelrod, Robert (Editor), "The Evolution of Strategies in the Iterated Prisoner's Dilemma" In *Genetic Algorithms and Stimulated Annealing,* p. 32, Pittman, London 1987.

Binmore, Kenneth G. and Larry Samuelson, "Evolutionary Stable Strategies in Repeated Games Played by Finite Automata" (Draft), Sixth World Congress of the Econometric Society, Barcelona, Spain, August 1990.

Davis, Lawrence (Editor) - *Genetic Algorithms and Simulated Annealing,* Pitman, London 1987.

De Jong, Kenneth A. Genetic algorithms: A 10 year perspective. *Proceedings of an International Conference on Genetic Algorithms and Their Applications,* Hillsdale, N.J.: Lawrence Erlbaum Associates 1985.

De Jong, Kenneth A. "On Using Genetic Algorithms to Search Program Spaces", *Genetic Algorithms and Their Applications: Proceedings of the Second International Conference on Genetic Algorithms,* Hillsdale, N.J.: Lawrence Erlbaum Associates 1987.

De Jong, Kenneth A. Learning with genetic algorithms: an overview. *Machine Learning,* 3(2), 121–138, 1988.

Fogel, L. J., Owens, A. J. and Walsh, M. J.-*Artificial Intelligence through Simulated Evolution,* New York: John Wiley 1966.

Fujiki, Cory-*An Evaluation of Holland's Genetic Operators Applied to a Program Generator,* Master of Science Thesis, Department of Computer Science, University of Idaho, 1986.

Goldberg, David E. - *Computer-Aided Gas Pipeline Operation Using Genetic Algorithms and Rule Learning,* (Doctoral Dissertation, University of Michigan, 1983) Dissertation Abstracts International 44(10), 3174B (University Microfilms No. 8402282).

Goldberg, David E., *Genetic Algorithms in Search, Optimization, and Machine Learning,* Reading, Mass.: Addision-Wesley 1989.

Green, Cordell C. et al., *Progress Report on Program-Understanding Systems,* Standford Artificial Intelligence Laboratory memo AIM-240, Standford University Computer Science Department, August 1974.

Grefenstette, John J. (Editor)-*Proceedings of an International Conference on Genetic Algorithms and Their Applications,* Pittsburgh, Pa. 1985.

Grefenstette, John J. (Editor)-*Genetic Algorithms and Their Applications; Proceedings of the Second International Conference on Genetic Algorithms,* Lawrence Erlbaum Associates, Hillsdale, N.J. 1987.

Hicklin, Joseph F.-*Application of the Genetic Algorithm to Automatic Program Generation,* Master of Science Thesis Department of Computer Science, University of Idaho, 1986.

Hillis, W. Daniel, "Co-Evolving Parasites Improve Simulated Evolution as an Optimizing Procedure", Emergent Computation: Self-organizing, Collective, and Cooperative Computing Networks, edited by S. Forrest, Cambridge, Mass., MIT Press 1990.

Holland, John H.-*Adaptation in Natural And Artificial Systems,* The University of Michigan Press, Ann Arbor, 1975.

Holland, John H. Escaping brittleness: The possibilities of general-purpose learning algorithms applied to parallel rule-based systems. In Michalski, Ryszard S., Carbonell, Jaime G. and Mitchell, Tom M. *Machine Learning: An Artificial Intelligence Approach, Volume II,* P. 593–623. Los Altos. Calif.: Morgan Kaufman 1986.

Holland, J. H. "ECHO: Explorations of Evolution in a Minature World". In *Proceedings of the Second Conference on Artificial Life*, edited by C. G. Langton, and J. D. Farmer, J. Doyne, Redwood City, Calif.: Addison-Wesley. 1990. In Press.

Holland, J. H. & Reitman, J. S. (1978), Cognitive systems based on adaptive algorithms, in D. A. Waterman & F. Hayes-Roth (Eds.), *Pattern Directed Inference Systems* (pp. 313–329), New York: John Wiley 1965.

Jefferson, David, Collins, Rob, et al. "The Genesys System: Evolution as a Theme in Artificial Life". In *Proceedings of the 11th International Joint Conference on Artificial Life*, edited by C. G. Langton and D. Farmer. Redwood City, Calif.: Addison-Wesley. 1990. In Press.

Koza, John R., *Genetic Programming: A Paradigm for Genetically Breeding Populations of Computer Programs to Solve Problems*, Stanford University, Dept. of Computer Science, Report No. STAN-CS-90-1314, June 1990.

Koza, John R., Hierarchical genetic algorithms operating on populations of computer programs, *Proceedings of the 11th International Joint Conference on Artificial Intelligence (IJCAI)*, San Mateo, Calif.: Morgan Kaufman 1989.

Lenat, Douglas B. AM: *An Artificial Intelligence Approach to Discovery in Mathematics as Heuristic Search*, PhD Dissertation, Computer Science Department, Stanford University, 1976.

Lenat, Douglas B., The role of heuristics in learning by discovery: Three case studies, In Michalski, Ryszard S., Carbonell, Jaime G. and Mitchell, Tom M., *Machine Learning: An Artificial Intelligence Approach*, Volume I, P. 243–306, Los Altos, Calif.: Morgan Kaufman 1983.

Miller, J. H. "The Evolution of Automata in the Repeated Prisoner's Dilemma." In *Two Essays on the Economics of Imperfect Information*, PhD Dissertation, Department of Economics, University of Michigan, 1988.

Miller, John H., "The Coevolution of Automata in the Repeated Prisoner's Dilemma." Santa Fe Institute and Carnegie-Mellon University, Document No. 89-003, Oct. 15, 1987.

Schaffer, J. D. (editor), *Proceedings of the 3rd International Conference of Genetic Algorithms*, San Mateo, Calif.: Morgan Kaufman Publishers Inc. 1989.

Sims, Karl, Artificial Evolution of Computer Graphics, *Computer Graphics*, 25(4): 319–328, 1991.

Sims, Karl, Interactive Evolution of Dynamical Systems, In Varela, Francisco J., and Bourgine, Paul (editors), *Toward a Practice of Autonomous Systems: Proceedings of the First European Conference on Artificial Life*, MIT Press, 1992.

Smith, Steven F., *A Learning System Based on Genetic Adaptive Algorithms*, PhD dissertation, Pittsburgh: University of Pittsburgh, 1980.

Smith, Steven F., Flexible learning of problem solving heuristics through adaptive search, *Proceeding of the 8th International Conference on Artificial Intelligence*, Karlsruhe, Germany: Morgan Kaufman 1983.

Tanese, Reiko, *Distributed Genetic Algorithm For Function Optimization*, PhD. dissertation, Department of Electrical Engineering and Computer Science, University of Michigan, 1989.

Wilson, Stewart, W. Hierarchical credit allocation in a classifier system. *Proceedings of the Tenth International Joint Conference on Artificial Intelligence*, 217–220, 1987.

SUMMARY OF THE INVENTION

An apparatus and method for solving problems using automatic function definition and for performing data encoding on a set of data values is described. The present invention includes an apparatus and process for creating an initial population and then evolving that population to generate a result.

In one embodiment, the apparatus and process for solving problems using automatic function definition initially creates a population of entities. Each of the entities has sub-entities. At least one of the sub-entities in each entity is invoked externally by the controlling process. At least one of the entities in the population has a sub-entity which is invoked internally. The externally invoked sub-entities are capable of having actions and invocations of sub-entities which are invoked internally, and have access to material provided to the externally invocable sub-entities. Furthermore, in one embodiment, each sub-entity which is invoked internally is also capable of including actions and invocations of internally invocable sub-entities, and each has access to material provided to the externally invocable sub-entity, and material provided to itself. The population is then evolved to generate a solution to the problem.

One use of this embodiment is to automatically discover abstract functional subunits of the problem being solved, i.e. function definitions, so that the problem can be solved more efficiently, by means of the repeated invocation of these subunits (automatically defined functions) often using different arguments so as to produce a functionally similar effect in each invocation that is specialized by the arguments provided by each respective invocation.

In another embodiment, the apparatus and process initially creates a population of entities which are evolved to automatically encode a set of data values into a procedure capable of approximating those data values. One use of this embodiment is to encode data, such as video sonar, audio or radar images, into a function whose representation is cheaper to store and transmit than is the data that it has been evolved to represent.

In yet another embodiment, a population of entities is evolved such that the entities in the population are capable of making recursive references to themselves. One use of this embodiment is to facilitate the solution to problems that cannot be solved by iterative (non-recursive) means.

The population in each embodiment is evolved by iterating a series of steps. Each iteration includes externally invoking each entity to produce a result. A value is then assigned to each result and the value is associated with the corresponding entity which produced the result. With respect to the data encoding, the value is indicative of the closeness of the encoded version to the original set of data values. Next, at least one entity having a relatively high associated value is selected. Then an operation, such as crossover and reproduction, is chosen and performed on the entity to created a new entity. The new entity is then added to the population, such that the population evolves and generates a solution to the problem or an encoding of the data.

Many seemingly different problems can be reformulated into a problem requiring discovery of an entity, e.g., a mathematical expression or computer program that produces some desired output for particular inputs. When viewed in this way, the process of solving these seemingly different problems in the computer embodiment becomes equivalent to searching a space of possible mathematical expressions or computer programs for a most fit individual mathematical expression or computer program.

Computer programs have the ability to perform alternative computations conditioned on the outcome of intermediate calculations, to perform computations on variables of many different types, to perform iterations and recursions to achieve the desired result, and to define and subsequently use computed values and subprograms. This flexibility found in computer programs facilitates the solution to these various different problems.

The process of solving these problems can be reformulated as a search for a most fit individual computer program in the space of possible computer programs. In particular, the search space can conveniently be regarded as the space of LISP "symbolic expressions" (S-expressions) composed of various terminals along with standard arithmetic operations, standard programming operations, standard mathematical functions, and various functions peculiar to the given problem domain. For example, the standard arithmetic functions of addition, subtraction, multiplication, etc., are relevant when we are attempting to construct a mathematical expression that might be the solution to an equation for generating an image. In general, the objects that are manipulated in our attempts to build computer programs are of two broad classes. These objects include functions of various numbers of arguments, such as addition mentioned above, or control structures such as If-Then-Else, Do-Until, etc.; terminals, such as dummy variables, the independent variable(s) in an equation (i.e., the actual variables of the problem) or constants, such as 0, 1, etc.

The LISP S-expression required to solve each of the problems described above tends to emerge from a simulated evolutionary progression using the non-linear genetic process which we call "Genetic Programming". This process starts with an initial population of LISP S-expressions (typically randomly generated), each composed of functions and terminals appropriate to the problem domain. When using the automatic function definition mechanism, the S-expressions are generated by superimposing a structure on top of the functions and terminals for the problem domain. The structure sets forth a set of components to automatically define a function or functions, including dummy variables (i.e., formal parameters) for use within the scope of each component. An S-expression is then randomly generated from the functions and terminals, including dummy variables when a function definition is being created.

The fitness of each individual in the population drives the process. In data encoding problems, fitness can be measured by the sum of the distances (taken for all the environmental cases) between the point in the solution space (whether real-valued, complex-valued, vector-valued, multiple-valued, Boolean-valued, integer-valued, or symbolic-valued) created by the S-expression for a given set of actual variables of the problem and the correct point in the solution space. In other problems, other fitness measures can be used.

In problems where fitness is the sum of errors (i.e., distances, differences), the closer this sum is to zero, the better the S-expression. If this sum is close to zero, there is a good fit. If this sum attains the closest possible value to zero, there is a best fit. If this sum actually attains the value of zero, there is a perfect fit. The notions of good, best, and perfect fit are well known in the art. Once the desired level of fitness is attained, the iteration of the evolutionary process can be terminated.

The initial individual S-expressions in the population typically will have exceedingly poor fitness. Nonetheless, some individuals in the population will be somewhat more fit than others.

Then, a process based on the Darwinian principle of reproduction and survival of the fittest (fitness proportionate reproduction) and the genetic operation of crossover (recombination) is used to create a new population of individuals. In particular, a genetic process of sexual reproduction (crossover) among two parental S-expressions will be used to create offspring S-expressions. At least one of the two participating parental S-expressions will be selected in proportion to fitness. The resulting offspring S-expressions will be composed of sub-expressions from their parents.

In addition, other operations such as mutation and permutation, define building blocks (encapsulation) and editing may be used.

Finally, the new population of offspring (i.e. the new generation) will replace the old population of parents and the process will continue.

At each stage of this highly parallel, locally controlled and decentralized process, the state of the process consists only of the current population of individuals. Moreover, the only input to the algorithmic process is the observed fitness of the individuals in the current population in grappling with the problem environment. This process produces a population which, over a period of generations, tends to exhibit increasing average fitness in dealing with its environment, and which, in addition, can robustly (i.e. rapidly and effectively) adapt to changes in their environment. The solution produced by this process at any given time can be viewed as the entire population of distinctive alternatives (typically with improved overall average fitness), or more commonly, as the single best individual in the population found during execution of the run.

The hierarchical character of the computer programs is an essential aspect of the process. The results of this process are inherently hierarchical and in many cases the results contain default hierarchies which often solve the problem in a relatively parsimonious way.

The dynamic variability of the size and shape of the computer programs that are developed along the way to a solution are also an essential aspect of the process. In each case, it would be difficult and unnatural to try to specify or restrict the size and shape of the eventual solution in advance. Moreover, the advance specification or restriction of the size and shape of the solution to a problem narrows the window by which the system views the world and might well preclude finding the solution to the problem.

DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 2 is a tree diagram representation of a LISP S-expression (program).

FIG. 3 are flow chart diagrams of the present invention.

FIG. 4 is a tree diagram representation of a crossover operation occurring at internal points.

FIG. 5 is a tree diagram representation of a crossover operation occurring at external points.

FIG. 6 is a tree diagram representation of a crossover operation occurring at an internal and external point.

FIG. 7 is a tree diagram representation of a permutation operation.

FIG. 8 is a block diagram of the parallel processing embodiment of the present invention.

FIG. 9 is a chart diagram of the linear equation problem. is a tree diagram representation of an S-expression which is a member of the initial population for solving the linear equation problem using the present invention.

FIG. 11 is a tree diagram representation of a crossover operation as applied to two individuals during a solution of the Fibonacci series problem.

FIG. 12 illustrates a simple entity, namely the symbolic expression in the LISP programming language for the mathematical expression A+B*C.

FIG. 13 illustrates the simple entity in FIG. 12 after application of the "Define Building Block" (encapsulation) operation.

FIG. 14 illustrates the portion of the simple entity in FIG. 12 being represented by the function defined by the "Define Building Block" (encapsulation) operation.

FIG. 15 illustrates an example of an entity under the present invention.

FIG. 16 illustrates one embodiment of the structure of an example entity in the population.

FIG. 17 illustrates an example of the crossover operation in conjunction with two example entities having automatically defined functions.

FIG. 18 illustrates the preferred embodiment for performing the crossover operation in conjunction with two example entities having automatically defined functions.

FIGS. 19, 20 and 21 are graphs of points for an unknown curve used to illustrate symbolic function identification and regression.

FIG. 23 illustrates a black and white diagram representing a color image produced by the present invention.

FIG. 24 illustrates an example of the embodiment of the structure of an entity for the even-4-parity function.

FIG. 28 depicts the result-producing component evolved during a particular run for the even-4-parity example using the present invention.

FIG. 29 illustrates an example of the hierarchical functional dependencies generated by the present invention.

FIG. 30 illustrates an example of a solution generated on a run of the even-5-parity problem using the present invention.

FIG. 31 illustrates an example of a solution generated on a run of the odd-5-parity problem using the present invention.

FIG. 32 illustrates a typical computer configuration.

FIG. 33 illustrates a recursive formulation of the multiplication function RMULT.

FIG. 34 illustrates a general structure (template) used for the definition of recursive entities.

NOTATION AND NOMENCLATURE

Figure 1X:
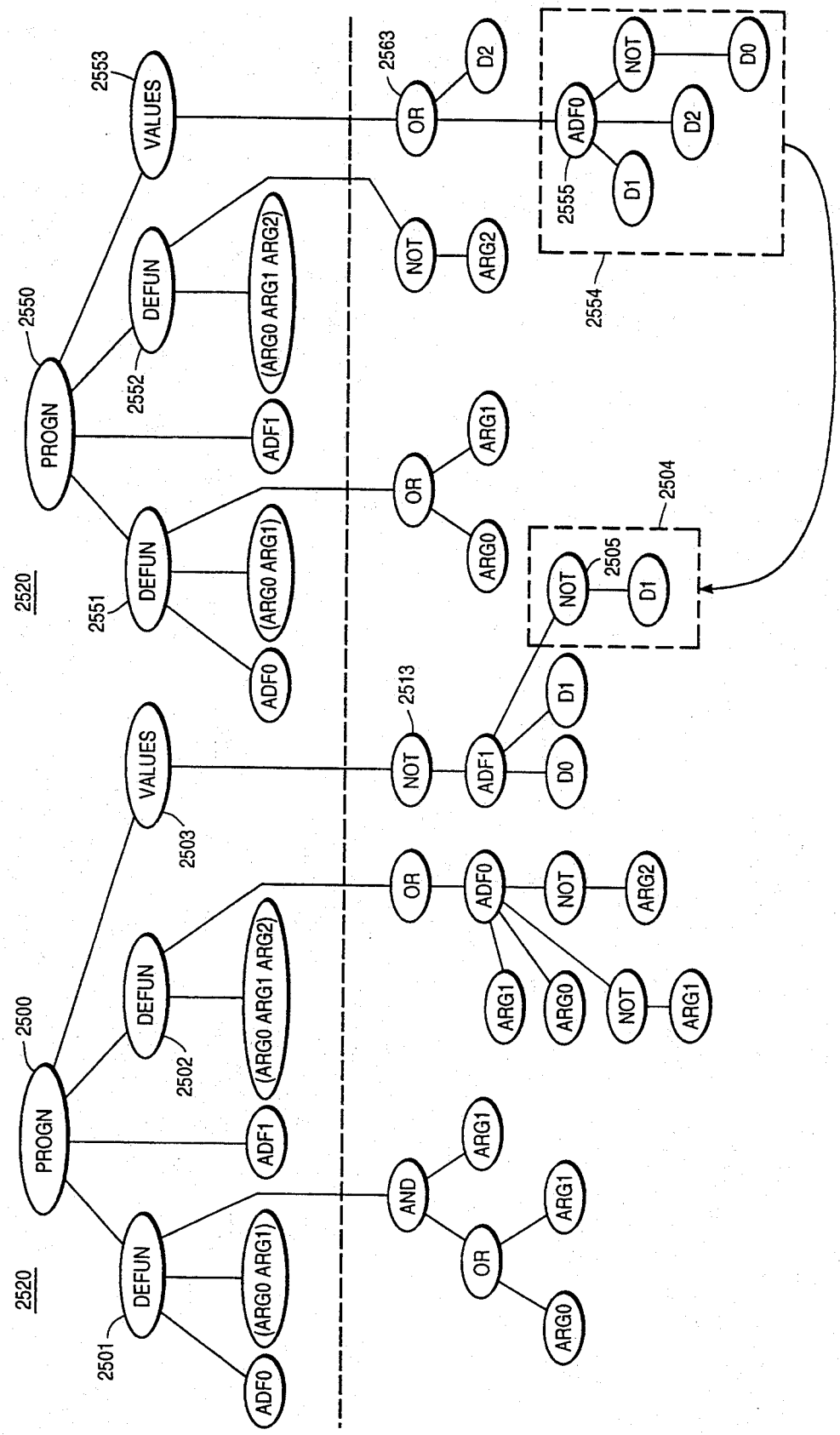
FIG. 1 is a tree diagram representation of a LISP S-expression (program).

This following description relates specifically to the automatic definition of functions, a topic not covered in its parent, co-pending U.S. patent application (continuation-in-part) Ser. No. 07/500,791, filed Mar. 28, 1990, titled Non-linear Genetic Algorithms for Solving Problems by Finding a Fit Composition of Functions. The choice of terminology used in the parent patent was made in a manner intended to increase the intelligibility of the description of the invention. However, the same terminology might be confusing in the following description in part because the following description requires a distinction between the definition of a function with arguments and the use of (call to) a function with a distinct set of instantiated arguments. Thus, the following terms are defined as:

ACTION-Actions are the primitive operations in an entity. Actions are often parameterized. If the entities are in the preferred computer embodiment, then an action may be a function, such as "+" or "IF", or a terminal such as "MOVE-LEFT". If the embodiment were to be in the domain of robots, then an action might be an operation by such a robot that applies to something else. For example, an action might be "PICK-UP", where the thing being picked up is specified as an argument to the action. An example of a non-parameterized action might be "MOVE-LEFT". Actions may be invoked using the results of other actions as arguments.

MATERIAL-Material is that which is provided to actions for their execution. This material might consist of externally provided material (the values of the actual variables of the problem), internally provided material (the values of dummy variables), or constants. In the computer embodiment, material is typically comprised of values, such as "TRUE", "FALSE" or 3.5. In an embodiment using robots in manufacturing, the material might be the contents of parts bins or the ingredients for the process. Thus, material encompasses both information and physical objects used in the problem solving process.

FUNCTION-A function is the computer embodiment of an action. We do not use the term in the strict mathematical sense of the word. For example, a function in a particular problem domain, which we will call "MOVE-BLOCK" might be viewed as transforming one state space into another. "MOVE-BLOCK" might cause a block in a simulated world to be moved from one side of a table to the other. This can be viewed as transforming one state space in which the block is on one side of the table into a new state space in which the block is on the other side of the table. Programmers often view this as a process of side-effecting (i.e. changing the values of) state variables. Thus, by "function" we mean any construct that takes zero or more arguments, returns zero or more values, and transforms the arguments and/or side-effects some global or lexical state. Other examples of "function" using this definition could therefore be "+", which takes numbers as its arguments and returns the sum of the arguments, "PRINT" which takes an argument and prints it (to the global environment), "PROGN" which takes program segments as arguments and returns the result of evaluating its last argument after evaluating all of its other arguments in sequence, and so-called non-strict operators such as "IF" which takes program segments as arguments and returns the result of evaluating one of its arguments dependent upon the result of evaluating its "condition" argument. "MOVE-BLOCK" might be, therefore, a function that takes no arguments, returns no values and whose purpose consists of side-effecting the state space of the problem. One could also view "MOVE-BLOCK" as a function that takes an old state space as its argument and returns as its value a new and transformed state space. This definition of "function" therefore subsumes, among others, the programming terms function, operator, procedure, macro, NLAMBDA and Special Form.

PRIMITIVE FUNCTION-A primitive function is a function provided by the user of the present invention for use during the problem-solving process. Primitive functions usually derive from the problem domain or are provided because they are thought to be useful in the problem-solving process. Primitive functions are common to the entire population, though there may be specific limits on which types or categories of functions may be used in certain contexts.

AUTOMATICALLY DEFINED FUNCTION (ADF, DEFINED FUNCTION)-An automatically defined function is a function whose behavior is evolved during the problem-solving process. ADFs are defined within particular entities in the population and the ADFs defined within a particular entity are used only within that particular entity. Each entity will have at most one definition for an ADF of a particular name, though there may be many different definitions for an ADF of that same name within the population.

TERMINAL-A terminal is the termination point of an entity (i.e., program in the preferred computer embodiment) when that program is represented as a tree. A terminal could be, but is not limited to, a constant (such as the number 1.5 or a structured constant value, such as a constant matrix), a variable (such as x, which might be a dummy variable (formal parameter) or an actual variable of the problem), a function of no arguments that performs side-effects on the environment of activation of the entity, a function of no arguments that causes data to be read from a table, database or from some sensor machinery.

DUMMY VARIABLE (FORMAL PARAMETER)-A variable, which is local to the definition of a function. For example, if we define the sine function in the computer embodiment in terms of the Taylor series expansion, a function might be defined in the form:

DEFINE FUNCTION sine
$(X) = 1.0 + X + 0.5X^2 + 0.1667X^3 + 0.0416X^4$

In this case, the variable X is a dummy variable. When the function so defined is invoked with a specific argument, such as in the call:

sine(0.34), the dummy variable X takes on the value of the argument provided to the function (i.e., 0.34 in this case). Thus, this dummy variable is said to have been instantiated with the value 0.34.

A dummy variable is therefore a symbol which takes on the meaning of the specific argument to a function during the execution of that function. A dummy variable has no meaning outside the definition of the function.

ACTUAL VARIABLE OF THE PROBLEM-The actual variables of the problem are variables whose values are defined externally to the problem being solved. These are frequently the independent variables of the problem. For example, if one were evolving a program in the computer embodiment to control a robot, the actual variables of the problem might be the physical coordinates of the robot, i.e. X-POSITION and Y-POSITION. Actual variables of the problem are sometimes called Global Variables.

ARGUMENT-An argument is a specific value which is passed to a function. The value of an argument becomes the specific instantiated value of the associated dummy variable of the function being called (invoked). For example, in the expression:

sine(3*4)

in the computer embodiment, the sine function is called with one argument, namely, the result of the evaluation of the expression 3*4, i.e., 12. In this case, the one dummy variable of the sine function will be invoked with the value 12. Because the sine function requires exactly one such argument in order to instantiate its dummy variable, the sine function is said to take one argument, or is a one-argument function. A function taking n arguments is said to have arity n.

ARGUMENT LIST-The argument list of a function is the ordered set of dummy variables used by that function. In the example above, the sine function has the argument list (X), where "(X)" denotes a list containing the single element "X" and "(X Y)" would be the argument list for a two-argument function, the arguments being X and Y.

DETAILED DESCRIPTION OF THE INVENTION

The present invention describes a non-linear genetic process for problem solving and for encoding data. In the following description, numerous specific details are set forth in order to provide a thorough understanding of the present invention. It will be apparent, however, to one skilled in the art that the present invention may be practiced without using these specific details. In other instances, well-known methods and structures have not been described in detail so as not to unnecessarily obscure the present invention.

The present invention operates on a population of entities. The entities must possess an ability to produce an objectively observable result. To provide utility, the entities must direct their actions toward a constructive end, even if their results do not always serve those ends. The iterative process of the present invention produces a population which tends to accomplish its constructive ends better over time.

The present invention uses a value assigned to the objectively observable result produced by an entity to guide an evolutionary process for solving a problem. Entities are selected from the population in accordance with their value (which we often refer to as "fitness"). They are then retained in the population ("reproduced"), retained with slight random modification ("mutated"), or selected, in groups (typically pairs) to participate in an operation which produces a new offspring entity by combining a portion of each entity in the group (pair). This latter operation is referred to as the recombination or crossover operation.

The iterative steps of activating an entity, observing its results, assigning a value to its observed results, selecting, and then reproducing, mutating, or recombining can take place in a variety of different media. Because of their extreme behavioral plasticity, computers offer an extremely flexible medium for performing the foregoing steps; however, the same steps can be performed in other media.

Although the preferred embodiment uses computer programs as entities, using other types of entities remain within the scope and spirit of the present invention. For example, electrical circuits could provide a population for the iterative process of the present invention. The circuits could reproduce and recombine sub-circuits from two parental circuits until a circuit performing the desired behavior (function) is attained. Additionally, different automobile designs could comprise another population, with elements of the design or sub-processes of manufacture taken as different alleles for crossover and rearrangement. Additionally, a population of mechanical nanomachines could comprise another population. Nanomachines are extremely small (and potentially extremely inexpensive) machines built up from individual atoms and molecules or groups of atoms and molecules that are very much smaller than ordinary mechanical devices. Nanomachines, just like more commonplace larger machines, perform specified actions on available material. For example, a nanomachine could perform a physical action on a quantity of physical material, just as an ordinary large machine performs an action on material. The step of reproducing could then be performed on a nanomachine. Similarly, the step of mutating would be performed on a nanomachine. And, similarly, the step of recombining portions to a group of two or more nanomachines could be performed.

The precise result of the action of a machine depends on both its specified action and on the precise material provided to that machine. For example, if a machine performs the action of crushing, the result of the action of that machine when supplied with glass material is crushed glass, whereas the result of the action of that machine when supplied with plastic material is crushed plastic. If the machine performs the action of heating, shaking, squeezing, or pressing, the machine performs those actions on the particular material supplied to it.

The material supplied to a physical machine (whether of ordinary size or very small size) corresponds to the arguments supplied to a computational structure including the actual variables of the problem. The action of the machine is the same (i.e., heating) regardless of the nature of the particular material on which it is acting (e.g., glass, plastic).

The actions performed by a machine on its material need not be a physical action. For example, if the entity is an electrical machine whose action consists of the action of a primitive electrical component (e.g., a resistor, amplifier, inductor, capacitor, etc.), that machine performs its action on whatever signal (i.e., material) is supplied to it. An amplifier that increases the amplitude of an electrical signal by a factor of three can perform its amplifying action on a weak sine wave signal or a strong sawtooth wave signal.

Hierarchical compositions of machines, each performing a specified action on the particular material supplied to it, can perform certain overall tasks.

Thus, although the following description uses computer programs as entities, the description does not limit the present invention. Further, the use of sequential iteration is only a preferred embodiment. Methods for the use of parallel processing is also presented.

The Representation of the Population

The computer languages FORTRAN, COBOL, ALGOL, PL/1, FORTH, PASCAL, C, PROLOG, ADA, BASIC, etc. provide, in general, the ability to write complicated mathematical expressions, recursions, complex data structures, and symbolic expressions. Using any of these languages, one can write symbolic expressions that are executable as computational procedures (or programs) within the language itself. Also, any of these languages can generate symbolic expressions, although often this process is inconvenient and inefficient. In general, most computer languages do not allow arbitrarily complex expressions to be written. Also, most do not delay assigning actual computer memory (and types) in the computer for such expressions until just prior to actual execution of the expression. Such a memory management method is termed dynamic storage allocation.

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" has started to emerge as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated", and treating the remaining elements of the list as arguments to that function. Moreover, unless otherwise indicated, LISP reads, evaluates, and returns a value for each such function it encounters. Thus, in LISP, entire computer programs can appear as merely function invocations within function invocations within yet more function invocations (often called "compositions" of functions and terminals or more simply a "composition" of functions). Applying functions to arguments as encountered controls the flow of LISP programs. In other words, the control structures in LISP are based on the composition of functions.

Within the outermost pair of parentheses in LISP, there may be numerous functions and operators, including functions for performing arithmetic, functions for performing recursions, functions for modifying symbolic expressions, functions for conditionally varying the program flow, and other complex functions. A key feature of LISP is that LISP programs have the same form as the data they manipulate. As the above features indicate, LISP is a functional programming language. LISP is not the only existing functional programming language nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

For example, consider the simple mathematical expression ordinarily written as 5*4−3*2. To evaluate this expression, one must start by first evaluating 5*4. One evaluates 5*4 by performing the function of multiplication (*) on the two arguments (5 and 4). The basic structure in LISP is a list of items (that is, an ordered set of items contained within a set of parentheses). Moreover, unless otherwise indicated, LISP treats the first item in every list encountered as a function and the remaining items in the list as arguments to that function. Thus, LISP represents 5*4 as (*54). Here a function (i.e. the multiplication function denoted by *) is the first item of the list and the two arguments to the function (i.e. the two numbers to be multiplied) follow. Similarly, LISP denotes 3*2 as (*32). Once these two multiplications are executed (evaluated), the subtraction function then has the two arguments (i.e. 20 and 6). The two values obtained by evaluating these two multiplication functions are treated as arguments to the subtraction function which performs the operation of subtraction, which is (−(*54) (*32)). Expressions such as (−(*54) (*32)) in LISP are called symbolic expressions (S-expressions). Here the function of subtraction (−) is performed on the results previously obtained for (*54) and (*32). When a simple number or variable is used as the argument of a function (such as the 3 or 2 in the multiplication 3*2), it is called an "atomic" argument. The contrasting situation occurs with a composition of functions when the argument to one function is itself the result of carrying out an earlier (embedded) computation. We can represent increasingly complex mathematical expressions by embedding previous results within new expressions in this manner.

It is helpful to graphically depict a functional programming language's expressions. Functional expressions can be viewed graphically as a tree with labels on the various points of the tree. In particular, any such expression can be viewed as a rooted point-labeled tree in which the internal points of the tree are labeled with functions and the endpoints of the lines radiating downwards from each such internal point is labeled with the arguments to that function. The term "downwards" in connection with rooted-point labeled trees means extending farther away from the root of the tree. The external points of the tree (sometimes called "leafs") are labeled with the terminals. The root of the tree is the particular internal point labeled with the function executed last. In a LISP S-expression, the first function is the outer-most LISP function (i.e. the function just inside the outermost left parenthesis of the LISP S-expression).

FIG. 1 illustrates this for LISP using the equation 5*4−3*2. In the ordinary notation of arithmetic shown as equation 100, the function 104 (multiplication) operates on the arguments 102 and 106 (i.e. 5 and 4 respectively) and the function 112 (multiplication) operates on the arguments 110 and 114 (i.e. 3 and 2 respectively). The function 108 (subtraction) then operates on the results of these two functions as its arguments. The function 108 is higher in the hierarchy than the functions 104 and 112.

In FIG. 1, the LISP S-expression 120, (−(*54) (*32)) is expressed as the function 124 (multiplication) operating on the arguments 126 (the number 5) and 128 (the number 4) and the function 130 (multiplication) operating on the arguments 132 (the number 3) and 134 (the number 2). The function 122 (subtraction) then operates on the results of these two evaluations.

When presented graphically in FIG. 1, the internal point 150 of the tree 130 with root 140 is labeled with the function of multiplication (*) and the external points 156 and 158 of the tree are labeled with the two arguments to the multiplication function (i.e. 5 and 4 respectively). The arguments to a given function (such as the multiplication function denoted by the internal point 150) are found by following the lines 152 and 154 radiating downwards from the internal point 150. Similarly, the internal point 160 of the tree is labeled with the function of multiplication and the external points of the tree 166 and 168 are labeled with the two arguments to the multiplication function (i.e., 3 and 2, respectively). The arguments to the function 160 are found by following the lines 162 and 164 radiating downwards from the internal point 160. The internal point of the tree 140 is labelled with the subtraction function. The arguments to the subtraction function are found by following the lines 142 and 144 radiating downwards from point 140. These arguments turn out to be the results of the previously performed multiplication operations. Arguments may be found at external points (if they are terminals) or at internal points (i.e. when the arguments to one function, such as subtraction here at 140, are the result of previous functions). The internal point 140 is the root of the tree and is labeled with the outermost function (subtraction). Internal point 140 is equivalent to point 122 in the LISP S-expression 120 (i.e., the function just inside the outermost left parenthesis of the LISP S-expression).

The advantage of a computer language such as LISP for performing work of this kind derives from the enormous flexibility arising from repeated applications of this very simple basic structure. The functions available in LISP can include functions other than the simple arithmetic operations of multiplication and subtraction. They include more complex mathematical functions such as square roots, exponentiation, etc; program control functions such as PROGN which allow a series of LISP expressions to be performed in succession; recursions (wherein a function refers to itself in the process of evaluating itself); iterative functions (such as DOTIMES) which cause certain functions to be performed repeatedly (typically with differing arguments); conditional functions [which cause specified alternative functions to be performed if some predicate function is (or is not) satisfied]; and symbolic functions which operate on symbols (instead of numbers).

By way of an example, suppose we want a computer program to begin by printing the symbolic string "HELLO"; then set the variable C to the sum of the variables A and B; and, then print the value of C only when C is greater than 4. In FIG. 2, the LISP S-expression (i.e. program) 700 performs these tasks. The function 701 PROGN allows a series of 3 major steps to be combined together into one program. The first major step of the series involves the function 702 (PRINT) operating on the string terminal 704 ("HELLO"). The second major step involves the function 706 (SETQ) operating on a variable 708 (C) and the result obtained from the function 710 (addition) operating on the arguments 712 (the variable A) and 714 (the variable B). The SETQ function assigns a value (its second argument) to a variable (its first argument). Finally, the third major step involves the conditional function 716 (WHEN) operating on two arguments. The first argument is a predicate function involving the relationship 718 (greater than) operating on the arguments 720 (the variable C) and 722 (the number 4). The second argument is the function 724 (PRINT) operating on the terminal 726 (the variable C).

Graphically, this LISP program (S-expression) can be represented as a tree whose internal points are labeled with functions and where the endpoints of the lines radiating downwards from each such internal point is labeled with the arguments to that function. In this graphical representation, one of the internal points is the root of the tree and the root is labeled with the function that appears just inside the first left parenthesis of the LISP S-expression.

Here, the root of the tree 730 is labeled with the function PROGN. The function PROGN has 3 arguments. The 3 lines 732, 734, and 736 radiating downwards from the internal point 730 (the root) correspond to the 3 arguments of PROGN. The first argument of PROGN is function 738, the PRINT function. It is the endpoint of the first line 732 radiating downwards from internal point 730. The function PRINT has one argument 740. In the case of the PRINT function, it has one argument which it prints. In this case, the argument is the string 740 "HELLO". This string 740 "HELLO" is an atomic argument (terminal) and appears at an external point (leaf) of the tree.

The second argument of PROGN is function 742, the SETQ function. The function SETQ has two arguments 744 and 746. The second argument of SETQ is itself a function 746 (addition) operating on the two arguments 748 (the variable A) and 750 (the variable B). The two arguments 748 and 750 are the variables A and B (terminals). They appear at external points (leafs) of the tree. The first argument of SETQ is 744 (the variable C) which is set to the sum of the values of A and B.

The third argument of PROGN is function 752, the WHEN function. The function WHEN has two arguments, 754 and 756. The first argument of the WHEN function is a predicate function 754 (greater than). The predicate function 754> has two arguments 758 (the value of variable C) and 760 (the number 4). The predicate function 754> returns a value of T (for "True") or NIL (for "False") depending on whether its first argument 758 (the value of the variable C) is greater than its second argument 760 (the number 4). The WHEN function executes its second argument 756 (the PRINT function) if its first argument 754 evaluates as true. The PRINT function 756 has one argument 762 (the numeric value of the variable C). Note that the PRINT function is flexible; it can accommodate a string argument (such as "HELLO" at 740) or a number (such as the value of variable C at 762).

Although LISP can be run on virtually any computer, it is preferable to use a computer especially designed for performing LISP functions. The Texas Instruments Explorer II+ computer is particularly advantageous for these purposes because it contains an especially designed microprocessor chip (called the Mega Chip) which performs LISP functions directly. The Mega Chip contains basic microcode that corresponds directly to the basic operations of LISP. A conventional microprocessor chip (such as the Intel 80286 contained in the IBM AT computer) can be programmed to carry out the various LISP functions by applying its generic computer instructions to the requirements of LISP.

Moreover, it is especially advantageous to run LISP programs on computers with large amounts of internal memory because the complex structures that one develops using LISP in applications such as are described here often require large amounts of memory. To the extent that computer memory is not available as internal memory in a given computer, significant inefficiencies in operation result. Since the solution to problems often require complex structures, significant inefficiencies may make the difference between being able to solve the problem or not being able to solve the problem. The preferred embodiment of the present invention uses an Explorer II+ computer with 32,000,000 bytes of internal memory (32 megabytes). A typical computer configuration is depicted in FIG. 32. It will be understood that while FIG. 32 is useful in providing an overall description of the computer system of the present invention, a number of details of the system are not shown. Referring to FIG. 32, the computer system of the currently preferred computer embodiment generally comprises a bus 100 for communicating information coupled to a processor 101. A random access memory (RAM) 102 (commonly referred to as main memory) is coupled to bus 100 for storing information and instructions for processor 101. A data storage device 103 is also coupled to bus 100 for storing data. Display device 104, such as a cathode ray tube, liquid crystal display, etc., is coupled to bus 100 for displaying information to the computer system user. A data input device 105, including alphanumeric and other key input devices, etc., is coupled to bus 100 for communicating information and command selection to processor 101 and for controlling cursor movement.

After generating a population of computational procedures, these procedures are executed and a value in the environment involved is assigned to the result of the execution. Thus an important requirement for any implementation of this system is the ability to generate computational procedures (computer programs) and then execute them to produce a result.

Using LISP representations on a computer having sufficient memory, the present invention can solve problems previously intractable under prior art methods. This disclosure presents a general method and specific examples of the present invention. First, the process itself is described. Secondly, two examples of its operation are presented. The examples illustrate the operation of the present invention dealing with solving linear equations and inducing sequences.

Processing Logic of the Preferred Embodiment

FIG. 3 is a flow chart of the processes of the present invention. The process 1300 starts by the step Create Initial Population 1302 which creates (typically randomly) a population of programs. In one embodiment, the creation of the programs begins with a result-producing main program component. The result-producing main program component is a random composition of the primitive functions of the problem, the actual variables of the problem, and the functions defined within the current individual. Each of the function definitions contained in the present individual are created in the initial random generation and are comprised of the primitive functions of the problem and a specified (possibly zero) number of dummy variables (i.e., formal parameters) which vary in general among the defined functions of the individual. In the most general case, not only the primitive functions of the problem are contained within the function definitions, but also references to other defined functions within the current individuals. Finally, the function definitions can also contain the actual variables of the problem by which the program is called. It should be noted that although a program is the currently preferred computer embodiment of the entity, the term entity will be used throughout the discussion of FIG. 3.

The process then begins to operate upon the population. If the termination test for the process 1304 is satisfied (for example, by achieving a known best solution to the problem among the population of individuals, by achieving a certain degree of fitness for the population, etc.), the process terminates at End 1301. Otherwise, the process continues to iterate.

The basic iterative loop of the process for the evolving population begins with the step Execute Each Entity 1306 wherein at least one entity executes. The next step, Assign Values and Associate Values with each Entity 1312, involves assigning a value (fitness) to each result produced by execution, and associating the value with the producing entity. After assigning and associating, Remove Entity(s) with relatively low fitness, step 1314, causes the removal of some of the less fit members of the population (the term "entity(s)" used herein refers to the phrase "entity or entities"). Although not essential, step 1314 improves the average fitness and eases memory requirements by keeping the population within reasonable limits. Step 1316, Select Entity with relatively high fitness values, picks at least one entity to use in the following operation. The selected entity(s) have a relatively high fitness value.

At step 1318, Choose an Operation to Perform, the process determines which operation to begin. Crossover 1320 and Reproduction 1330 are the basic operations performed; however, Permutation 1340 also plays a role. Optionally, the operation of Mutation 1350 or Define Building Block (encapsulation) 1370 may be used. Typically, the vast majority of operations are the reproduction and crossover operations.

Note that the same individual may be selected more than once (i.e., replacement is allowed). It should be recognized that there are numerous slight variations of the overall process possible. Some of these variations can be used as a matter of convenience.

Crossover 1320 requires a group of at least two entities (typically two parents), so second entity(s) are picked to mate with at least one selected entity(s). There are various methods for choosing the second parent or parents. Generally, choosing only relatively high fitness individuals is preferable over choosing randomly. Parents mate by matching selected entity(s) with at least one second picked entity(s). For each mating, a crossover point is separately selected at random from among both internal and external points within each parent at Select Crossover Points 1322. Then newly created entities are produced at Perform Crossover 1324 from the mating group using crossover. Two parents would typically produce two offspring.

Note also no requirement exists that the population be maintained at a constant size. The version of the crossover operation producing two offspring from two parents has the convenient attribute of maintaining the population at constant size. (Note that the other operations each produce one offspring from one parent so that they too maintain constant population size). On the other hand, if the crossover operation acts on a group of more than two parents, the size of the population may grow. For example, if three parents formed a mating group, each parent could have two crossover points selected for it and there could be 27 possible offspring ($3 \times 3 \times 3$). Even if the three offspring equivalent to the three original parents are excluded, there would be 24 possible new offspring available. In general, if there are N parents, then N−1 crossover points could be selected for each and there could be $N^N - N$ new offspring available. When an operation produces more offspring than parents, then either the population can be allowed to grow or the population can be trimmed back to a desired (presumably constant) size when the next round of fitness proportionate reproduction takes place.

For the operation of Reproduction 1330, the Selected entity(s) remain unchanged. The preferred method for selecting computational procedures for reproduction is to select them with a probability proportional to their normalized fitness. It is also possble to use tournament selection or other methods of success.

If the permutation operation is selected then the process continues at Permutation 1340. A permutation point is selected at random in Select Permutation Point 1342 from among the internal points within the selected individual. Then Perform Permutation 1344 is performed, by reordering the selected entity's arguments at the permutation point.

If the mutation option is chosen, Mutation 1350 occurs. The locations of the mutation are picked in Select Mutation Point 1352 for each Selected entity. Perform Mutation 1354 then randomly generates, for each mutation location in each Selected entity, a portion of an entity and inserts it at the mutation point. The portion inserted is typically a sub-entity tree, but may be a single point.

If the Define Building Block (encapsulation) operation 1370 is chosen, a new function is defined by replacing the sub-tree located at the chosen point by a call to the newly encapsulated building block. The body of the newly encapsulated building block is the sub-tree located at the chosen point. The newly encapsulated building blocks can be named DF0, DF1, DF2, DF3, . . . as they are created.

The editing operation 1380 recursively applies a pre-established set of editing rules to each S-expression in the population. In all problem domains, if any subexpression has only constant terminals as arguments and only side-effect free functions, the editing operation will evaluate that sub-expression and replace it with the value obtained. The define building block (encapsulation) operation and editing operation are described in more detail below.

Finally, the newly created entities are inserted into the population at 1360 and the process returns to the termination test 1303.

The first step in the iterative process involves activating an entity from the evolving population. Activation means having the entity attempt to accomplish its goal, producing an objective result. In the preferred embodiment, entities are computer programs, so activation requires executing the programs of the population. The second step in the process assigns a fitness value to the objective result, and associates that fitness value with its corresponding entity. For computer programs, the fitness value is generally a number, or a vector, which reflects the program's execution, although the fitness value could be any symbolic, numeric or structured representation used on a computer, provided they can be ordered.

In general, some of the entities will prove to be better than others when a value is assigned to them after their interaction with the "environment" of the problem. The best value (fitness) may be the lowest number (as is the case here where we are measuring the aggregated deviation between a result and a known perfect solution). In other problems, the best value (fitness) may be the highest number (e.g. scoring direct "hits"). The value (fitness) assigned may be a single numerical value or a vector of values, although it is often more convenient that it be a single numerical value. It should be noted that the fitness could also be a symbolic value as long as a partial ordering is established over the set of symbols. Also in many problems, the best value is not known. However, even in such problems, it is known whether lower (or higher) numbers connote better fitness and the best value attained by the process at a given time can be identified.

A useful method for organizing raw fitness values involves normalizing the raw fitness values, then calculating probabilities based on the normalized values. The best raw fitness value is assigned an adjusted fitness of 1, the worst value is assigned an adjusted fitness value of 0, and all intermediate raw fitness values are assigned adjusted fitness values in the range of 0 to 1. The probability of an individual being selected can be determined in one of several ways. One way is that the probability of being selected is determined by the equation:

$$P(i) = \frac{f_i}{\sum_{j=1}^{n} f_j}$$

Where P(i) is the probability of selection for individual i having an adjusted fitness of $f_i$, and n is the total number of entities in the population. Thus, an individual's probability of being selected equals the individual's adjusted fitness value divided by the sum of all the adjusted fitness values of the population. In this way, the normalized fitness values range P(i) between 0 and 1, with a value of 1 associated with the best fitness and a value of 0 associated with the worst, and the sum of all the probabilities equals 1. Note that fitness proportionate reproduction requires activation of all the entities in the evolving population in order to compute the sum of the adjusted fitness values $f_j$ needed in the above calculation.

Another way of selecting an individual is called "tournament selection". In tournament selection, two individuals are randomly selected from the population; their fitness is compared; and, the better of the two individuals is selected. This "tournament" method of selection requires less computer time and does not require the centralized computation of the sum of the adjusted fitness values $f_j$. In effect, this method relies upon the relative ranking of the fitness values, rather than their exact numeric values.

However, if computer time and the centralized computation is not a concern, the "fitness proportionate reproduction" method is generally to be preferred.

It may also be desirable to remove individual computation procedures from the evolving population with relatively poor fitness values. In practice, it may also be convenient to defer this activity briefly until a new generation of individuals is created.

It is a key characteristic of this overall process that the new population of individuals tends to display, over a period of time, increasing average value (fitness) in the environment involved. Moreover, another characteristic of this overall process is that if the environment changes, the new population of individuals will also tend to display, over a period of time, increasing average value (fitness) in the new environment involved.

At any given time, there is one individual (or more) in every finite population having a single fitness value that is the best amongst that population. Moreover, some environments have a known best fitness value. Examples are when fitness is measured as deviation from a known answer (e.g. a linear equations problem) or number of matches (e.g. a sequence induction problem). Alternatively, a mixed strategy may be used in determining fitness wherein a mix of pure strategies is used instead of a pure optimum strategy.

The present invention's process may occasionally generate an individual whose value (fitness) happens to equal the known best value. Thus, this overall process can produce the best solution to a particular problem. This is an important characteristic of the overall process, but it is only one characteristic. Another important characteristic (and the one which is more closely analogous to nature) is that a population of individuals exists and is maintained which collectively exhibits a tendency to increase its value (fitness) over a period of time. Also, by virtue of the many individuals with good, but not the very best, fitness values the population exhibits the ability to robustly and relatively quickly deal with changes in the environment. Thus, the variety in the population lowers its overall average value (fitness); additionally, the population's variety gives the population an ability to robustly adapt to changes in the environment.

In executing the overall process, it is often convenient to mark the one (or perhaps more) individuals in the population with the best fitness value amongst that population at any given time. Such marked best individuals are then not subject to removal (as parents), but are instead retained in the population from generation to generation as long as they remain the best. This approach prevents loss of the most fit individual in the population and also provides a convenient reference point for analytical purposes. If the problem involved happens to have a known best solution, after a certain number of generations the best individual will often be the known best solution.

The third step involves selecting entities which will be used to perform operations. A number of selection methods exist which tend to select entities of relatively high value. The theoretically most attractive way to select individuals in the population is to do so with a probability proportionate to their fitness values (once so normalized between 0 and 1). Thus, an individual with fitness of 0.95 has 19 times greater chance of being selected than an individual of fitness value 0.05. Occasionally individuals with relatively low fitness values will be selected. This selection will be appropriately rare, but it will occur.

If the distribution of normalized fitness values is reasonably flat, this method is especially workable. However, if the fitness values are heavily skewed (perhaps with most lying near 1.00), then making the selection using a probability that is simply proportionate to normalized fitness will result in the differential advantage of the most fit individuals in the population being relatively small and the operation of the entire process being prolonged. Thus, as a practical matter, selection is done with equal probability among those individuals with relatively high fitness values rather than being made with probability strictly proportionate to normalized fitness. This is typically accomplished by choosing individuals whose fitness lies outside some threshold value.

In connection with selection of individuals on the basis of fitness, we use the phrase "relatively high value" herein to connote either selection based on a probability proportionate to normalized fitness (the preferred approach), tournament selection (the time-saving approach), or selection with equal probability among those individuals having fitness values outside some threshold. In practice, choosing individuals from the best half with equal probability is a simple and practical approach, although fitness proportionate selection is the most justified theoretically.

After completing selection, the fourth step requires choosing an operation. The possible operations include crossover, permutation, and reproduction. In addition, mutation and define building block (encapsulation) operations are available. The preferred operation is crossover, followed by reproduction, and lastly permutation. However, this preference is only a generalization, different preferences may work better with some specific examples. Thus the choice of operations should mainly be the preferred operation; but that choice should remain flexible to allow for solving differing problems.

As will be seen below, the key operation for introducing new individuals into the population is the crossover operation. To illustrate the crossover operation for this example, a group of two individuals is selected from among the population of individual S-expressions having relatively high fitness values, although, it is not necessary to limit the size of the group selected to two. Two is the most familiar case since it is suggestive of sexual reproduction involving a male parent and a female parent. The underlying mathematical process can obtain effective results by "crossing" hereditary information from three or more parents at one time. However, the key advantage of being able to combine traits from different individuals is attained with two parents. In its preferred form, all of the individuals in the group of parents have relatively high fitness values. In its most general form, the requirement is only that at least one of the individuals in the group of parents has a relatively high fitness value. The other parents in the group could be any member of the population. In either case, all mating involves at least one parent with relatively high fitness values.

For purposes of this example problem, assume that a group of two parents with relatively high fitness values has been selected. The group of parents is now used to create two new individuals. FIG. 4 graphically illustrates a simple example of mating two parents to produce two new offspring for the example problem involving linear equations. It should be noted that there need not be precisely two offspring and some versions of the basic concept here produce only one offspring (or can produce more than two offspring).

Parent 1 is the computational procedure 400:

(−(+(+B1 B2) A11) (*B2 A12))

This computational procedure can also be represented by the rooted point-labeled tree with root 410. Root 410 is the subtraction function and has lines to two arguments, internal nodes 412 and 413. Node 412 is the addition function having lines to internal node 414 and leaf 417 (the variable A11), its arguments. Node 414 is the addition function having lines to leafs 415 and 416 (the variables B1 and B2, respectively). The root 410's second argument, node 413, is the multiplication function having lines to leafs 418 and 419 (the variables B2 and A12, respectively), its two arguments. Sub-tree 411 comprises 413, 418, and 419. Parent 2 is the computational procedure 420, (−(*B1 A22) (−B2 A11)). This computational procedure can also be represented as the rooted point-labeled tree with root 430. Root 430 is the subtraction function and has lines to two arguments, internal node 432 and 434. Node 432 is the multiplication function having lines to arguments as leafs 435 and 436 (the variables B1 and A22, respectively). Node 434 is the subtraction function having lines to arguments at leafs 437 and 438 (the variables B2 and A11, respectively). Tree 421 comprises 430, 432, 435 and 436, which is all of parent 2 except for the root 430's second argument.

In the currently preferred embodiment, selecting the crossover point starts by counting up the internal and external points of the tree. The tree with root 410 has 9 points (410, 412, 413, 414, 415, 416, 417, 418, and 419). One of the 9 points (410, 412, 413, 414, 415, 416, 417, 418 and 419) of the tree for parent 1 (that is, the tree with root 410) is chosen at random as the crossover point for parent 1. A uniform probability distribution is used (so that each point has a probability of 1/9 of being selected). In this figure, point 413 is chosen. Point 413 happens to be an internal point of the tree.

Similarly, one of the 7 points (430, 432, 434, 435, 436, 437 and 438) of the tree for parent 2 (that is, the tree with root 430) is chosen at random as the crossover point for parent 2. In this figure, point 434 is chosen. Point 434 happens to be an internal point of the tree. Each of the 7 points has a uniform probability of 1/7 of being chosen.

Offspring 2 is produced by combining some of the traits of parent 1 and some of the traits of parent 2. In particular, offspring 2 is produced by substituting the sub-tree 411 (sub-procedure), beginning at the selected crossover point 413 [namely, (*B2 A12)] of parent 1, into the tree 421 of parent 2 at the selected crossover point 434 of parent 2. The resulting offspring 470 thus contains the sub-procedure 411 (*B2 A12) from parent 1 as a sub-procedure at point 474, which is attached to the second line from root 430 of tree 421. It is otherwise like parent 2 [that is, it has a root labeled with the subtraction function having (*B1 A22) as its first argument]. This particular mating produces the computational procedure 460, (−(*B1 A22)(*B2 A12)), which is the known correct solution for the first variable x1 for a pair of two linear equations in two variables. In other words, the crossover involving parents 1 and 2 (neither of which were the correct solution to the linear equations problem) using the crossover points 413 and 434 happened to produce an offspring with best fitness (i.e. the known correct solution to the problem).

Offspring 1 is produced in a similar fashion by combining some of the traits of parent 1 and some of the traits of parent 2. In this case, the complementary portions of each parent combine. In particular, offspring 1 is produced by substituting the sub-tree (sub-procedure)

beginning at the crossover point 434, [(−B2 A11)] of parent 2, into the tree of parent 1 at the crossover point 413 of parent 1. The resulting offspring 450 thus contains the sub-procedure (−B2 A11) from parent 2 as a sub-procedure at point 454. It is otherwise similar to parent 1. Root 452 is the subtraction function having lines to arguments at internal nodes 442 and 454. Node 442 is the addition function having lines to arguments at internal node 445 and leaf 444 (the variable A11). Internal node 445 is the addition function having lines to arguments at leafs 446 and 448 (the variables B1 and B2, respectively). Node 454 is the subtraction function having lines to arguments at leafs 456 and 458 (the variables B2 and A11, respectively).

If two external points (leafs) of the tree had been chosen as crossover points, the crossover would have proceeded similarly with the labels (i.e. arguments) for the two points being exchanged. FIG. 5 illustrates the mating of two parents with crossover occurring only at external points (leafs) for the linear equations example problem. The first parent 500, (−(*A11 A12 A21)B1), is represented by the tree with root 510. Root 510 is the subtraction function having lines to arguments at internal node 515 and leaf 512 (the variable B1). Node 515 is the multiplication function having lines to arguments at leafs 516, 517, and 518 (the variables A11, A12, and A21, respectively). External point (leaf) 512 has been chosen at random as the crossover point for the first parent and contains the variable terminal B1. Note that, for purposes of illustrating the generality of functions, one of the functions (*) has 3 arguments (A11, A12 and A21) in this particular figure. The second parent 520 is represented by the tree with root 530. Root 530 is the subtraction function having lines to arguments at leafs 534 and 532 (the variables A22 and B2, respectively). External point (leaf) 532 has been chosen as the crossover point for the second parent and contains the variable terminal B2.

The result of the crossover operation is two new offspring 540 and 560. The first offspring 540, (−(*A11 A12 A21)B2), is represented by the tree with root 550. Root 550 is the subtraction function having lines to arguments at internal node 545 and leaf 552 (the variable B2). Node 545 is the multiplication function having lines to arguments at leafs 546, 547, and 548 (the variables A11, A12, and A21, respectively). This tree is identical to the tree with root 510 (i.e. parent 1) except that external point (leaf) 552 is now the argument B2 (instead of B1) from parent 2. The second offspring 560, (−A22 B1), is represented by the tree with root 570. Root 570 is the subtraction function having lines to arguments at leafs 574 and 572 (the variables A22 and B1, respectively). This tree is identical to the tree with root 530 (i.e. parent 2) except that external point (leaf) 572 is now the terminal B1 (instead of B2) from parent 1. Thus, the terminals B1 and B2 have been crossed over (exchanged) to produce the two offspring.

FIG. 6 illustrates the mating of two parents with crossover occurring at one internal point (i.e. a point labeled with a function) and one external point (i.e. a point labeled with a terminal). The first parent 600, (+(+A11 A12) (*A21 A22)), is represented by a tree with root 610. Root 610 is the addition function having lines to arguments at internal nodes 602 and 612. Node 602 is the addition function having lines to arguments at leafs 604 and 606 (the variables A11 and A12, respectively). Node 612 is the multiplication function having lines to arguments at leafs 614 and 616 (the variables A21 and A22, respectively). Internal point 612 has been chosen as the crossover point for the first parent. The second parent 620, (−(−B1 B2) (*B3 B4)), is represented by a tree with root 630. Root 630 is the subtraction function having lines to arguments at internal nodes 622 and 624. Node 622 is the subtraction function having lines to arguments at leafs 632 and 629 (the variables B1 and B2, respectively). Node 624 is the multiplication function having lines to arguments at 628 and 626 (the variables B3 and B4, respectively). External point 632 has been chosen as the crossover point for the second parent.

The result of the crossover operation is two new offspring. The first offspring 640, (+(+A11 A12)B1), is represented by the tree with root 650. Root 650 is the addition function having lines to arguments at internal node 654 and leaf 652 (the variable B1). Node 654 is the addition function having lines to arguments at leafs 656 and 658 (the variables A11 and A12, respectively). This tree is identical to the tree with root 610 (i.e. parent 1) except that the second argument 652 of the function + 650 (addition) is now the single argument (terminal) B1 from parent 2. The second offspring 660, (−(−(*A21 A22)B2) (*B3 B4)), is represented by the tree with root 670. Root 670 is the subtraction function having lines to arguments at internal nodes 678 and 684. Node 678 is the subtraction function having lines to arguments at internal node 672 and leaf 682 (the variable B2). Node 672 is the multiplication function having lines to arguments at leafs 674 and 676 (the variables A21 and A22, respectively). Node 684 is the multiplication function having lines to arguments at leafs 686 and 688 (the variables B3 and B4, respectively). This tree is identical to the tree with root 630 (i.e. parent 2) except that the internal point 672 (i.e. the first argument 678 of the subtraction function 670) is now a function (multiplication) instead of the variable terminal B1.

Thus, regardless of whether internal or external points are selected as crossover points on the trees of the parents, the result of the crossover operation is that offspring are produced which contain the traits of the parents. In fact, the offspring resulting from crossover consist only of sub-procedures from their parents. To the extent this is not entirely the case in actual practice, the result can be viewed as having been the result of applying crossover to the parents and then allowing a mutation (random variation) to occur. The crossover operation has the properties of closure and being well-defined.

Occasionally, a given individual may be mated with itself. In the conventional genetic algorithm involving binary strings, crossover with identical parents merely creates two copies of the original individual. When computational procedures are involved, an individual mating with itself generally produces two different individuals (unless the crossover points selected happen to be the same).

The three examples of mating with crossover were presented above in terms of the graphical representation of the computational procedures. Graphical representations are especially suited to demonstrating the "cut and paste" character of the crossover operation. In addition, the graphical method of representation is a general way of representing functions and the objects they operate on (whether computational procedures or machines) and is also not inherently associated with any particular programming language or any particular mode of implementation. As previously discussed, the computer language LISP is preferred for actually implementing these processes on a computer.

In FIG. 6, the mating of two parents with crossover occurring at one internal point and one external point is illustrated. FIG. 6 will be referred to in the following discussion since it encompasses the principles involved in both FIGS. 4 and 5. Parent 1 in FIG. 6 was the LISP computational procedure (+(+A11 A12) (*A21 A22)) and parent 2 in FIG. 6 was the LISP computational procedure (−(−B1 B2) (*B3 B4)). Using LISP computational procedures, the mating of the two parents is implemented in the following way.

First, the number of functions and terminals in the LISP S-expression 600 in FIG. 6 are counted. For LISP S-expression 600, there are 3 functions (i.e. 2 occurrences of + and 1 occurrence of *) and there are 4 terminals (i.e. A11, A12, A21 and A22). The total count is 7. This counting can be easily performed in LISP in a variety of well-known ways. One especially simple way makes use of such basic LISP functions as CAR and CDR, which are built into the microcode of microprocessor chips that are especially designed to handle LISP (such as found in the Texas Instruments Explorer II+ computer). The CAR function in LISP allows one to examine the first item of any list. Here the first item in computational procedure 600 is the first+ function (i.e. the addition function appearing just inside the outermost left parenthesis). The "+" is identified as a function and included in the overall count. Meanwhile, the CDR function eliminates the first item of the list by returning a list comprising all but the first item. Thus, the remainder of the computational procedure (which is now smaller than the original computational procedure 600 by the first element +) can be subjected to similar handling in a recursive way.

Secondly, having counted the number of functions and terminals in the computational procedure 600, a random number generator is called to select a number between 1 and 7. Typically, a uniform probability distribution (i.e. probability of 1/7 for each of the 7 possibilities) is used. Such random number generators are well-known in the art and often included in a package of utility functions provided by computer manufacturers to users of their computers. Texas Instruments provides a random number generator for generating a random integer within certain bounds using a uniform probability distribution. If the random number generator selects the integer 5, then the multiplication function * (shown graphically at point 612) would be chosen as the crossover point for parent 1. This identification is most simply accomplished by numbering the functions and terminals in the same order as the counting function encountered them (although any ordering might be used for this purpose). In particular, the crossover point is the first element of the sub-list (*A21 A22). This sub-list is the third element of the list 600. Note that in LISP, a computational procedure is represented by a list—an ordered set of items found inside a pair of parentheses.

Similarly, the functions and terminals in computational procedure 620 can be counted. The count for parent 2 would thus also be 7. In this example, the terminal B1 is selected as the crossover point for parent 2. This terminal happens to be in the second top-level element of the list 620—namely, the sub-list (−B1 B2). In fact, B1 is the second element of this second top-level element of list 620.

The third step involves finding the "crossover fragment" for each parent. When the crossover point for a given parent is a terminal, then the "crossover fragment" for that parent is simply the terminal. Thus, for example, the crossover fragment for parent 2 is the terminal B1. On the other hand, when the crossover point for a given parent is a function, then the "crossover fragment" for that parent is the entire list of which the function is the first element. Thus, for example, the crossover fragment for parent 1 is the entire list 692, which is (* A21 A22). By producing a "crossover fragment", portions of each parent combine to produce offspring.

In the above case, the "crossover fragment" list has no sub-lists. However, if this list contained a sub-list (that is, an argument that was itself a function of other arguments), then it is carried along also. This point about sub-lists can be easily illustrated by supposing that the first element of list 600 had been chosen as the crossover point (instead of the multiplication * function). This first element is the function +. Then the crossover fragment associated with this crossover point is the entire original list 600—that is, the list consisting of the function + and the 2 sub-lists (+A11 A12) and (* A21 A22).

The fourth step is to produce offspring 1. Offspring 1 is produced by allowing parent 1 to perform the role of the "base" ("female") parent and parent 2 to perform the role of the "impregnating" ("male") parent. In general, an offspring is produced within the female parent by replacing the crossover fragment of the female parent with the crossover fragment of the male parent. In particular, the crossover fragment 692 of the female parent [the entire list (* A21 A22)] is replaced within the female parent by the crossover fragment 691 of the male parent (the terminal B1). The resulting offspring 1 (640) is:

(+(+A11 A12) B1)).

The fifth step is to produce offspring 2. Offspring 2 is produced by allowing parent 2 to perform the role of the "base" ("female") parent and parent 1 to perform the role of the "impregnating" ("male") parent. In particular, the crossover fragment 691 of the female parent (the variable terminal B1) is replaced by the crossover fragment 692 of the male parent, which is the list (* A21 A22). The resulting offspring 2 (660) is thus: (−(−(* A21 A22) B2) (* B3 B4).

Thus, two parents can produce two offspring. In some variations of the process, only one offspring is produced from a designated male-female pair; however, it is most convenient to have two parents produce two offspring (since, among other things, this produces the convenient, although not necessary, side effect of maintaining the population size at a constant level). In this preferred implementation of the crossover process, each offspring is composed of genetic material that came from either its male parent or its female parent. The genetic material of both parents finds its way into each one of the two offspring.

In some embodiments there are further restrictions placed on the structure of the entities (programs) created. Each point in the tree representing an entity has associated with it both a type and a category. An example of a particular type might be "arithmetic function." Because arithmetic functions, such as "+" are capable of operating only on numeric values, we specify that any time an entity is created such that it includes a function of the type "arithmetic function", the creation process is then constrained so that the arguments that are created for this function must be compatible, that is, they must be of a type such as "arithmetic function" or "numeric value." We could not use a function such as "NOT" as an argument to the function "+" because "NOT" is of the type "Boolean function." We refer to trees that have constraints on the types of functions and terminals that can appear as having a syntactically constrained structure. Trees are created in a manner that imposes this syntactic structure and the syntactic structure is preserved during the evolutionary process by the use of structure-preserving crossover, that is crossover that is constrained so that only objects of compatible (often the same) type can be crossed over. This syntactic structure can take the form of complex rules of construction, as is the case in the recursive process of genetic programming of the present invention, or it might simply take the form of requiring that the root of the tree always be labeled with a certain function, such as LIST, which returns a list composed of the values of its arguments. In this latter case, there would be two types of points in the entity, namely the "root point" type and the "any other point" type.

The second way in which the points in the trees are identified is by their category. Categories are used in the automatically defined function mechanism of the present invention to identify the meaning given to certain subtrees in the context of the functions being defined. Just as there is a process of structure-preserving crossover that preserves any syntactically imposed structure in the entities, there is also a process of category-preserving crossover that makes sure that crossover always operates between components of compatible categories.

Thus, when we are performing crossover when using the automatic function definition mechanism of the present invention and the recursion mechanism of the present invention, that crossover is required to preserve both the category and the syntactic structure of the entities in question.

For the operation of reproduction, one computational procedure with relatively high fitness is selected from among the computational procedures in the population. This computational procedure is retained in the population unchanged. The preferred method for selecting computational procedures for reproduction is to select them with a probability proportional to their normalized fitness. In other words, there is survival and reproduction of the fittest amongst the computational procedures in the population. One consequence of the reproduction operation is that individuals in the population with relatively low fitness values are progressively removed from the population.

It should be noted that the reproduction operation introduces nothing new into the population. If only reproduction operations were performed, no new individuals would be created. In fact, if only reproduction occurred, there would be progressively fewer and fewer different individuals in the population (although the average fitness of the population would tend to increase). The reproduction operation has the properties of closure and being well-defined.

Reproduction of the fittest and crossover are the basic operations for varying and improving the population of individual computational procedures. In addition, there is a permutation operation. Permutation operates on a single subject and produces a single computational procedure. The permutation operation has the properties of closure and being well-defined. FIG. 7 illustrates the permutation operation on a computational procedure.

The permutation operation is also performed on an individual in the population with relatively good fitness. One purpose of permutation is to introduce a new order among existing sub-procedures of a given computational procedure (possibly allowing some new possibility for adaptation to emerge). However, the chances of this happening are relatively remote (just as the chance of a random mutation producing a mutant with high fitness is remote).

In FIG. 7, the subject computational procedure 900, (−(−A B C) (+D E F) (* G H I)), is represented by a tree with root 910. Root 910 is the subtraction function and has lines to arguments at internal nodes 902, 912 and 914. Node 902 is the subtraction function and has lines to arguments at leafs 904, 906 and 908 (the variables A, B, and C, respectively). Node 912 is the addition function and has lines to arguments at leafs with the variables D, E, and F. Node 914 is the multiplication function and has lines to arguments at leafs with the variables G, H, and I.

Only internal points are selected for the permutation operation. To accomplish this, the internal points are counted and one of them is chosen at random from among the possibilities (typically using a uniform probability distribution). The tree with root 910 has four internal points (910, 902, 912, and 914). Once the permutation point is chosen, all the lines radiating downwards from that point are permuted (i.e. re-ordered) at random. If there are K lines radiating from a given permutation point, then there are K-factorial possible permutations. Thus, if K is 3 (as it is for internal point 902), then there are six possible permutations (i.e. 3 times 2 times 1) possible at the permutation point 902.

One of the six possible permutations is chosen at random using a uniform probability distribution over the six possibilities. One of the six possible permutations of three items permutes the items A, B, C to C, A, B. Suppose this one was chosen. The computational procedure 920, (−(−C A B) (+D E F) (* G H I)), is represented by the tree with root 930; it is the tree that results when this particular permutation is applied to the tree with root 910 using the permutation point 902. In this new tree 930, the first line 922 radiating from the internal point 932 ends with the label C (instead of A as at 904). The second line 924 radiating from internal point 932 ends with the label A (instead of B as at 906). The third line 926 radiating from internal point 932 ends with label B (instead of C as at 908). The second and third lines from 930 have the same arguments as the second and third lines from root 910. Thus, the permutation of A,B,C to C,A,B at permutation point 902 has been effected. If a particular permutation happens to exactly reverse the order of items, it is called an inversion.

If internal point 910 had been chosen as the permutation point, the computational procedure 940, (−(+D E F) (* G H I) (−A B C)), represented by the tree having root 950 could be the result. In this tree, the first line 942 radiating downwards from root 950 ends with the label + (addition). The second line 944 radiating downwards from internal point 950 ends with the label * (multiplication). The third line 946 radiating downwards from internal point 950 ends with the label − (subtraction). Thus, the three items −, +, * from tree 910 are permuted into the new order +, *, −. Each function has the same arguments as in the corresponding sub-free from the tree with root 910. If one view the permutation operation as operating on the lines radiating downwards from the chosen point of permutation, there is no fundamental difference between the permutation of arguments illustrated by 920 and the permutation of functions illustrated by 940. The two are included here for the sake of illustration. Clearly also by the same mechanism, any combination of functions and terminals can be permutated.

Another possible step in the present invention's process is mutation. The mutation operation alters a randomly selected point within an individual. It has the properties of closure and being well defined. Mutation, if performed at all, is performed on only a tiny fraction of alleles in a tiny fraction of entities in the population. It is preferably performed on randomly selected individuals in the population having a relatively high fitness. The purpose of mutation is not to accidently create a mutant individual with extremely high fitness and thereby improve the population (although there is a very remote possibility that this may happen). Mutation does, however, perform one role which is occasionally useful—namely, it provides a way to introduce (or reintroduce) new genetic material into the population.

Generally, with even a modestly sized population, all the possible gene values (alleles) will be represented somewhere in the population. This is almost certainly going to be the case in the initial population if it is at least modestly sized and if it is generated at random. In fact, a potential pitfall of priming an initial population with good individuals (especially if 100% of the initial population comes from priming) is the possibility of accidently limiting the search possibilities to only a portion of the potential search space. However, in the course of removing individuals with low fitness, there is a remote possibility that particular alleles may actually disappear completely from a population. There is also a remote possibility that later, the vanished alleles may become necessary to achieve the next level of advance in fitness. To forestall this remote conjunction of possibilities, the mutation operation may prove useful. By randomly altering an allele in a tiny number of randomly chosen individuals from time to time, the mutation operation may reintroduce a vanished allele back into a population.

The define building block (encapsulation) operation is a means for automatically identifying potentially useful "building blocks" while the process is running. The define building block operation, commonly referred to as encapsulation, is an asexual operation in that it operates on only one parental S-expression. The individual is selected in a manner proportional to normalized fitness. The operation selects a function (internal) point of the LISP S-expression at random. The result of this operation is one offspring S-expression and one new definition. The define building block (encapsulation) operation defines a new function to represent the building block and by replacing the sub-tree located at the chosen point by a call to the newly encapsulated building block. The body of the newly encapsulated building block is the sub-tree located at the chosen point. In the currently preferred embodiment, the newly encapsulated building blocks are named DF0, DF1, DF2, DF3, ... as they are created. It should be noted that the define building block (encapsulation) operation is different from the automatically defined function mechanism of present invention.

For the first occasion when a new function is defined on a given run, "(DF0)" is inserted at the point selected in the LISP S-expression. The newly encapsulated building block may then be compiled to improve efficiency. The function set of the problem is then augmented to include the new function so that, if mutation is being used, the arbitrary new sub-tree grown at the selected point might include a call to the newly encapsulated building block.

The define building block (encapsulation) operation involves a function using already instantiated variables, such that the newly defined building block is inserted as a value. An example of the defined building block operation (i.e., encapsulation) is shown in conjunction with FIGS. 12-14. Referring to FIG. 12, a simple entity is shown, namely the symbolic expression in the LISP programming language for the mathematical expression A+B*C. In LISP, this mathematical expression would be written as (+A(*BC)). The figure shows the graphical representation of this LISP symbolic expression, namely the tree with root 1900.

In this example, the define building block (encapsulation) operation works by first selecting a point typically by using a uniform probability distribution. Suppose that the point 1910 is selected. The sub-tree (sub-expression, sub-list) starting at point 1910 is then replaced by a call to the function DF0. The function in FIG. 12 has no explicit arguments. Thus, the tree with root 1900 is replaced by the tree with root 1912, as shown in FIG. 13. The new tree has the function (DF0) at point 1914, in lieu of the sub-tree starting at 1910. In LISP, the new S-expression is (+A (DF0)).

At the same time, a function DF0 is created. Its definition is shown in FIG. 14. Its definition consists of the operations shown in the tree with root 1920. In LISP, the function might be written as (DEFUN DF0 ( )

(* B C))

In implementing this operation on a computer, the sub-tree calling for the multiplication of B and C is first defined and may then be compiled during the execution of the overall run. The LISP programming language facilitates the compilation of functions during the execution of an overall run.

The effect of this replacement is that the selected sub-tree is no longer subject to the potentially disruptive effects of crossover because it is now an individual single point. The newly defined building block is now indivisible. The new encapsulation is a potential "building block" for future generations and may proliferate in the population based on fitness. Once defined, the body of the newly created building block (i.e., (*BC) in the example above) is never changed.

Also, once defined, the definition of a newly created building block is kept separate from the individuals in the population.

The editing operation provides a means to edit S-expressions as the process is running. The editing operation may be applied after the new population is created through the action of the other operations. It may be controlled by a pair of frequency parameters which specify whether it is applied on every generation or merely a certain subset of the generations and also to a fraction of the population. The editing operation is an asexual operation in that it operates on only one parental S-expression. The result of this operation is one offspring S-expression. The editing operation, if it is used at all, is typically applied to every individual S-expression in the population.

The editing operation recursively applies a pre-established set of editing rules to each S-expression in the population. First, in all problem domains, if any sub-expression has only constant terminals and side-effect free functions, the editing operation can evaluate that sub-expression and replace it with the value obtained. In addition, the editing operation applies particular sets of rules that apply to various problem domains, including rules for numeric domains, rules for Boolean domains, etc. In numeric problem domains, for example, the set of editing rules would typically include a rule that inserts zero whenever a sub-expression is subtracted from an identical sub-expression and a rule that inserts a zero whenever a sub-expression is multiplied by zero. Moreover, in a numeric problem domain, an editing rule may be included whereby the expression (*X1) would be replaced with X. In Boolean problem domains, the set of editing rules typically would include a rule that inserts X in place of (AND XX), (OR XX), or (NOT(NOT X)).

Editing primarily serves to simplify S-expressions. It can also improve performance by reducing the vulnerability of an S-expression to disruption due to crossover at points within a potentially collapsible, non-parsimonious, but useful sub-expression. For example, if an example S-expression contains a sub-expression such as (NOT(NOT X)), which is susceptible to editing down to a more parsimonious sub-expression (i.e. X), a crossover in the middle of this sub-expression would produce exactly the opposite Boolean result. The editing operation prevents that kind of crossover from occurring by condensing the sub-expression.

Note that, for each operation described above, the original parent program is unchanged by the operation. The original unaltered parental S-expression may participate in additional genetic operations during the current generation, including replication (fitness proportionate reproduction), crossover (recombination), mutation, permutation, editing, or the define building block (encapsulation) operation.

Finally, the results of the chosen operation are added to the population. When new individual computational procedures are created by any operation, they are added to the existing population of individuals. The process of executing the new computational procedures to produce a result and then assigning a value to the results can be immediately performed. Thus, if the next step terminates the iterative process, the newly created computational procedures will have a fitness value.

Note that in the above discussion the genetic process is described in terms of an iteration of steps controlled by the external controller of the process. These steps are driven by the fitness measure as determined by the external process. This does not have to be the case. Fitness can be "implicit" in the sense that it is not measured by some explicit external process, but rather is simply a function of the ability of the entity in question to survive. Entities that are more likely to survive have more chance to breed and hence their genes have a higher probability of propagating through time. This form of fitness measure is what occurs in nature. Such an implicit fitness mechanism can also be accomplished within the present invention by allowing the entities to be self activating, that is, active.

The Automatic Function Definition Mechanism

The present invention includes a process for creating an initial population and then evolving that population to generate a result. In one embodiment of the present invention, the process creates an initial population of entities. In the currently preferred embodiment, each of the entities is a computer program generated using LISP. Generally, each entity in the population has at least one internally invocable sub-entity and at least one externally invocable sub-entity, even though the number of sub-entities within each entity may vary from entity to entity. The internally invoked sub-entities are those which are called or executed by another sub-entity in the entity itself. The sub-entity which invokes the internally invocable sub-entities can be either an externally invocable sub-entity or another internally invocable sub-entity. According to the present invention, any number of these internally invoked sub-entities may be contained in any individual entity.

The externally invoked sub-entities are those which are executed or activated by the controller of the process itself. These externally invoked sub-entities are capable of containing actions and invocations of internally invoked sub-entities. They have access to material provided to the externally invoked sub-entity by the controller of the process. In the currently preferred embodiment, each of the externally invoked sub-entities can include a hierarchical arrangement of terminals, primitive functions and invocations of internally invoked sub-entities. The externally invoked sub-entities are also referred to as result-producing components or branches, where the result produced can be in the form of a value, set of values or a side-effect produced either directly or indirectly upon execution of the result-producing component (branch). According to the present invention, any number of these externally invoked sub-entities (i.e., result-producing components or branches) may be contained in any individual entity. In this manner, multiple values can be returned and multiple side effects can be performed.

Each internally invoked sub-entity is capable of including actions and invocations of internally invocable sub-entities. Furthermore, each internally invoked sub-entity may have access to the material provided to the externally invocable sub-entity. In the currently preferred embodiment, the internally invoked sub-entities can comprise hierarchical arrangements of terminals, primitive functions and invocations of internally invoked sub-entities and a set of dummy variables (i.e., formal parameters) which are structured to form a function definition. In the currently preferred embodiment, the function definitions are referred to as the function defining components or branches of the entity. These automatically defined functions can also reference or call other defined functions.

The population of entities, including both externally invoked and internally invoked sub-entities, is evolved to generate a solution to the problem. During the evolution caused by the present invention, specific operations (such as crossover or reproduction) used to promote evolution act upon the sub-entities of the population. Also during evolution, each of the entities in the population are executed (i.e., activated) by the controller of the process. During execution, each of the externally invoked sub-entities within each entity is invoked. In doing so, the externally invoked sub-entities can call (execute) internally invoked sub-entities, thereby producing some form of result (e.g., numeric value, side-effect, etc.). Thus, the externally invoked sub-entity (i.e., result-producing component) calls upon and internally invoked sub-entities (as well as the specific material/information provided, i.e., actual variables of the problem), or other functions provided, to ultimately generate a solution to the problem. This evolutionary process using externally invoked (result-producing) sub-entities which can be dependent on the influence, value and/or effect of internally invoked (function defining) sub-entities is referred to as the automatically defined function mechanism of the present invention.

More specifically, the automatic defined function (ADF) mechanism of the present invention allows one or more functions with arguments to be defined dynamically during the evolutionary process. The value(s) returned from a call to an automatically defined function (if any) depend on the current value of the arguments at the time of execution. Defining a function in terms of dummy variables (formal parameters) allows the function to be evaluated with particular instantiations of those dummy variables. Using an automatically defined function with different instantiations, thus, obviates the tedious writing or discovery of numerous sections of essentially similar code. In addition, ADFs improve the understandability of a program and highlight common calculations. Moreover, defining and making multiple uses of a function divides a problem hierarchically. As the problem increases in size and complexity, decomposition of a problem through ADFs becomes increasingly important for solving problems. Thus, the present invention allows a solution to be generated for a problem which is evolved to contain not only those functions and terminals initially provided, but also the definitions of functions that are dynamically discovered that are found useful during the evolution of a solution.

It should be noted that the automatic function definition mechanism of the present invention is different than assigning values to settable variables using an assignment operator or encapsulating a function using the define building block (encapsulation) operation, with particular actual variables of the problem. These operations utilize the actual variables of the problem, or values derived from them instead of dummy variables, and have values that are determined strictly by the time that the variable was set or by the current values of the actual variables of the problem or the state of the problem. The value of any of these is independent of the context of its use. In contrast, the result of a call to an automatically defined function is as a whole determined precisely by the context of its use, i.e., its arguments and any computations relating to them performed by the ADF.

The idea of automatic function definition has its roots in the ability of a problem to be decomposed into a set of similar, but smaller, problems. For instance, the Boolean even-parity function of k Boolean arguments returns T (True) if an even number of its arguments are T, and otherwise returns NIL (False). Similarly, the odd-parity function of k Boolean arguments returns T (True) if an odd number of its arguments are T, and otherwise returns NIL (False). For example, the even-4-parity function can be represented using the even-2-parity function, also known as the equivalence function EQV or the not-exclusive-or function (NXOR) or can be represented using the odd-2-Parity Function, also known as the Exclusive-OR (XOR) Function. It should be noted that the user does not need to know or have any knowledge that such a specific decomposition exists; it is the present invention that determines that this is possible, finding the symmetries and regularities of the problem and parameterizing representations of those symmetries and regularities to allow their composition into the eventual solution of the problem.

In the currently preferred embodiment, automatic function definitions are achieved by establishing a constrained syntactic structure for the entity, wherein the overall entity contains both function definitions (comprising dummy variables), which are referred to in general as internally invoked sub-entities, and calls to the functions so defined from the result producing (i.e. externally invoked) sub-entities. The function definitions are comprised of functions from the original function set, dummy variables and possibly references to the actual variables of the problem and other functions that have been automatically defined. In the currently preferred embodiment, an individual containing automatically defined functions are defined in a cascading structure, wherein some of the defined functions are defined in terms of others. The cascading structure is much like a main computer program calling subroutines during its execution, including where some of these subroutines might call upon each other.

Specifically, in the currently preferred embodiment, the constrained syntactic structure consists of a program with two sets of components: the first set includes function-defining components and the second set includes result-producing components. It should be noted that the present invention is not limited to any specific number of function-defining components or any specific number of result-producing components. Any number of function-defining components and result-producing components can be provided. Note that the term "result producing component" is used in its broadest sense. Any such component could return any number of values or it could perform side effects on the environment during its evaluation.

For example, the structure employed by the present invention might include two function-defining components and one result-producing component. The first function-defining component might specify a two-argument function definition, while the second function-defining component might specify a three-argument function definition. The result-producing component would compute the value returned by the overall entity when the external controller of the process invokes the result-producing component. This result-producing component is composed, in general, of the actual variables of the problem, constants, the functions in the primitive function set and any automatically defined functions created by the function-defining components. In this case, the defined functions would be the two-argument and three-argument automatically defined functions. In the currently preferred embodiment, these two automatically defined functions are uniformly and consistently referred to as ADF0 and ADF1.

In the currently preferred embodiment, an automatically defined function is defined in terms of dummy variables, referred to consistently as ARG0, ARG1, ARG2, ARG3, . . . When an automatically defined function is called, its dummy variables are instantiated with the current actual values of the arguments. These current values are obtained by evaluation of the expressions in the calling sub-entity. For example, an automatically defined function ADF0 might be called with the values of variables D0 and D1 on one occasion [i.e., (ADF0 D0 D1)], with the values of variable D1 and the expression (OR D0 D1) on another occasion [i.e., (ADF0 D1 (OR D0 D1))], and with two identical variables as arguments, such as D0 and D0, on yet another occasion [i.e., (ADF0 D0 D0). In the currently preferred embodiment, the automatically defined function is defined once, although it may be called numerous times.

The number of arguments used in each function definition can be selected based on the user's knowledge of the problem or the total amount of computer resources available. In the currently preferred embodiment, the automatic function definitions are not created with more than n arguments, where n is the number of actual variables of the problem in the terminal set of the problem.

A function definition can have no arguments. One example is a function defined by an expression of only constant values. The define building block operation (i.e., encapsulation) differs from the automatically defined function mechanism of the present invention in that the define building block (encapsulation) operation causes the removal of a sub-tree in the population and the saving of that sub-tree without further change for later use. It should be reiterated that automatic function definitions may change continuously as part of the computational structure that represents an entity (individual). A second example of an automatic function definition with no arguments is where the result produced is a value dependent on constant values and actual variables of the problem which the function has access to without being passed to the function. A third example exists where there are no explicit arguments, but side-effects are performed as a result, such as moving a robot.

Therefore, the size, shape and content of the function-defining components is not specified in advance nor is it specified how the result-producing components call upon the defined functions. Instead, the present invention, driven by the fitness measure, cause the evolution of the necessary size, shape and content of the solution to the problem.

The result-producing component and the function defining components are each capable of returning multiple values to whatever invoked them. In fact, each component in the entity can return multiple values. In the case where the actions within any sub-entity result in the performing of side effects, the sub-entity might return no values.

The present invention operates on a population of entities that have a particular structure. Each individual entity in the population consists of sub-entities. Each individual has at least one result-producing sub-entity. There is at least one individual entity in the population that has at least one function-defining sub-entity, and, most commonly, every entity in the population has at least one sub-entity. Depending on the problem, each individual entity in the population may contain more than one result-producing sub-entity.

The problem-solving process of the present invention starts with an initial random population of entities. Each of these entities is created in a random way consistent with the nature of the problem.

In general, the number of result-producing sub-entities is usually fixed for a particular problem since each entity in the population is expected to produce certain results when it is invoked by external controller of process.

If more than one result is to be produced, then each entity in the population could have more than one result-producing sub-entity.

If there are n actual variables of the problem, then it is almost always satisfactory to have no more than n dummy variables available to any one function-defining sub-entity. There can be function-defining sub-entities with zero dummy variables (such sub-entities can define a non-parameterized value useful in solving the problem). Similarly, there can be function-defining sub-entities with one, two, . . . , n dummy variables.

Function-defining sub-entities with one dummy variable are especially common in computer programming. It should be noted that even though a certain number of dummy variables is chosen, there is no requirement that any or all of the dummy variables be used in a particular function definition.

When Boolean problems are involved, arguments can take on only the two values of T (True) and NIL (False). Thus, for Boolean valued problems, function-defining sub-entities with no dummy variables are only capable of defining one of the two Boolean constants (T and NIL) and function-defining sub-entities with one dummy variable are only capable of defining one of the four possible Boolean functions of one argument (two of which are constant-valued functions). Thus, for the special situation of Boolean problems, it is sufficient to consider only function-defining sub-entities with 2, . . . , n dummy variables.

The number of different function-defining sub-entities with a particular number of dummy variables that may be useful for a particular problem varies with the problem. A practical approach is to provide an equal number of each. Limitations on computational resources may suggest having one of each.

Thus, for a Boolean problem involving four arguments, function-defining sub-entities with two, . . . , n−1 dummy variables might represent a practical choice. Specifically, as discussed later, for the problem of evolving the Boolean even-4-parity function, we would have two function-defining sub-entities (one with two dummy variables and one with three dummy variables) along with one result-producing sub-entity. Later, we also show the flexibility of this technique by solving the problem with two function definitions each of three arguments.

The function-defining sub-entity with two dummy variables ADF0 is a composition of the dummy variables ARG0 and ARG1, the four actual variables of the problem D0, D1, D2, D3 from the terminal set $T_4$, and the functions AND, OR, NAND, and NOR from the function set $F_b$. For simplicity of explanation, recursion is not used in this example. Also the other automatically defined function (i.e., ADF1) is not included in the function set for ADF0. However, ADF0 can be included in the function set for ADF1. Therefore, ADF1 could call upon ADF0 in a cascading manner. Thus, a hierarchy of entities exists, wherein any function could be defined, such as ADF1, in terms of other automatic function definitions, such as ADF0. Note that this hierarchy does not change the fact that the result-producing components can have access to all of the defined functions.

Thus, the function-defining sub-entity with three dummy variables ADF1 is a composition of the dummy variables ARG0, ARG1, and ARG2, the four actual variables of the problem D0, D1, D2, D3 from the terminal set $T_4$, the functions AND, OR, NAND, and NOR from the function set F$_b$, and the automatically defined function ADF0.

Although the actual variables of the problem D0, D1, D2, D3 can appear in the function-defining sub-entities in the most general instance of the present invention, their presence may reduce the evolutionary pressure toward the very generalization which automatic function definition is designed to promote. Thus, in the preferred embodiment of the present invention and in the examples herein, we do not show any actual variables of the problem appearing in the function-defining sub-entities.

The definitions of the automatically defined functions (ADFs) and the result-producing sub-entities of the present invention are evolved by genetic programming during a run. During evolution, appropriate result-producing sub-entities are created that call the automatically defined functions (ADFs) that are just defined. The evolution of this dual structure consisting of both automatic function definitions and function calls is caused by the present invention using only the fitness measure working in conjunction with natural selection and genetic operations.

In the currently preferred embodiment, the creation of the individuals (i.e., programs) begins with the result-producing main program components. Each result-producing main program component is a random composition of the primitive functions of the problem, the actual variables of the problem, and references to some or all of the functions defined within the current entity (i.e., program). Each of the function definitions contained in the present individual are created in the initial random generation and are comprised of the primitive functions of the problem and a specified number of dummy variables (i.e., formal parameters) which may vary in general among the defined functions of the individual. In the most general case, not only the primitive functions of the problem are contained within the function definitions, but also references to other defined functions within the current individuals.

The ADF mechanism defines the structure of the function definitions, such that other functions are defined with functions and terminals, wherein some of the terminals are dummy variables. In the currently preferred embodiment, the number of components for each structure is defined before the initial population is evolved. It should be noted that this could be done automatically and/or dynamically. Also specified is the number of arguments each function definition component has. For instance, ADF0 may be specified as having three arguments; ADF1 may be specified as having five arguments, etc. The arguments have given names, such as ARG0, ARG1, ARG2, etc. Thus, at the beginning of the run, the "tree" for the main program components and each function definition component ADF0, ADF1, etc. are built. Once the population of such entities has been constructed, the present invention causes evolution to occur using crossover, mutation, etc. in conjunction with the overall problem solving process.

An example of an entity 1501 of the present invention is shown in FIG. 15. Referring to FIG. 15, one component of entity 1501 is the internally invoked sub-entity automatically defined function ADF0 1502. Another component is automatically defined function ADF1 1503. Another component is the externally invoked sub-entity result-producing main program component 1504.

In the currently preferred embodiment, the syntactic rules of construction for the individual programs, are as follows: the currently preferred implementation of the ADF mechanism is a tree structure. In the currently preferred embodiment, the root of the tree must be a place holder for the totality of the entity. In the above example, the structure would have 3 (i.e., 2+1) components. In this instance, the function PROGN is used to root all of the components together. The PROGN function has a number of arguments equal to the sum of the number of automatically defined functions plus one. In the currently preferred embodiment, the root is always labelled with the PROGN function. In this example, the PROGN function is simply the connective "glue" that holds together the two function-defining components and the result-producing component. The first function-defining component 1502 (ADF0) of the entity rooted in the currently preferred embodiment by the PROGN is a composition of functions from the function set and terminals from the set of dummy variables for defining a function of two arguments, namely ARG0 and ARG1 as well as some extra machinery necessary to make a complete and legal function definition. Furthermore, the second function-defining component 1503 (ADF1) of the entity rooted by the PROGN is a composition of functions from the function set and the terminals from the set of three dummy variables for defining a function of three arguments, namely the set of ARG0, ARG1 and ARG2 along with similar function defining machinery. It should be noted that these dummy variables (formal parameters) are instantiated with the values of the corresponding argument subtrees in the invoking sub-entities when the ADF is called. Thus, ARG0 and ARG1 in ADF0 are different from ARG0 and ARG1 in ADF1 and, in general, the dummy variables to each of these ADFs will be instantiated with different values each time the ADF is called. The third component, the result-producing main component 1504 is a composition of actual variables of the problem from the terminal set, as well as functions from the function set, the two-argument function ADF0 defined by the first component 1502, and the three-argument function ADF1 defined by the second component 1503.

The function-defining components are not limited to using a specific number of arguments. It is not required that the function-defining branch use all the available dummy variables. Thus, in the example above, it is possible for the second function defining component 1503 to define what amounts to a two-argument function, rather than a three-argument function, by ignoring one of the three available dummy variables. The number of dummy variables to appear in each function-defining component is merely a matter of computer resources. The number could be, for example, n, where n is the number of actual variables of the problem in the terminal set of the problem. The evolutionary process implemented by the present invention decides how many of the available dummy variables in a particular function definition are actually used. In some problems, knowledge about the problem domain might suggest the selection of a different number of arguments.

The function-defining components do not interact directly with the external controller of the process. Thus, in the example above, the first function-defining component 1502 and the second function-defining component 1503 do not interact directly with the external controller of the process. They are merely components which may or may not be called upon by the result-producing component 1504 (or each other). At its discretion, result-producing component 1504 may call one, two or none of the automatically defined functions from the function defining components any number of times. The results produced by the entire entity are the values returned or actions taken (e.g., side effects) either directly or indirectly by the result-producing component 1504. The results are produced by executing, or activating, the entire program (i.e., the entity). The result-producing components act as the "main program" to activate the entity in the currently preferred embodiment.

FIG. 16 shows the tree structure employed by one embodiment of the present invention to represent an entity. Referring to FIG. 16, the entity has two function definitions and two result-producing components. It should be noted that the number of function definitions and the number of result-producing branches is variable. The number chosen in FIG. 16 is purely exemplary. ADF0 is rooted by DEFUN 1602. The subtree rooted by DEFUN 1602 denotes a function definition which has a name ADF0 as identified in 1605, an argument list (ARG0 ARG1 . . . ) 1606, and a definition of the function ADF0 1607 in terms of arguments 1606. ADF1 is represented by DEFUN 1603. The subtree rooted by DEFUN 1603 denotes a function definition which has a name ADF1 as identified in 1608, an argument list (ARG0 ARG1 . . . ) 1609, and a definition of the function ADF1 1610 in terms of arguments 1609. The two result-producing components, 1611 and 1612 are externally invoked by the external controller and return values to the VALUES function 1604. In the currently preferred embodiment, the VALUES function is similar to the function by the same name in the programming language LISP with the exception that it accepts all values returned from each result-producing component. All of the components, i.e. DEFUN 1602, DEFUN 1603 and VALUES 1604, are grouped in a set by the PROGN placeholder function 1601. PROGN allows the branches to execute in sequence. However, the sub-entities within the entity are not in an order. Each of the defined functions can be invoked as needed and all are available simultaneously. It should be noted that FIG. 16 includes line 1620. Line 1620 designates which portions of the entity are susceptible to structure modifying evolutionary operations, such as crossover and mutation. Such operations can only occur on portions of the entity below line 1620. Those portions above line 1620 are immune from being the subject of these operations.

In order to generate the tree depicted in FIG. 16, a template is used. The template used contains all of the information above line 1620. The number of arguments specified in the argument lists is set for the template. In this example, argument lists 1606 and 1607 would be set to indicate that the arguments available for each of the function definitions 1607 and 1610 respectively are (ARG0 ARG1) and (ARG0 ARG1 ARG2) respectively. Also the number of result-producing components is set. In the example, two result-producing components, 1611 and 1612, are specified. With the template setup complete, each of the function definitions, such as 1607 and 1610 in the example, and the result-producing components, such as 1611 and 1612 in the example, are generated in the normal recursive manner from the available functions and terminals.

Although we describe the structure of the entities in the population as being that of a PROGN function rooting a set of function definitions and a set of result producing branches rooted by a VALUES function, one skilled in the art might choose not to implement such a system in this manner. The evaluation of the fitness of the entities in the population often requires the repeated activation of an entity over a number of fitness cases, i.e. different states of the environment or different values for the actual variables of the problem. If we were simply to activate these entities, they would result in the correct behavior but would be inefficient because of the repeated and unnecessary redefinition of the automatically defined functions. Thus, it is preferable to allow the controller of the process to execute the definitions of the functions once and then to iterate over the invokation of the result-producing branch(es) without the redefinition of the automatically defined functions in order to activate the entity.

It is also often the case that the definitions of the automatically defined functions can result in very inefficient and expensive computation. The cost of invoking such a function is made even more onerous by there being a large number of fitness cases to test and by hierarchical references by inefficient functions to other inefficient functions. It is possible to optimize the process by transforming the automatically defined functions into a more efficient form. This transformation can take the form of source code optimization similar to the editing step described, compilation into more machine intelligible instructions or sometimes reducing the behavior of the function to a look-up table. This optimization process may itself be expensive but is often most worthwhile.

Furthermore, we can often save expense in this transformation process by transferring into any entities created in a new generation the transformed form of any automatically defined function for any such function whose definition is not changed by crossover or mutation.

The automatic function definition mechanism of the present invention operates by first generating a random set of computer programs composed of randomly created defined function components and result-producing components. Since a constrained syntactic structure is involved, it first creates the initial random population so that every individual computer program in the population has the required syntactic structure. Then, the present invention performs operations on the structures, such as crossover where crossover in this embodiment is "category preserving" crossover. Category-preserving crossover is implemented by allowing the selection of the crossover point in the first parent to be restricted only in that it may not lie within the crossover protected part of the entity that is used as the template for the structure of the entity and then requiring that the crossover point of the second parent belong to the same category as the already-selected crossover point of the first parent.

Two definitions of "category" may be used. The first definition of "category" is that the two points are the same category if (1) they are both in result-producing branches, or (2) they are in function-defining branches whose argument list consists of precisely the same dummy variables and which refer to the same set of automatically defined functions. The second definition is less restrictive and is that the crossover point in the parent into which the insertion is to made is of the same category as the fragment to be inserted if every argument in the crossover fragment that is to be inserted has a meaning in the place where it is about to be inserted.

In practice, if the crossover fragment that is about to be inserted contains only primitive functions from the function set $F_b$ and actual variables of the problem from the terminal set $T_4$ (i.e., D0, D1, D2, and D3), but contains no dummy variables, then it has meaning anywhere. If there are any dummy variables in the crossover fragment that is about to be inserted, those dummy variables must all be in the argument list of the sub-entity where it is about to be inserted. Similarly, any references to automatically defined functions in the crossover fragment to be inserted must be defined in the sub-entity into which it is to be inserted. This means, for example, that if there are dummy variables in the crossover fragment that is about to be inserted, the sub-entity cannot be a result-producing sub-entity (since result-producing sub-entities do not have dummy variables).

In the example of the even-4-parity function with one two-argument ADF and one three-argument ADF, the second definition of category means that a crossover fragment containing ARG0 or ARG1 can be inserted into either ADF0 and ADF1 (but not the result-producing sub-entity). In addition, it means that a crossover fragment containing dummy variables ARG2 (which appears only in ADF1) can only be inserted into ADF1; it cannot be inserted into ADF0 or the result-producing sub-entity. A crossover fragment containing no dummy variables (whether from ADF0, ADF1, or the result-producing sub-entity) has meaning everywhere.

As can be seen, the second definition is somewhat more difficult to implement in the preferred embodiment. Therefore, the first approach is used in practice. An example of category-preserving crossover is described in conjunction with FIG. 17. It should be noted that the crossover operation is usually conducted in pairs. When we use genetic programming without ADFs, the crossover fragments are typically swapped between the selected individuals. However, because of the rules of category preserving crossover, we find in general that we cannot simply swap one fragment for the other. We must generally keep randomly selecting the second fragment until its category is acceptable in the context of the place into which it is to be replaced. This means that to achieve a crossover for the second parent we must generally also iteratively search for an acceptable fragment. Sometimes it is not possible to find a point with the desired category, in which case the crossover aborts and reproduction occurs instead.

Referring to FIG. 17, two entities 2420 and 2470 are shown as trees rooted by PROGN 2400 and 2450 respectively. Each of entities 2420 and 2470 have two automatically defined functions. Entity 2420 has DEFUN 2401 and DEFUN 2402 which root defined functions ADF0 and ADF1 respectively for entity 2420, while entity 2470 has DEFUN 2451 and 2452 which refer to defined functions named ADF0 and ADF1 respectively for entity 2470. Each entity 2420 and 2470 has one result-producing branch (i.e., component). Entity 2420 includes result-producing branch 2403 and entity 2450 has result-producing branch 2453. Note line 2490 is the line which designates which portions of the two entities are susceptible to structure modifying operations. As depicted in FIG. 17, the crossover operation is performed by first selecting entity 2420 as being the selected entity (i.e., the first parent) and selecting a point in entity 2420 using a uniform probability distribution. The selected point in the entity tree is that point which is rooted at NOT operator 2407. The portion of entity 2420 rooted by NOT operator 2407, as indicated by box 2405, is deleted when a crossover fragment from entity 2470 is inserted. The crossover point chosen in this case in entity 2470 is the subtree rooted at OR function 2456, referred to as crossover fragment 2454. Thus, crossover fragment 2454 comprising a Boolean OR operation 2456 with arguments ARG0 2458 and ARG1 2457 replaces the portion of the function definition 2402 marked by box 2405, consisting of NOT operator 2407 with its argument ARG2 2408. Note that the arguments ARG0 and ARG1 from crossover fragment 2454 have meaning in the function definition 2402 since the argument list 2406 clearly specifies the existence of ARG0 and ARG1. However, note that if the crossover operation is attempted in the other direction wherein an attempt is made to crossover selected boxed portion 2405 consisting of NOT operator 2407 with its argument ARG2 2408 into the location of crossover fragment 2454 the crossover cannot be performed. Upon review of the argument list 2455 of DEFUN 2451, the argument ARG2 has not been defined. Therefore, it has no meaning in the context of ADF0 rooted at 2451. Therefore, this crossover action can not be accomplished. It should also be noted that in the present invention, as long as the second parent crossover portion has meaning at the point where it is inserted in the first parent, any point of crossover may be selected and considered of the same category. In the currently preferred embodiment, if a suitable point is not found (i.e., the portion rooted at the chosen crossover point has no meaning), then the crossover operation is aborted.

In the currently preferred embodiment, the problem of selecting the second parent is eliminated by choosing a point of the same category in the corresponding component of the second parent. An example of crossover using the currently preferred embodiment is shown in conjunction with FIG. 18. Referring to FIG. 18, two entities 2520 and 2570 are shown rooted by PROGN functions 2500 and 2550 respectively. Each of entities 2520 and 2570 have two automatically defined functions. Entity 2520 has function definitions rooted by DEFUN 2501 and DEFUN 2502 which refer to defined functions ADF0 and ADF1 respectively for entity 2520, while entity 2570 has function definitions rooted by DEFUN 2551 and 2552 which refer to defined functions ADF0 and ADF1 respectively for entity 2570. Each entity 2520 and 2570 has one result-producing branch (i.e., component). Entity 2520 includes the result-producing branch rooted at 2513 and entity 2570 has a result-producing branch rooted at 2563. As depicted in FIG. 18, the crossover operation is performed by first selecting entity 2520 as being the selected entity (i.e., the first parent) and selecting a point in entity 2520 using a uniform probability distribution. The selected point in the entity tree is the point rooted at NOT operator 2505. The portion of entity 2520 rooted by NOT operator 2407, as indicated by box 2504, is deleted when a crossover fragment from entity 2570 is inserted. The point at which the crossover fragment is chosen, in this case, is in a portion of the result-producing branch 2563 at a point rooting a call to ADF0 2554. Thus, both locations chosen for crossover are in the result-producing branches. As long as the crossover fragment has meaning with respect to its contemplated point of insertion, i.e., all of the primitive functions, terminals and calls to function definitions in this case have meaning in the result-producing branch rooted at 2513, then the crossover operation is allowed.

A similar restriction is placed on the mutation operation, such that any added mutated structure has to have meaning in terms of the location at which the structure is to be added. For example, if the mutation point were selected inside a result-producing sub-entity, the sub-tree inserted at the mutation point would involve primitive functions from the function set of the problem, defined functions available to the result-producing sub-entity, and actual variables (terminals) of the problem. On the other hand, if the mutation point were selected inside a function-defining sub-entity having an argument list containing, say ARG0 and ARG1 (but not ARG2), the sub-tree inserted at the mutation point would involve primitive functions from the function set of the problem, defined functions available to the particular function-defining sub-entity, and actual variables (terminals) of the problem as well as ARG0 as ARG1.

It is beneficial to allow automatically defined functions to call other automatically defined functions. This allows the hierarchical decomposition of the problem into a lattice of function applications. In its most general form, allowing automatically defined functions to invoke other such functions would result in recursive references. For simplicity of explanation, in the examples shown, recursive references between the automatically defined functions are not allowed. Because genetically produced entities are frequently erroneous solutions to the problem, the possibility of infinite recursion must be anticipated if any automatically defined function is to be allowed to reference itself (either directly or indirectly through others). It is simpler not to have to add any extra mechanism to avoid this error condition, though the means of achieving this are detailed in the discussion of the use of recursion in the present invention. If e choose not to use recursion, there are two methods for the simple avoidance of recursive references. The first method is simple to implement and is the one used in the preferred embodiment. The second method is the more general solution to the problem but is currently more expensive to perform with currently available computational machinery.

The first method is simply to avoid recursions by allowing references to automatically defined functions in a manner which we can view as a "left-to-right" cascade of function definitions. For example, ADF0 can be defined such that it may not reference any automatically defined functions, ADF1 can then be defined so that it may reference only ADF0. Then ADF2 can be defined so that it may reference only ADF0 and ADF1 and so on. It is simple to see that the worst case of hierarchical nesting of calls to automatically defined functions will be that of ADF2 calling ADF1 which in turn calls ADF0. It is not possible in this arrangement to arrive at a cyclic dependency and hence a recursion. This arrangement is simple to implement and is that used in the examples shown here.

The second method involves checking the transitive closure of the functional dependencies being expressed by an entity. Let us consider an entity whose automatic function definitions contain no cyclic references. This can easily be achieved when the entity is created by the same graph traversal as is involved in the procedure below. From thereon, we clarify the definition of the term "to have meaning" such that the transitive closure of the paths from function calls through the function definitions and any function calls made therein for the crossover fragment that is to be inserted in the entity must allow no cyclic references. Thus, the graph of function calls when followed through function definitions must be a directed acyclic graph. Graph traversal algorithms are well known in the art to determine the possible existence of cyclic dependencies. This method is simple to implement, but is computationally more expensive.

Thus, the present invention allows automatic function definition by the use of a constrained syntactic structure for the automatic discovery of a set of function definitions along with a set of result-producing program components any of which can call upon any combination of the defined functions to solve a problem. The automatic function definition mechanism of the present invention enhances the performance of genetic programming in problem solving. As shown below, automatic function definition enhances the performance of genetic programming and helps produce solutions to the Boolean even-4-parity, the even-5-parity and the even-6-parity function problems. Moreover, automatic function definition enables genetic programming to readily solve a variety of problems.

Parallel Processing

The process of the present invention can benefit greatly from parallel operation. By using parallel processing, the overall rate of activity rises in almost direct proportion to the number of activities performed simultaneously. This is beneficial since it can reduce the overall run time of the genetic programming system and thereby make the solution of hard problems tractable.

The present invention can benefit from parallel operation in several ways that apply equally to conventional genetic algorithms involving fixed length character strings and non-linear genetic processes involving hierarchical structures that can vary in size and shape.

First, for example, each of the genetic operations (crossover, reproduction, etc.) can be simultaneously performed in parallel on different entities in the population. If the entities are computer programs, parallel processing is accomplished by a computing machine having multiple operating units (control and arithmetic) capable of simultaneously working on entities from the population. In this case, the overall rate of activity rises in almost direct proportion to the number of activities (i.e. genetic operations) performed simultaneously in parallel.

Secondly, the determination of the fitness of a given individual in the population is often, by far, the most resource intensive part of the operation of the process. If the entities are computer programs, the calculation of fitness often consumes the most computer time. When this is the case, the determination of fitness for each individual can be performed simultaneously in parallel for every entity in the population. In this instance, the overall rate of activity rises in almost direct proportion to the number of activities (i.e. time-consuming fitness calculations) performed simultaneously in parallel.

Thirdly, the entire process can be performed simultaneously in parallel. Since the process has random steps, it is possible that different solutions can emerge from different runs. These different solutions can be compared and the best one adopted as the solution to the problem. In this case, the overall rate of activity rises in almost direct proportion to the number of activities (i.e. entire runs) performed simultaneously in parallel.

In addition, pipeline parallelism can be used. That is, each of the major steps of the process can be performed by different processors. A given individual can be passed down the pipeline so that each step of the process is performed by a different processor for that particular individual.

The process of the present invention can benefit greatly from parallel operation. By using parallel processing, the overall rate of activity rises in almost direct proportion to the number of activities performed simultaneously. FIG. 8 is a block diagram depicting parallel processing of the present invention using two sub-populations each having two operating units. Sub-population $P_1$ 1410 is coupled to operating units $U_{11}$ 1411 and $U_{12}$ 1412. Sub-population $P_2$ 1420 is coupled to operating units $U_{21}$ 1421 and $U_{22}$ 1422. Communications channel 1430 couples all four operating units. FIG. 8 illustrates two sub-populations each with two operating units; however, in general, there can be an arbitrary number of sub-populations and arbitrary number of operating units involved.

Two types of parallel activity can occur. In the first type, each of the operations (crossover, reproduction, permutation, etc.) are performed simultaneously in parallel on different entities (or different groups of entities for crossover) selected from a given population of individuals. If the entities are computer programs, parallel processing is accomplished by a computing machine having multiple operating units (control and arithmetic) capable of simultaneously working on entities selected from the computer's memory.

To show this first type of parallel processing, consider operating units $U_{11}$ 1411 and $U_{12}$ 1412 which are coupled to sub-population $P_1$ 1410. Each operating unit can access the sub-population to select entities for the operations based on their relative fitness, followed by performing the operation, adding new programs, and the rest of the iterative process simultaneously.

The second type of parallel processing involves simultaneously occurring activity in two or more different sub-populations. To show this type of parallel processing, consider sub-population $P_1$ 1410 and sub-population $P_2$ 1420. While $P_1$'s two operating units operate on $P_1$, $P_2$'s two operating units operate on $P_2$. Both types of parallelism are highly efficient because very little information need be communicated along the communication channel 1430. In addition, each operating unit need perform only a few very simple activities response to the information received from the communications channel 1430.

Communication and coordination is performed by communications channel 1430, which couples all the operating units associated with the various sub-populations. In a computer, the communication channel may be a communication bus.

To illustrate the efficiency of parallel processing, let us suppose that selection is performed using probabilities proportionate to fitness. The computation of this probability for a particular individual typically requires two pieces of information—namely, the value (fitness) assigned to the result of executing the particular individual and the total of all such values of all individuals in the entire population. Typically this calculation is performed by dividing the individual's assigned value (fitness) by the total for the entire population. Once the total has been computed for the initial entire population, the total is easily modified by incrementing it for each newly created individual and by debiting it for each individual that is removed.

This simple computation can be performed by each operating unit whenever it receives information via the communications channel 1430 about any insertion or removal of an individual in the population. Similarly, each operating unit must transmit information along the communications channel 1430 to all other operating units whenever it inserts or removes any individual from the sub-population which it accesses. The message consists of the increment (in the case of an insertion) or the decrement (in the case of a removal) in the total value (fitness) of the population. Note that these messages are relatively short and require very little effort to send and act on in comparison to the considerably larger effort needed to perform the iterative process. Because processing messages is relatively minor in comparison to performing the genetic algorithm, the overall rate of activity in this parallel configuration rises almost in direct proportion to the number of activities being performed in parallel. In the case of computer programs, the benefits of parallel activity (using parallel operating units accessing parallel sub-populations) is manifested in terms of a rate of overall computer processing activity, rising almost in direct proportion to the number of parallel activities. That is, the amount of computation performed per unit of time rises almost in direct proportion to the number of parallel activities.

From time to time, the communications channel is also used to exchange large groups of individuals between the sub-populations so that each sub-population receives new genetic material that have achieved relatively high values of fitness from other sub-populations. These occasional transmissions of information add to the administrative overhead of a parallel system; however, because they occur only occasionally (i.e. after many generations of activity confined to the sub-populations), they have only a minor effect on the overall efficiency of the parallel configuration.

Parallelism at the run level is comparatively easy to implement. Each processor is assigned one or more full runs for the maximum number of generations G to be run. The overall result is the best result of all the runs from all the independent processors. If the choice of the maximum number of generations to be run on each independent run is done reasonably well, only one or two processors will solve the problem within the allowed number of generations G. The overall result is then simply the result produced by the one successful processor or the better of the two results from the two successful processors. If the process of determining the overall result were automated, it would involve an extremely small amount of bandwidth for communication between the processors (i.e., one message from each processor containing the result of each independent run). In fact, determination of the overall result may be done manually on the back of an envelope. Before expending massive efforts on parallelization of genetic methods at levels lower than the run level, the user is well advised to recall the advisability of making multiple independent runs (rather than one long run) and to consider the possibility that the best use of the capabilities of a coarse- or medium-grained parallel computer is to simply make multiple independent runs on the various processors.

Two examples (Solving Linear Equations and Sequence Induction) are discussed below.

SOLVING LINEAR EQUATIONS

In this example, the environment in which adaptation takes place consists of n sets of two consistent non-indeterminate linear equations in two variables. If we delete the subscripts identifying the particular pair of equations involved, the typical equation pair is:

A11 X1+A12 X2=B1

A21 X1+A22 X232 B2

Without loss of generality, the coefficients of each pair of equations have been normalized so that the determinant is 1. This particular problem has a known mathematical solution for the first variable (x1) which, if written as an S-expression in the LISP programming language, is (−(* B1 A22) (* B2 A12)). A similar program gives the solution for the second variable (x2). A natural metric for evaluating a program's proffered solution is the sum of the deviations from the known mathematical solution produced by the proffered program. This sum is the aggregate, over the series of all pairs of equations, of the Euclidean distance between the proffered solution point and the known actual solution point. A sum of zero for a particular program means the expression is a perfect solution. A very small sum represents the kind of solution acceptable in practice from a digital computer. Since the solution for the second variable (x2) is directly derivable from either of the two (consistent) equations of a given pair, a proffered solution to this problem can be viewed as simply a single valid program whose returned value is the solution for the first variable (x1) for each pair of equations in the series. The proffered solution can then be evaluated by deriving the solution for the second variable from the first; then computing the Euclidean distance. Finally the distances are accumulated over the series. This approach happens to make the terminals A12 and A22 extraneous to the solution for the variable (x1).

FIG. 9 shows a pair of linear equations having two variables x1 and x2. In FIG. 9, the first equation 310 corresponds to the straight line 320 drawn on the plane defined by the horizontal axis X1 330 and vertical axis X2 340. The second equation 350 corresponds to the straight line 360 drawn on the same plane. The point of intersection 370 has a coordinate 380 (x1) along the horizontal axis X1 330 and a coordinate of 390 (x2) along the vertical axis X2 340.

The universe from which proffered solutions for the first variable x1 consists of any valid LISP S-expression (with any level of embedding of functions) constructed from the useful input terminals (A11, A21, B1, and B2), the extraneous input terminals (A12 and A22), the useful functions of multiplication and subtraction (* and −), and the extraneous function of addition (+). The presence of an extraneous function and terminals tends to make this example problem more realistic.

The search space in which the solution to this problem lies is thus a very large, non-linear, non-continuous space of rooted trees whose points are labeled with various mathematical symbols (either functions or terminals). A large number of possible tree structures can represent valid LISP programs, even if one arbitrarily limits the level of embedding and all the functions require only two arguments. In addition, there are many ways of labeling the internal points of these trees with the available functions and there are many ways of labeling the external points (leafs) of these trees with the available terminals. Some programs in the search space equal mathematically, the most parsimonious solution cited above [for example, adding in (−A11 A11) to the solution]. However, these occasional numerically equivalent programs provide no usable simplification of the problem or usable reduction of the large number of possible programs involved here.

Solving these problems starts by generating a population of individual programs using the functions *, −, and + and the terminals A11A12, A21, A22, B1, and B2. The initial population can be generated entirely at random. That is, starting at the top of the tree, one of the available functions or terminals is chosen at random. If a terminal is chosen as this first choice, the process is complete and the program consists of this single terminal. If a function is chosen, the process continues. If the function chosen requires K arguments (and K is 2 for all three of the functions in this problem example), then a similar random selection is made for each end-point of each of K lines radiating downwards from the initial point. That selection is also made at random and may be a terminal or a function. If a terminal is selected, that particular point becomes an external point (leaf) on the tree and no further attention is paid to that line. If a function is selected, then the process continues recursively with additional selections being made in the same manner. When, at some point, terminals have been selected for all external points, the process of randomly constructing the tree is then completed. The initial population is merely a random subset of the domain in which the subsequent search is to take place.

For some problems, the system can be primed by including some program (or some portions of programs) which are believed to be important in dealing with the problem at hand. In addition, the operation of the system may be interrupted at any point and restarted with the population of individuals existing at the end of the previous run. That method of re-starting operations can be viewed as priming the system with an entire population. FIG. 10 is an example entity from a randomly generated initial population of programs being the example expression 262, which is:

(+(−B1 A12) (*(*B2A21)B2))

Starting at the root 264 of the tree, one of the available functions (*, +, or −) or one of the available terminals (A11, A12, A21, A22, B1, or B2) is selected. In this figure, the function + (addition) was selected at random to appear at the root 264 of the tree. Since this function requires two arguments, there are two lines 266 and 268 radiating downwards from the internal point 264. For the endpoint 270 of the line 266 and endpoint 272 of the line 268, another similar random selection must be made from the set of available functions or available terminals. For point 270, the function − (subtraction) has been selected. Since this function also requires two arguments, there are two lines 274 and 276 radiating downwards from point 270. For the endpoint of each such radiating line, a similar random selection must be made. Here, the variable B1 has been selected for the endpoint 278 of the line 274. Since B1 is a terminal, that completes the process for this branch of the tree. Also, the variable A12 has been selected for the endpoint 280 of the line 276. This completes the process for the line 266 radiating downwards from the root 264.

For the second argument of root 264 at the internal point 272, a function (multiplication) has been selected. Since this function requires two arguments, two lines 282 and 284 radiate downward from point 272. For point 286 at the end of line 282, another function * (multiplication) has been selected. The endpoint 288 of the first line 290, which radiates downward from point 286, has the terminal B2. The endpoint 292 of the second line 294, which radiates from point 286, has the terminal A21. Similarly, the line 284 radiating downward from point 272 has the terminal at its endpoint (leaf) 296. This completes the random generation of the tree and corresponding S-expression (program).

Shown below are some examples of possible programs for this example which could have been generated at random as the initial population of individuals:

(+A11 A12)  (1)

(−(*B1 B2)A22)  (2)

(+(−B1 A12) (* (*B2 A21)B2))  (3)

Examining one of these expressions, example (1) consists of the sum of the coefficients of the first linear equation. Its interpretation is the solution for the first variable (x1) in a system of two linear equations in two variables always equals the sum of A11 and A12, regardless of any of the other coefficients or constants in the equations. One would expect this wrong expression to usually produce proposed solutions which are far from the correct solutions. Of course, this incorrect program might occasionally, by coincidence, produce the correct solution for a particular pair of equations.

Once the population of individuals is generated, each of the S-expressions in the population is executed (i.e. evaluated in LISP) to produce a result. In LISP, each S-expression can be executed to return some kind of numeric, symbolic, logical, or other result. In practice, this execution is repeated over a series (i.e. different pairs of linear equations for the current example problem) to avoid accidentally misleading conclusions. By performing this evaluation over a series of different situations, a better measure of performance is obtained. For example, (+A11 A12) might give the correct solution to the first variable (x1) for some unusual set of linear equations in two variables, though not the solution to the problem in general.

For purposes of this example problem and in order to simplify the discussion, the "result" or evaluating the S-expression here is simply a numeric value for the first variable x1. As previously mentioned, if the possibility of parallel lines (i.e. inconsistent equations) were allowed in this example, the "result" might be either numeric or symbolic. Alternatively, the "result" could be the pair (vector) of numbers (x1, x2) specifying the coordinates of the point in the plane where the two lines intersect. Once the result of the execution of the computational procedure (S-expression) takes place, the result can be assigned a value in the particular environment involved for the particular problem involved.

In the case of this example problem, the solution for the second variable (x2) is directly derivable from the first variable (x1) using either of two (consistent) equations of a given pair of equations. The variables x1 and x2 correspond to a point in the plane (the point whose horizontal coordinate is x1 and whose vertical coordinate is x2) while the actual solution corresponds to another point in the plane. The distance between the two points in the plane can be computed. The distances obtained by evaluating the program using the other pairs of linear equations can be similarly computed. The cumulative distance provides a natural measure of value (fitness) of a particular individual program in this environment. If the sum of these distances for a particular individual program is zero, then the program has the best value (best fitness) in this environment because it produces points of intersection that are exactly correct in each case (i.e. have zero distance, in each case, from the correct points).

INDUCTION OF SEQUENCES

In this example problem, the environment in which adaptation is to take place consists of a single given sequence:

$$S_0, S_1, S_2, S_3, \ldots, S_i, \ldots$$

The goal is to produce a computational procedure (Program, S-expression) for the sequence (that is, computational procedure which gives $S_i$ for any index i). A proffered solution to this sequence induction problem consists of a program using the terminal INDEX which gives the value of the sequence for position INDEX of the sequence. The first element of a sequence is considered to have an INDEX of 0 (not 1) by convention. For example, the sequence 0, 2, 4, 6, 8, 10, ... can be represented by the computational procedure (* 2 INDEX). That is, the value of the sequence for position INDEX of the sequence is 2 times the INDEX.

This problem of sequence induction, of course, has no strictly mathematical solution. Nonetheless, we can evaluate proffered solutions according to how well they match the available known elements of the sequence. In this case, a higher value for the matching function is better. The known best value for the matching function is the value that occurs if all the available known elements of the sequence exactly match the result of executing the computational procedure under consideration.

Since many sequences are defined recursively (that is, earlier elements in the sequence are used to define later elements), it is desirable to have a function for referencing the value of the sequence for k positions earlier in the sequence that the current position (i.e. the position numbered INDEX). For example, it may be necessary to express $S_i$ in terms of $S_{i-1}$ (the previous element of the sequence) or in terms of $S_{i-k}$ (k elements earlier in the sequence). Note that if the value of k were zero, negative, or greater than INDEX, the attempted reference would be to values of the sequence which do not exist. For these non-existent positions, a default value should be defined for the function to make it complete. Thus, the referencing function should have two arguments. The first argument is k and the second argument is a default value. The referencing function is termed "&".

The function & (k, D) of the variables k and D returns the value of the sequence for position INDEX-k whenever INDEX-k lies between 0 and INDEX−1, and, otherwise, this function returns the default value D. For example, the sequence 2, 4, 8, 16, 32, ... can be represented by the computational procedure (*2(&11)) because the value of the sequence for position INDEX is generally 2 times the value of the sequence for position INDEX−1. Note that when INDEX is 0 (and a reference is attempted for sequence position −1), the value of the sequence is 2 times the default value of 1.

Similarly, for example, the Fibonacci sequence:

1, 1, 2, 3, 5, 8, 13, 21, 34, 55, ...

may be expressed as $S_i = S_{i-2} + S_{i-1}$ (with the understanding that if $S_{i-2}$ or $S_{i-1}$ refer to sequence elements earlier than sequence element 0, a default value of 1 will be used). The Fibonacci sequence can also be represented by the recursive computational procedure:

(+(& 1 1)(& 2 1))

Except for the special terminal INDEX and except for the special referencing function & needed to allow references to the sequence itself, the process of sequence induction can proceed using the same functions available in LISP as were used for the linear equations example.

FIG. 11 illustrates the crossover operation applied to two parents whose functions and terminals include the special function & and the special terminal INDEX appropriate for the sequence induction problem. The first parent is computational procedure 1000, (+(* INDEX 2) (&2 1)), represented by the tree with root 1010. Root 1010 is the addition function and has lines to arguments at internal nodes 1016 and 1012. Node 1016 is the multiplication function and has lines to arguments at leafs 1014 and 1015 (the variable INDEX and the number 2, respectively). Node 1012 is the & (referencing) function and has lines to arguments at leafs 1018 and 1019 (the numbers 2 and 1, respectively). Sub-tree 1011 comprises 1012, 1018, and 1019. The terminal INDEX appears as one of the arguments 1014 of the multiplication function (*) 1016. The referencing function & appears at internal point 1012 of the tree and operates on the arguments 1018 and 1019 (the numbers 2 and 1, respectively). This function (& 2 1) means give the value of the sequence 2 positions earlier in the sequence (or gives the default value 1 if the current position of the sequence is only 0 or 1). The second parent is computational procedure 1020, (+(& 1 1) (& 2 0)), represented by the tree with root 1030. Root 1030 is the addition function and has lines to arguments at internal nodes 1022 and 1032. Node 1022 is the & function and has lines to terminals at leafs 1024 and 1026 (the numbers 1 and 1). Node 1032 is the & function and has lines to terminals at leafs 1034 and 1036 (the numbers 2 and 0, respectively). Tree 1021 comprises 1030, 1022, 1024, and 1026. Internal point 1012 of the tree with root 1010 and internal point 1032 of the tree with root 1030 are chosen at random as the crossover points.

The first offspring 1040, (+(*INDEX 2) (& 2 0)), is represented by the tree with root 1050. Root 1050 is the addition function and has lines to arguments at internal nodes 1042 and 1052. Node 1042 is the multiplication function and has lines to arguments at leafs 1044 and 1046 (the variable INDEX and the number 2, respectively). Node 1052 is the & functional and has lines to arguments at leafs 1048 and 1054 (the numbers 2 and 0, respectively).

The second offspring 1060, (+(& 1 1) (& 2 1)), represented by the tree with root 1070 is composed of tree 1021 of the second parent 1020 combined with the sub-tree 1011. Root 1070 is the addition function and has lines to arguments at internal nodes 1062 and 1072. Node 1062 is the & function and has lines to leafs 1064 and 1066 (the numbers 1 and 1). Node 1072 is the & function and has lines to leafs 1074 and 1076 (numbers 2 and 1, respectively). This second offspring is the known correct solution to the problem of inducing the formula for the Fibonacci sequence.

It should be noted that the sequences involved here need not be deterministic sequences. Instead, they can be produced by probabilistic processes. For example, the sequence 0, 1, 2, 5, 4, 5, 8, 7, . . . might be generated by simply making the value of the sequence equal to INDEX 75% of the time and equal to (+INDEX 2) 25% of the time. For example, when INDEX is 0, 1, 2, 4, 5, and 7, the value of the sequence was 0, 1, 2, 4, 5, and 7, respectively. That is the value of the sequence was equal to INDEX. But, when INDEX was 3 and 6, the value of the sequence was 5 and 8, respectively. That is, the value of the sequence was equal to INDEX plus 2. In these cases, perfect matches will not be obtained; however, higher fitness levels will be associated with computational procedures that produce matches more often than others.

Many seemingly different problems in artificial intelligence, symbolic processing, and machine learning can be viewed as requiring discovery of a computer program that produces some desired output for particular inputs. When viewed in this way, the process of solving these seemingly different problems becomes equivalent to searching a space of possible computer programs for a most fit individual computer program. This most fit individual computer program can be found by applying the techniques of the present invention described herein, in which a population of hierarchical entities of various sizes and shapes, such as computer programs, is genetically bred.

This invention is useful for solving problems which present themselves under at least seven different names, namely, the problems of symbolic function identification, symbolic regression, empirical discovery, modeling, induction, chaos, and forecasting.

Depending on the terminology of the particular field of interest, the "computer program" may be called a robotic action plan, a strategy, a decision tree, an econometric model, state transition equations, a transfer function, a mathematical expression, or perhaps merely a composition of functions. Similarly, the "inputs" to the "computer program" may be called sensor values, state variables, independent variables, attributes of an object, or perhaps merely, the arguments to a function. However, regardless of different terminology used, the underlying common problem is discovery of a computer program that produces some desired output value when presented with particular inputs.

Symbolic function identification requires finding a function in symbolic form that fits given data points. In other words, symbolic function identification requires finding a function that produces the values of the dependent variable(s) for given values of the independent variable(s). This problem is also called symbolic regression, empirical discovery, induction, modeling, chaos, or forecasting. The function that describes the system can then be used to construct a model of the process. The model of the process can then be used in forecasting future values of the variables of the system. In particular, forecasting is done by setting the independent variables to values outside the domain of values of the original given data points. Typically, time is the independent variable in forecasting problems.

Regardless of the name, these problems require finding a function in symbolic form that fits the given values of the dependent variable(s) associated with the particular given values of the independent variable(s).

While conventional linear, quadratic, or higher order polynomial regression requires merely finding the numeric coefficients for a function of a pre-specified functional form, symbolic regression involves finding both the appropriate functional form and the appropriate numeric coefficients.

We describe the use of the non-linear genetic algorithm, which we term Genetic Programming, by specifying (1) the nature of the structures that undergo adaptation in this process, (2) the search space of the structures, (3) the initial structures, (4) the environment, (5) the fitness function which evaluates the structures in their interaction with the environment, (6) the operations that are performed to modify the structures, (7) the procedure for using the information available at each step of the process to select the operations and structures to be modified, (8) the state (memory) of the algorithmic system at each point in time, and (9) the method for terminating the process and identifying its output.

The structures that undergo adaptation in the process are hierarchically structured computer programs whose size and shape can dynamically change during the process. This is in contrast to the one-dimensional linear strings (whether of fixed or variable length) of characters (or other objects) used in conventional genetic algorithms.

Various programming languages (e.g. FORTH) might be suitable for accomplishing the work described in this invention. However, the LISP programming language (first developed by John McCarthy in the 1950's) is especially well-suited for handling hierarchies, recursion, logical functions, compositions of functions, self-modifying computer programs, self-executing computer programs, iterations, and complex structures whose size and shape is dynamically determined (rather than predetermined in advance). The LISP programming language is especially appropriate when the structures to be manipulated are hierarchical structures. Moreover, both programs and data have the same form in LISP.

The set of possible programs for a particular domain of interest depends on the functions and terminals that are available in the domain. The possible programs are those that can be composed recursively from the available set of n functions $F = \{f_1, f_2, \ldots, f_n\}$ and the available set of m terminals $T = \{t_1, t_2, \ldots, t_m\}$. Each particular function f in F takes a specified number $z(f)$ of arguments $b_1, b_2, \ldots, b_{z(f)}$.

Note that Polish form is used to represent the application of a function to its arguments in the LISP programming language. Thus, for example, (+ 1 2) evaluates to 3. In Common LISP, any argument can itself be an S-expression so that, for example, (+1 (*2 3)) evaluates to 7. The S-expression (+1 2 (IF (>TIME 10) 3 4)) demonstrates the function > being applied to the variable terminal TIME and the constant terminal 10. The sub-expression (>TIME 10) then evaluates to either T (True) or NIL, and this value becomes the first argument of the "function" IF. The function IF returns either its second argument (the constant terminal 3) or the third argument (the constant terminal 4) according to whether the first argument is T or NIL, respectively. The entire S-expression thus evaluates to either 6 or 7.

The search space for non-linear genetic algorithms is the space of valid programs that can be recursively created by compositions of the available functions and available terminals for the problem. This search space can, equivalently, be viewed as the hyperspace of rooted point-labeled trees in the plane having internal points labeled with the available functions and external points (leaves) labeled with the available terminals.

The process of generating the initial random population begins by selecting one of the functions from the set F at random to be the root of the tree. Whenever a point is labeled with a function (that takes k arguments), then k lines are created to radiate out from the point. Then for each line so created, an element is selected at random from the entire combined set C, where C is the set of functions and terminals for the problem, to be the label for the endpoint of that line. If a terminal is chosen to be the label for any point, the process is then complete for that portion of the tree. If a function is chosen to be the label for any such point, the process continues. The probability distribution over the terminals and functions in the combined set C and the number of arguments required for each function determines an average size for the trees generated by this process. In this invention, this distribution is typically a uniform random probability distribution over the entire set C (with the exception of the root of the tree where the selection is limited to just the functions in F); however, it is possible to bias the initial population for a particular problem with a non-uniform distribution or with entire seeded individuals that might be useful in solving the particular problem at hand.

Each individual in a population is assigned a fitness value as a result of its interaction with the environment. Fitness is the driving force of Darwinian natural selection and genetic algorithms.

The environment is a set of cases which provide a basis for evaluating particular programs.

For many problems, the "raw fitness" of any program is the sum of the distances (taken over all the environmental cases) between the corresponding point in the solution space (whether real-valued, complex-valued, vector-valued, symbolic-valued, Boolean-valued, or integer-valued) for each of the values returned by the program for a given set of arguments and the correct points in the solution space.

If the solution space is integer-valued or real-valued, the sum of distances is the sum of absolute values of the differences between the numbers involved. In particular, the raw fitness $r(h,t)$ of an individual program h in the population of size M at any generational time step t is:

$$r(h, t) = \sum_{j=1}^{N_e} |V(h, j) - S(j)|$$

where $V(h,j)$ is the value returned by the program h for environmental case j (of $N_e$ environmental cases) and where $S(j)$ is the correct value for environmental case j.

If the solution space is Boolean-valued, the sum of distances is the number of mismatches. If the solution space is symbolic-valued, the sum of distances is, similarly, the number of mismatches. If the solution space is complex-valued, vector-valued, or multiple-valued, the sum of the distances is the sum over the various components. Either the sum of the absolute values of the distances or the Euclidean distance (square root of the sum of the squares of the distances) can be used. The closer this sum of distances is to zero, the better the program.

The raw fitness value can be converted so that a lower numerical value is always a better value. This converted raw fitness value is referred to as the standardized fitness. For a particular problem wherein a lesser value of raw fitness is better, the standardized fitness equals the raw fitness for that problem. In the currently preferred embodiment, it is convenient to make the best value of standardized fitness equal to 0. If this is not the case, the standardized fitness can be made so by subtracting or adding a constant.

Each raw fitness value may then be adjusted (scaled) to produce an adjusted fitness measure a(h,t). The "adjusted fitness" value is $$a(h,t) = 1/(1 + r(h,t)),$$

where r(h,t) is the raw fitness for individual h at time t. Unlike raw fitness, the adjusted fitness is larger for better individuals in the population. Moreover, the adjusted fitness lies between 0 and 1.

Each such adjusted fitness value a(h,t) is then normalized. The "normalized fitness" value n(h,t) is $$n(h, t) = a(h, t) / \sum_{j=1}^{M} a(j, t)$$

where M is the population. The normalized fitness not only ranges between 0 and 1 and is larger for better individuals in the population, but the sum of the normalized fitness values is 1. Thus, normalized fitness can be viewed as a probability value.

The raw fitness, standardized fitness, adjusted fitness and normalized fitness can be computed in several alternative ways. In the currently preferred embodiment, the normalized fitness should ideally, however, (i) range between 0 and 1, (ii) be larger for better individuals in the population, and (iii) the sum of the normalized fitness values should be 1.

If the solution space is integer-valued or real-valued, the sum of squares of distances can, alternatively, be used to measure fitness (thereby increasing the influence of more distant points). It is also possible for the fitness function to consider factors in addition to correctness (e.g. efficiency of the program, parsimony of the program, compliance with the initial conditions of a differential equation, successfully reaching a sub-goal, etc.) It is also possible to compute the fitness function using a sampling of the possible environmental cases (including possibly a sampling that varies from generation to generation to minimize the possible bias resulting from such sampling within any one generation).

The two primary operations for modifying the structures undergoing adaptation are Darwinian fitness proportionate reproduction and crossover (recombination). In addition to the two primary genetic operations of fitness proportionate reproduction and crossover, there are other secondary operations for modifying the structures undergoing adaptation. They are mutation, permutation, editing, and the define building block (encapsulation) operation.

The operation of fitness proportionate reproduction for genetic programming is the basic engine of Darwinian reproduction and survival of the fittest. It is an asexual operation in that it operates on only one parental entity. The result of this operation is one offspring. In this operation, if $s_i(t)$ is an individual in the population at generation t with fitness value $f(s_i(t))$, it will be copied into the next generation with probability:

$$f(s_i(t)) / \sum_{j=1}^{M} f(s_j(t)).$$

The crossover (recombination) operation for non-linear genetic algorithms, i.e. genetic programming, is a sexual operation that starts with two parental entities. At least one of the parents is typically chosen from the population with a probability based on its respective normalized fitness. The result of the crossover operation is two offspring programs.

Every LISP S-expression (program, entity) can be depicted graphically as a rooted point-labeled tree in a plane whose internal points are labeled with functions, whose external points (leaves) are labeled with terminals, and whose root is labeled with the function appearing just inside the outermost left parenthesis. The operation begins by randomly and independently selecting one point in each parent using a specified probability distribution (discussed below). Note that the number of points in the two parents typically are not equal. As will be seen, the crossover operation is well-defined for any two S-expressions. That is, for any two S-expressions and any two crossover points, the resulting offspring are always valid LISP S-expressions. Offspring contain some traits from each parent.

The "crossover fragment" is produced by deleting the crossover fragment of the first parent from the first parent, and then impregnating the crossover fragment of the second parent at the crossover point of the first parent. In producing this first offspring the first parent acts as the base parent (the female parent) and the second parent acts as the impregnating parent (the male parent). The second offspring is produced in a symmetric manner.

Note also that because entire sub-trees are swapped, this genetic crossover (recombination) operation produces valid LISP S-expressions as offspring, regardless of which point is selected in either parent.

Note that as the root of one tree happens to be selected as the crossover point, the crossover operation will insert that entire parent into the second tree at the crossover point of the second parent. In addition, the sub-tree from the second parent will, in this case, then become the second offspring. If the roots of both parents happen to be chosen as the crossover points, the crossover operation simply degenerates to an instance of fitness proportionate reproduction.

Note that as an individual mates with itself, the two resulting offspring will generally be different (if the crossover points selected are different).

Note that if a terminal is located at the crossover point selected in both parents, the crossover operation merely swaps these terminals from tree to tree. Similarly, if a terminal is located at the crossover point in precisely one parent, then the sub-tree from the second parent is inserted at the location of the terminal in the first parent, and the terminal from the first parent is inserted at the location of the sub-tree of the second parent. In this case, the crossover operation often has the effect of increasing the depth of one tree and decreasing the depth of the second tree. A non-uniform probability distribution allocating about 90% of the crossover points equally amongst the internal (function) points of each tree and 10% of the crossover points equally amongst the external (terminal) points of each tree is advantageous. This non-uniform probability distribution promotes the recombining of larger structures than would be the case with a uniform distribution (which may do an inordinate amount of mere swapping of terminals from tree to tree in a manner more akin to point mutation than true crossover).

The basic principle of crossover is that part of one parent, and part of another parent, are recombined to produce the offspring. Thus, other variations on the basic crossover operation may be advantageous.

The mutation operation provides a means for introducing small random mutations into the population.

The mutation operation is an asexual operation in that it operates on only one parental program. The individual is selected in a manner proportional to normalized fitness. The result of this operation is one offspring entity. The mutation operation selects a point of the entity at random. The point of insertion can be an internal (function) or external (terminal) point of the tree. This operation removes whatever is currently at the selected point and inserts a randomly generated sub-tree at the randomly selected point of a given tree. When an entity having automatically defined functions is subject to the mutation operation, the tree grown at the selected point is limited with respect to the allowable functions and terminals which can appear. This limit is similar to the limit the crossover operation is subject to with entities having automatically defined functions in that the only allowable functions and terminals are those which have meaning at the mutation point in the entity. This operation is controlled by a parameter which specifies the maximum depth for the newly created and inserted sub-tree. A special case of this operation involves inserting only a single terminal (i.e. a sub-tree of depth 0) at a randomly selected point of the tree.

The mutation operation potentially can be beneficial in reintroducing diversity in a population that may be tending to prematurely converge.

The define building block operation, known commonly as encapsulation, is a means for identifying potentially useful "building blocks" while the algorithm is running. The define building block operation is an asexual operation in that it operates on only one parental program. The individual is selected in a manner proportional to normalized fitness. The operation selects a function (internal) point of the program at random. The result of this operation is one offspring program and one new definition. The define building block operation works by defining a new function of no arguments and by replacing the sub-tree located at the chosen point with a call to the newly encapsulated building block. The body of the newly defined function is the sub-tree located at the chosen point. The newly encapsulated building blocks are named DF0, DF1, DF2, DF3, . . .

For the first occasion when a new function is defined on a given run, "(DF0)" is inserted at the point selected in the program. The newly defined function is then compiled. Thereafter, it is never changed during the run. The function set of the problem is then augmented to include the new function so that, if mutation is being used, the arbitrary new sub-tree grown at the selected point might include a call to the newly defined function.

Note that, for each operation described above, the original parent program is unchanged by the operation. Moreover, since the selection of the parental program is in proportion to fitness, the original unaltered parental program may participate in additional genetic operations during the current generation, including fitness proportionate reproduction, crossover (recombination), mutation, permutation, editing, or the define building block (encapsulation) operation.

The state of the non-linear genetic algorithm system at any stage in the process (as with genetic algorithms in general) consists only of the current population of individuals in the population. There is no additional memory, centralized bookkeeping, or administration to guide the adaptive process.

The algorithm is controlled by various parameters, including three major parameters, namely the population size, the number of individuals in the population undergoing fitness proportionate reproduction, and the number of individuals in the population undergoing crossover.

In general, population size is the parameter that must be adjusted to accommodate the complexity of the problem at hand. A larger population is, in the absence of any other consideration, better at producing a solution to the problem at hand than a smaller population. However, as the population size is increased, there may be decreasing benefits in relation to the increased amount of resources needed. Crossover is typically performed on 90% of the population. That is, if the population size is 300, then 135 pairs of individuals (270 individuals) from each generation are selected (with reselection allowed) from the population with a probability equal to their normalized adjusted fitness. Fitness proportionate reproduction is typically performed on 10% of the population on each generation. That is, 30 individuals from each generation are selected (with reselection allowed) from the population of 300 with a probability equal to their normalized adjusted fitness. Note that the parents remain in the population and can often repeatedly participate in other operations during the current generation. That is, the selection of parents is done with replacement (i.e. reselection) allowed. Mutation and permutation are used very sparingly. Their use at a rate of 1 per generation would be acceptable for many problems.

Several minor parameters are used to control the computer implementation of the algorithm. In all of the examples described herein, a maximum depth of 17 was established for entities produced by crossover. This limit prevented large amounts of computer time being expended on a few extremely large (and usually highly unfit) individual entities. Of course, if we could execute all the individual entities in parallel (as nature does) in a manner such that the infeasibility of one individual in the population does not proportionately jeopardize the resources needed by the population as a whole, we would not need this kind of limit. Thus, if a crossover between two parents would create an individual whose depth exceeded this limit, the crossover operation is simply aborted. In effect, the contemplated crossover operation is replaced with fitness proportionate reproduction for the two parents. Similarly, a maximum depth of 6 was established for the random individuals generated for generation 0. Note that these limits are not necessary. They are merely a convenient and effective way to limit the use of resources (which is especially important with serial machinery).

The solution produced by this process at any given time can be viewed as the entire population of disjunctive alternatives (presumably with improved overall average fitness), or more commonly, as the single best individual in the population during the run. The process can be terminated when either a specified total number of generations have been run or when some performance criterion is satisfied. For example, if a solution can be recognized if it is discovered, the algorithm can be terminated at that time and the single best individual can be considered as the output of the algorithm.

We now summarize below the six major steps necessary for using genetic programming.

The first major step is to identify the appropriate set of variable and constant terminals for the problem. For some problems, this identification may be simple and straightforward. For example, in the symbolic regression problem with one independent variable, the single necessary variable terminal in the problem corresponds to the single independent variable of the problem. The difficulty in identifying an appropriate set of actual variables of the problem for a particular problem, if any, usually arises from the inherent difficulty (common to all science) of correctly identifying variables which have explanatory power for the problem at hand. For example, one would not be able to discover Kepler's Third Law if one were given only the color of the surface of the planets.

Constant terminals, if required at all, can enter a problem in two ways: One way is to use the constant creation procedure described herein. The second way for constant terminals to enter a problem is by explicitly including them. For example, one might include $\pi$ in a particular problem where there is a possibility that this particular constant would be useful. Of course, if one failed to include $\pi$ in such a problem, genetic programming would probably succeed in creating it (albeit at a certain cost in computational resources).

The second major step is to identify the appropriate set of functions for the problem. For real-valued domains, the obvious function set might be $\{+, -, *, \%\}$ (where % is the protected division function that returns 0 when division by zero is attempted). In a Boolean function learning domain, for example, a set of functions such as {AND, OR, NOT, IF} might be the choice. This set is certainly sufficient for any Boolean function learning problem since it is computationally complete. Moreover, this set is convenient in that it tends to produce easily understood logical expressions. Of course, the function set might consist of NAND alone, and in some domains (e.g. design of semiconductor logic networks), this might be a natural choice.

If the problem involves economics (where growth rates and averages often play a role), the function set might also include the exponential, logarithmic, and moving average functions in addition to the four basic arithmetic operations. Similarly, the SIN and COS functions might be useful additions to the function set for some problems.

Some functions may be added to the function set merely because they might possibly facilitate a solution (even though the same result could be obtained without them). For example, one might include a squaring function in certain problems even though the same result could be attained without this function (albeit at a certain cost in computational resources).

Sometimes, the consequence of failing to include a potentially useful function is that one gets a rough approximation to the missing function. For example, if the SIN, COS or EXP function were missing from a function set, one might get the first one or two terms of the Taylor power series expansion of those functions in a solution in lieu of the missing function.

In any case, the set of functions must be chosen and/or defined so that the value of any composition of the available functions or terminals that might be encountered as arguments to a function is valid. Thus, if division is to be used, the division function should be modified so that division by zero is well-defined. The result of a division by zero could be defined to be zero, a very large constant, or a new value such as "infinity". Note that, in Common LISP, one could define the result of a division by zero as the keyword value "infinity". Then each of the other functions in the function set must be well-defined if this "infinity" value happens to be the value of one of its arguments. Similarly, if square root is one of the available functions, it could either by an especially defined real-valued version that takes the square root of the absolute value of the argument or it could be LISP's complex-valued square root function. If logical functions are to be mixed with numerical functions, then a real-valued logic should be used. For example, the greater-than function GT can be defined so as to assume the real value 1.0 if the comparison relation was satisfied and the real value 0.0 otherwise.

Note that the number of arguments must be specified for each function. In some cases, this specification is obvious or even mandatory (e.g. the Boolean NOT function, the square root function). However, in some cases (e.g. IF, multiplication), there is some latitude as to the number of arguments. One might, for example, include a particular function in the function set with differing numbers of arguments. The IF function with two arguments, for example, is the IF-THEN function, whereas the IF function with three arguments is the IF-THEN-ELSE function. The multiplication function with three arguments might facilitate the emergence of certain cross product terms, although the same result could be achieved with repeated multiplication function with two arguments. It maybe useful to include the PROGN ("program") function of Common LISP with varying number of arguments in a function set to act as a connective between the unknown number of steps that may be needed to solve the problem.

The choice of the set of available functions, of course, directly affects the character of the solutions that can be attained. The set of available functions forms a basis for generating potential solutions. For example, if one were trying to do symbolic regression on the simple absolute value function on the interval $[-1, +1]$ and the function set contained the IF-THEN-ELSE function and a (unary) subtraction function, one might obtain a solution in the familiar form of a conditional test on x that returns either x or $-x$. On the other hand, if the function set contained COS, COS3 (i.e. cosine of 3 times the argument), COS5 (i.e. cosine of 5 times the argument) instead of the IF-THEN-ELSE function, one might obtain a solution in the form of a Fourier series approximation to the absolute value function. Similarly, if the $\Sigma$ summation operator were not available in a real-valued problem for which the solution was an exponential, one would probably see the first couple of polynomial terms of the Taylor series in the solution instead of $e^x$.

The third major step is the construction of the environment for the problem. In some problems, the nature of the environment is obvious and straight-forward. For example, in the symbolic function identification (symbolic regression), empirical discovery, and Boolean function learning problems, the environment is simply the value(s) of the independent variable(s) associated with a certain sampling (or, perhaps, the entire set) of possible values of the dependent variable(s). In some problems, the environment is a set of "starting condition" cases. In some problems where the environment is large and not susceptible to simple random sampling, a representative sampling must be constructed. In some problems, such as solving pairs of linear equations and solving quadratic equations, the environment is a set of equations and their respective solution points.

The fourth major step is construction of the fitness function, i.e. the function that, given an entity in the population, activates the entity and returns its value (fitness). For most problems, the fitness function is constructed in a simple, natural, and straightforward way as the sum of the distances (taken over all the environmental cases) between the point in the solution space returned by the program for a given set of actual variables of the problem and the correct point in the solution space. In general, the only issue is the minor issue of whether to use the absolute value of the difference or the square of the difference in computing the distance. However, the fitness function can sometimes be somewhat more complicated (and correspondingly, more powerful).

The fifth major step is the selection of the major and minor parameters of the algorithm and a decision on whether to use any of the secondary genetic operations. Often, the selection of the population size is the most important choice. In general, the larger the population the better. But, the improvement due to a larger population may not be proportional to the increased computational resources required.

Finally, the sixth major step is the selection of a termination criterion and solution identification procedure. The approach to termination depends on the problem. In many cases, the termination criterion may be implicitly selected by merely selecting a fixed number of generations for running the algorithm. For many problems, one can recognize a solution to the problem when one sees it. Examples are problems where the sum of differences becomes zero (or, acceptably close to zero, if the problem is in a real-valued domain). However, for some problems (such as problems where no exact mathematical solution is known), one cannot necessarily recognize a solution when one sees it (although one can recognize that the current result is better than any previous result or that the current solution is in the neighborhood of some estimate to the solution). The solution identification procedure is often simply a matter of identifying the best single individual of some generation where the termination criterion is satisfied as the solution to the problem.

Note the process described herein may be used to obtain useful approximations, in functional form, of the solution to difficult or intractable problems. The result may only be a good fit or good approximation to the solution of the problem.

There are numerous opportunities to use domain specific heuristic knowledge in connection with genetic programming. First, it may be useful to include domain specific heuristic knowledge in creating the initial random population. This might include inserting sub-programs believed to be useful for solving the problem at hand. This might also include using a probability distribution other than the uniform distribution to initially select the functions and terminals when the initial random individuals are recursively generated. Secondly, domain specific heuristic knowledge may be helpful in over-selecting or under-selecting of certain points in the computer programs for the crossover operation. This may even include protecting certain points from selection for crossover under certain circumstances or requiring certain points to be selected for crossover under certain circumstances. Thirdly, domain specific heuristic knowledge may be useful in varying the parameters of the run based on information gained during the run. Fourth, domain specific heuristic knowledge can be used in the selection of the set of available functions and terminals for the problem so that this set is not merely minimally sufficient to solve the problem, but so that the set of available functions and terminals actively facilitates solution of the problem.

Because the process described herein involves executing and modifying computer programs in non-standard ways and because these computer programs were either originally generated at random or created genetically, a number of practical computer implementation issues come to the forefront.

First, it should be noted that if the experimenter chooses to use the Common LISP function EVAL to activate individual LISP S-expressions while measuring their fitness, the evaluation will work correctly only if all of the actual variables of the problem appearing in the given S-expressions are proclaimed to be special (global) variables.

Secondly, an efficient implementation of the crossover operation in LISP uses the COPY-TREE and RPLACA functions in LISP. First, the COPY-TREE function is used to make a copy of each parent. Then, the RPLACA function is used to destructively change the pointer of the CONS cell of the copy of one parent at its crossover point so that it points to the crossover fragment (subtree) of the copy of the other parent. Then, the RPLACA function is used to destructively change the pointer of the CONS cell of the copy of second parent at its crossover point so that it points to the crossover fragment (subtree) of the copy of the first parent. After destructively changing the pointers in the copies, the resulting altered copies become the offspring. The original parents remain in the population and can often repeatedly participate in other operations during the current generation. That is, the selection of parents is done with replacement (i.e. reselection) allowed.

Third, because the process described herein involves executing randomly generated computer programs, the individuals in the initial random population as well as the individuals produced in later generations of the process often have sub-expressions which evaluate to astronomically large numbers or very small numbers. When the range is integral, the BIGNUM mode is automatically used in the Common LISP programming language. In this mode, integer numbers can grow arbitrarily large (limited only by the virtual address space of the machine). Thus, the potential growth in size of the integers produced by the randomly generated S-expressions presents no problem, as a practical matter. On the other hand, when the range is real-valued, floating point overflows or underflows will frequently occur. In problems involving such floating point variables, it is therefore a practical necessity to wrap the entire algorithm in error handlers that accommodate every possible kind of floating point underflow and overflow applicable to the particular computer involved or alternatively to define each of the functions in the function set to obviate such concerns.

Fourth, it is important to note that this non-linear genetic algorithm is probabilistic in the following four different ways: (a) the initial population is typically generated entirely at random from the available functions and terminals; (b) both parental individuals participating in the crossover operation are chosen at random (typically, at least one individual is chosen randomly proportionate to fitness and the other is chosen either randomly proportionate to fitness or simply at random using a uniform probability distribution); (c) the crossover points within each parent are selected at random (using a uniform probability distribution); and (d) the individuals undergoing the operation of fitness proportionate reproduction are chosen randomly in proportion to normalized fitness. Thus, in implementing genetic algorithms on a computer, it is important to have an effective randomizer that is capable of producing the numerous random integers and probability values needed by the algorithm. Many randomizers originally written for the purpose of generating random floating point numbers are not suitable for this purpose. A randomizer with 3 independent seeds was used here. It is also convenient, for experimental purposes, to have the option of seeding the randomizer so that interesting runs can potentially be replicated (e.g. perhaps with additional details displayed, such as an audit trail).

Fifth, for all but the simplest problems, the overwhelming majority of computer time is consumed by the evaluation of fitness of the individuals (rather than, as one might suppose, the actual genetic operations or other administrative aspects of the program). For some problems, fine-grained parallel computers, and "data parallelism" techniques may be advantageous. When the fitness calculation consumes the overwhelming majority of computer time, then fine-grained parallel computers (as compared to coarse-grained parallel computers) and the techniques of "data parallelism" confer no particular advantage. The problem may simply be parallelized by handling the environmental cases in parallel. Similarly, if this concentration exists, ones efforts at optimization must necessarily be focused almost entirely on the relatively small number of lines of code that are used to compute fitness (over the various environmental cases of the particular problem). One highly effective way to optimize the fitness calculation is to create a look-up table of S-expressions that have been previously encountered so that their fitness need not be recomputed. This hash table can span both generations and runs (provided the environmental cases remain the same). Note that the technique of look-up tables may be, however, inconsistent with the technique of changing the environmental cases on every generation so as to minimize the possible bias of a small sampling of environment cases. The technique works best on problems for which, for whatever reason, genetic diversity is low.

Sixth, many problems involve time-consuming transcendental functions (e.g. EXP, SIN, COS) that are computed via Taylor power series. In such problems, both the initial randomly-generated individuals and the later genetically-created individuals in the population often contain multiple occurrences of these functions within a single individual. A considerable amount of computer time can be saved by evaluating these functions via table look-up, rather than direct computation.

Seventh, an informative and interactive interface is an invaluable tool in carrying out computer experiments in the field of machine learning. Accordingly, the computer program used herein has extensive interactivity, including three full-color graphs, a "hits histogram", a "fitness histogram" (in deciles of numerical fitness values), a window showing the best single program of the current generation in both graphical and symbolic form, three scrolling windows, and three non-scrolling windows (with various mouse-sensitive points for inspecting progress of the program while it is executing). The three color graphs provide a variety of information about the run in progress.

A first graph dynamically tracks the average normalized fitness of the population. This graph also tracks the number of "hits" for the best single individual of each generation for problems where exact matches are possible (or the number of "near hits" for real-valued numerical problems). This number of "hits" or "near hits" is not used by the genetic algorithm in any way. The algorithm uses only the fitness values computed from the sum of the distances described above. Nonetheless, the number of "hits" or "near hits" has proved to be extremely valuable for monitoring the overall progress of the algorithm.

A second graph dynamically tracks the average raw fitness of the population for each generation, the raw fitness of the best individual in the population, and the raw fitness of the worst individual in the population for each generation. This graph also displays the average raw fitness of the initial random population as a baseline.

A third graph is used only in a subset of the problems. This graph dynamically graphs the "target" function and the best individual program from the current generation. The best program changes with each generation. The horizontal axis of this graph is the domain of the problem area and the vertical axis is the range of the target function. In the case of symbolic integration and symbolic differentiation problems, the graph of the integral or derivative of the current best program is added to this third graph as an additional item.

A "hits histogram" showing the number of individuals in the population with a particular number of "hits" (or "near hits", for numerical problems) provides a particularly informative and dramatic view of the learning process. At the initial random generation, the bulk of the population appears at the far left of the histogram (with perhaps 0 or 1 hits). Then, after a few generations, the bulk of the population typically starts shifting gradually from left to right in the histogram. As learning takes place, this undulating "slinky" movement from left to right continues during the run. Finally, in the late stages of a run, individuals representing a perfect solution to the problem may start appearing at the far right of the histogram. Complete convergence occurs when 100% of the population becomes concentrated at the far right of the histogram (although one usually does not run the algorithm to that point). Premature convergence can often be readily identified from the histogram as a concentration of the population at one single-suboptimal number of hits. In contrast, normal progress towards a solution and towards convergence is typically indicated by a broad "flowing" distribution of individuals over many different numbers of hits in the histogram.

In addition, a "fitness histogram" showing the number of individuals in the population having a fitness lying on a particular numerical range of fitness values provides another informative view of the learning process. This histogram uses the actual fitness values representing the sum of the distances described above and is presented in deciles over the range of such fitness values. Note that this "fitness histogram" is based on the sum of distances, while the "hits histogram" is a count of the integral number of "hits" (or "near hits").

The eighth tool which could be utilized in optimizing genetic programming is visualization. In visualization, graphical representations are created of the behavior of various individuals from the population so that they can be animated at the time of creating, writing, debugging, and solving the problem.

Ninth, a variety of time savings techniques are available which save computer time while performing genetic programming. A vast majority of computer time when performing genetic programming is consumed by the calculation of fitness. Depending on the problem, the calculation of fitness can be lessened in one or more of the following ways.

One time savings technique can be utilized when the reproduction operation is chosen. When the reproduction operation is used, as it is on 10 percent of the population on every generation in one embodiment, there is no need to compute the fitness of a reproduced individual anew for the next generation (provided the user is not varying the fitness cases from generation to generation). Reproduced individuals can be flagged so that their fitness will not be recomputed in the new generation. This simple strategy of caching the already computed fitness values can speed up problem solving by the percentage of time the reproduction operation is used.

A second time savings technique can be employed where, in some problems, the values of all the state variables of the system stabilize under various circumstances. If this occurs in a problem when the functions have no side-effects, then it is not necessary to continue the simulation after the point of stabilization. The fitness may then merely be either the fitness accumulated up to that point or some simple adjustment to it.

A third time savings technique can be utilized when some trajectories through the state space of the problem are unacceptable for some reason exogenous to the mathematical calculation. If this is the case, a test for such unacceptable trajectories should be made so that the simulation of the system can be truncated as early as possible.

A fourth time savings technique can also be used if there are only a small number of possible combinations of values of the state variables of the system. In this case, a look-up table can be created and used in lieu of direct function evaluation. For example, for a two-dimensional cellular automation involving Boolean state transition functions operating in a von Neumann neighborhood at a distance of one unit, there are only $2^5 = 32$ possible combinations of inputs. Once the table is filled, a look-up can replace the activation of the individual for each cell on each time step. The saving is especially great for complicated individual programs containing a large number of points.

A fifth time savings technique can be implemented in some problems that involve complex intermediate calculations which can be simplified if one carefully considers the granularity of the data actually required to adequately solve the problem. For example, the calculation of sonar distances from a simulated robot to the walls of the room in which it operates involve complex and time-consuming trigonometric calculations. However, the nature of such robotics problems is such that there is often no need for great precision in these sonar distances (sensor values). Consequently, a 100 by 100 grid can be overlaid on the room creating 10,000 small squares in the room. When a robot is in a particular square, the 12 sonar distances can be reported as if the robot were at a midpoint of the square. Thus, a table of size 10,000 by N (where N is the number of sonar services) can be computed, placed in a file, and used forever after for this problem.

Another time savings technique can be employed in many problems where very little precision is required in the values of the four state variables. Typically, a single precision floating-point number in LISP (the default in most implementations of LISP) occupies two words of storage because of the tag bits required by LISP. The first word containing a pointer to the second word which actually contains the number. When very little precision is required for the floating-point numbers in a particular problem, the short-float data type can be used. In the short-float data type, the floating-point exponent and mantissa are sufficiently short so that they, along with the tag bits, fit into a single word of storage (i.e., usually 32 bits). This data type is faster and obviates consing. The short float data type is available on many implementations of LISP.

Yet another time savings technique can be utilized in problems for which the individual programs are especially complicated or for which the individual programs must be evaluated over an especially large number of fitness cases, a considerable amount of computer time may be saved by compiling each individual program. If this is done, the programs should be compiled into a temporary memory area, if possible, so that garbage collection can be programmatically invoked when the compiled versions of the programs are no longer needed. Many LISP systems cons new functions into a static memory area which, because it is not subject to garbage collection, will become clogged with unneeded function objects. Care must be taken to circumvent this behavior.

The eighth time saving tool is for the unusual case where a particular problem has a fitness evaluation which does not consume the vast majority of the computer time, the "roulette wheel" used in fitness proportionate operation when implemented in its most obvious way is an $O(M^2)$ algorithm. When the population is large, it may consume a surprising amount of computer time. This function can be optimized with a simple indexing scheme.

Symbolic Function Identification and Regression

Problems in the area of symbolic function identification require finding a function in symbolic form that fits given data points.

In linear regression, one is given a set of values of various independent variable(s) and the corresponding values for the dependent variable(s). The goal is to discover a set of numerical coefficients for a linear combination of the independent variable(s) which minimizes some measure or error (such as the sum of the squares) between the given values and computed values of the dependent variable(s). Similarly, in quadratic regression, the goal is to discover a set of numerical coefficients for a quadratic expression which similarly minimizes the error. In Fourier "regression", the goal is to discover a set of numerical coefficients for sine and cosine functions of various periodicities which similarly minimizes error.

Of course, it is left to the researcher to decide whether to do a linear regression, quadratic regression, or a higher order polynominal regression or whether to try to fit the data points to some non-polynominal family of functions (e.g. sines and cosines of various periodicities, etc.). But, often the most difficult and most important issue is deciding what family of functions most appropriately fits the data, not merely computing the numerical coefficients given the appropriate functional form of the model.

For example, suppose we are given a sampling of the numerical values from an unknown curve over 20 points in the domain −2 to +2. That is, we are given 20 pairs ($x_i$, $y_i$). These points might include pairs such as (+1.0, +5.86), (+2.0, +17.16), (−1.0, −0.42), (−2.0, +4.59), etc. The goal is to find the function, in symbolic form, from the 20 pairs of numerical data points. (The unknown curve happens to be $2.71828x^2 + 3.14159x$ for this example).

Figure 19:
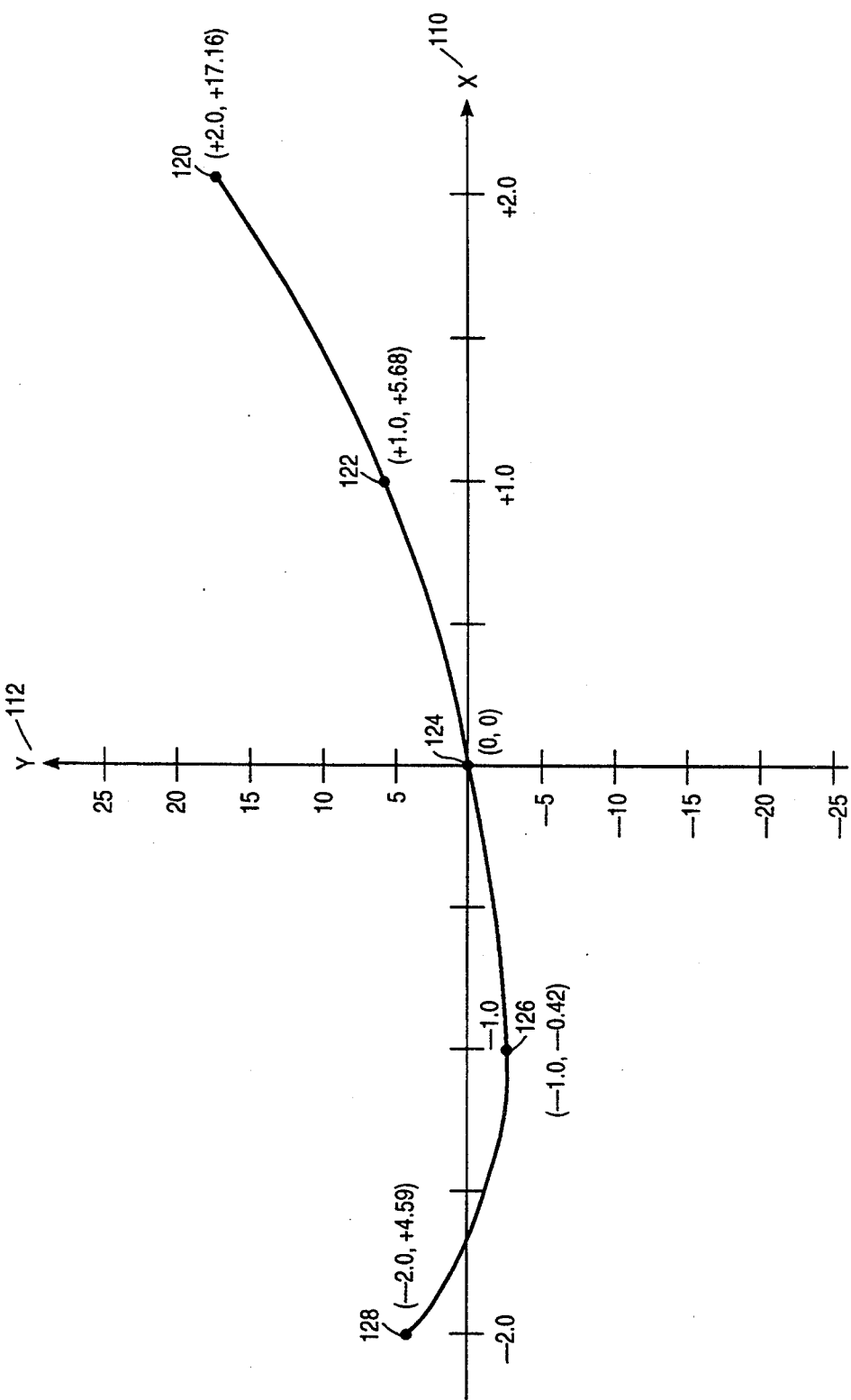

FIG. 19 is a graph of the pairs of points for the unknown curve. The curve is graphed in a conventional way in a plane defined by the horizontal axis (X-axis) 110 and the vertical axis 112. In FIG. 19, only 5 points of the curve are shown. The points on the curve are drawn with a solid line. Starting at far right, the point 120 is the point on the curve (+2.0, +17.16). That is, when x is +2, the value of the curve is +17.16. The point 122 is the point (+1.0, +5.86) on the curve. The point 124 is the point (0, 0) on the curve. The point 126 is the point (−1.0, −0.42) on the curve. The point 128 is the point (−2.0, +4.59) on the curve.

FIG. 20 is a graph of another curve, namely y=7x. Point 130 is the point (2, 14) on the curve. Point 132 is the point (1, 7). Point 134 is the point (0, 0) on the curve. Point 136 is the point (−1, −7) on the curve. Point 138 is the point (−2, −14) on the curve.

FIG. 21 is a graph of another curve, namely $y=3x^2$. Point 140 is the point (2, 12) on the curve. Point 142 is the point (1, 3) on the curve. Point 144 is the point (0, 0) on the curve. Point 146 is the point (−1, 3) on the curve. Point 148 is the point (−2, 12) on the curve.

Neither the second curve nor the third curve is a good fit to the first curve. However, each curve bears some resemblance to the unknown curve. For example, the first curve is generally closer to the unknown curve than the second curve when x is positive. That is, points 120 and 122 are closer to the unknown curve than points 140 and 142. However, the second curve is not very close to the unknown curve when x is negative. While the second curve is a straight line, the third curve is of the same general parabolic shape as the unknown curve. While neither the second curve nor the third curve are particularly good fits to the unknown curve, they are far better than many alternatives, such as Y=7x+10, $Y=x^3+x^2+x+1$, etc.

The desired solution to this problem of finding an unknown function in symbolic form can be viewed as a search for a function from a hyperspace of functions that can be composed from a set of candidate functions. The set of available candidate functions might include addition (+), subtraction (−), and multiplication (*). The set of actual variables of the problem for this particular problem consists of just the independent variable X.

In symbolic regression problems, the problem is both the discovery of the correct functional form that fits the data and the discovery of the appropriate numeric coefficients.

Discovery of the appropriate numeric coefficients is a new problem that must be addressed in order to successfully do symbolic regression. This problem of constant creation can be solved by extending the terminal set by one ephemeral element (called "R") during the generation of the initial random population. Thus, the terminal set for this problem would be enlarged to size 2 for this particular problem. Whenever the ephemeral random constant terminal is chosen for any point of the tree during the generation of the initial random population, a random number in a specified range is generated and attached to the tree at that point. In this particular problem, the random constants were real numbers between −1.0 and +1.0. Of course, in a problem involving integers (e.g. induction of a sequence of integers), integers would be used for the ephemeral "R" terminals. This generation is done anew for each such point so that the initial random population of individuals contains a variety of different random numbers.

The random number produced by the ephemeral "R" terminals will then be moved around from tree to tree by the various crossover operations that occur and will become embedded in various sub-trees that are subject to various arithmetic operations. This moving around of the constants is not at all random, but instead is driven by the overall process of achieving ever higher levels of fitness. A symbolic expression that is a reasonably good fit to a target function may become a better fit if a particular constant is, for example, decreased slightly. A slight decrease can be achieved in several different ways. For example, there may be a multiplication by 0.90, a division by 1.10, a subtraction of 0.08, or an addition of −0.04. However, things are not always so direct.

In one particular problem where $\pi/2$ was needed, $2-\pi/2$ (about 0.429) was approximated by a succession of decreasing numbers in 11 steps. Starting with the available constant 1 and the available function SIN, (SIN 1) was computed as 0.841. Then the SIN of 0.841 was taken to obtain a still smaller number, namely 0.746. This result was then squared to obtain a still smaller number, namely 0.556. Then the SIN function was successively applied six more times to obtain a succession of still smaller numbers, of which the last one was 0.433. That is, the composition (SIN (SIN (SIN (SIN (SIN (SIN (* (SIN (SIN 1)) (SIN (SIN 1)))))))) was used to compute the constant 0.433 which is very close to the value 0.429 that was needed.

Referring again to the regression examples in FIGS. 16–18, the best individual in the initial random population of individuals did not come close to any of the 20 actual given data points and the sum of the deviations between it and the 20 points was very large. However, starting with generation 1, the average population began improving.

Starting in generation 41, the best individual program was (+(− (* −0.50677 X) (+ (* −0.50677 X) (*−0.76526 X)))
(* (+ 0.11737) (+ (− X (* −0.76527 X)) X).

This program is equivalent to $2.76X^2+3.15X$.

In other runs, the symbolic regression was successfully performed on additional target expressions such as $X^4+X^3+X^2+X$ and SIN X+COS $X+X^2+X$ using function sets containing SIN, COS, and a restricted logarithm function RLOG (i.e. the logarithm of the absolute value returning 0 for an argument of 0).

Programmatic Data Encoding and Image Compression

Symbolic regression can also be performed on an n-dimensional space of data values. Typically, the data values on which symbolic regression is performed are ordered. The source of the set of data values includes data values representing various signals, such as those from communications media, acoustic and sonic equipment, electromagnetic equipment, etc. Performing symbolic regression on the ordered set of data values generates a procedure (e.g., a function) which approximates those data values, such that the procedure (e.g., function) can be used to replace those data values, thereby encoding the data. The resulting data encoding (i.e., compression) may encode the data into a single-valued function or a function returning a vector of values representing more than one attribute of the data, wherein the term vector encompasses arrays, matrices, vectors, and other compound data structures components. An example of a vector is a set of component values representing a pixel value which indicates the separate color intensities or luminance in a color image system.

One specific application of the present invention is image compression, wherein symbolic regression is performed on a two-dimensional array of data representing the value of the pixels for a given image. The image data values could represent either a gray scale or color image or a false-color sonar, radar or infra red image, for example. Thus, symbolic regression (i.e., error-driven evolution) generates an entity which approximates the image. In the currently preferred embodiment, the entity is a computer program which approximates the image. The computer program is in the form of a program or other comparable computational structure, which exactly or approximately represents a given image. In this manner, upon receiving an image, a computer program can be generated which represents that image. Thus, by converting an image to a program that describes it or describes our approximation to it, it is possible that images involving large numbers of pixels can be represented in a compressed form and stored at a lower cost or transmitted using comparatively little bandwidth.

In the case of the ordered set of data values representing a color image, symbolic regression is performed to generate a computer program which approximates the set of data values. Initially, to apply the process, the terminals and the functions must be specified. As mentioned in the section entitled "BACKGROUND OF THE INVENTION," a typical computer screen is made up of multiple pixels arranged in a two-dimensional arrangement. The position of the pixels runs horizontally and vertically (i.e., X-Y coordinates). In order to find a program that represents the color image, a program must return an appropriate value denoting the color when activated for each pixel in the two-dimensional color image. Normally, each pixel contains one of the multiple colors in a color spectrum. For example, the pixel may contain a number from 1 to 256 representing one of 256 colors. On the other hand, a pixel could contain a vector of attribute values, such as the three-dimensional red-green-blue (RGB) intensities of the characteristics of hue, chromanence, saturation, etc. A numeric interval is defined which represents with suitable resolution all of the colors in the color spectrum. Where a numeric interval is less than the total number of colors in the color spectrum, non-integral numbers must represent the colors in the interval, whereby the colors are represented by portions of whole numbers. The terminal set for a typical color image compression problem consists of the horizontal location of the pixel value (X), the vertical location of the pixel value (Y) and the floating point constants (R) in a specified interval. The set of functions that might be needed to express the solution to the problem are {+, −, *, %, IFLTE}, where % is the zero protected division function, and where IFLTE is the conditional comparative function "IF Less Than or Equal". IFLTE is a four argument function that compares its first argument to its second argument. If its first argument is less than or equal to its second argument, this function evaluates its third argument, but otherwise it evaluates its fourth argument. This function would be implemented as a macro in a programming language such as LISP. Other conditional functions for testing various conditions can be similarly defined. A conditional comparative function such as IFLTE is often advantageous in the function set of a problem involving programmatic image compression.

In general, data is not necessarily arranged in terms of two dimensions and two independent variables. If a sequence of two dimensional images were presented over a period of time, the data would be considered three dimensional and the terminal set would be T={X, Y, T, R}, where T in the set denotes time. If the data were not image data, it might be arranged in terms of any number of independent variables. If, for example, the data were indexed according to four independent variables (e.g., I, J, K, and L), then the terminal set would be T={I, J, K, L, R}, where the random constant R would be an appropriate data type for the independent variables and dependent variables involved.

Although we illustrate the present invention using numeric data and using functions that act on numeric data, it is to be noted that data in general, need not take on only numeric values and need not be arranged in terms of numeric values. The general requirement is that the function set must be closed in the sense that it contains functions which are well defined for any combination of values returned by any function in the function set or values assumed by any terminal in the terminal set of the particular problem. When non-numeric data is involved in a particular problem, the appropriate conditional comparative function might be a three-argument conditional equality-testing function that tests whether its first argument is equal to its second argument (rather than the IFLTE function which assumes that the data values are numerically ordered so that one data value is, or is not, less than another data value. If the first argument of this proposed conditional equality-testing function is equal to its second argument, this function evaluates its second argument, but otherwise it evaluates its third argument.

The fitness cases are the total number of pixels in the two-dimensional array of the display screen. For example, in a display screen having 30 pixels in the vertical direction and 30 pixels in the horizontal direction, the fitness cases total 900 separate pixels (i.e., 30×30=900). In this manner, the raw fitness is typically the sum, taken over the total number of fitness cases, of the error between the value produced by the program for the pixel at position (X, Y) and the color value of the target image for the pixel at position (X, Y). In programmatic image compression, standardized fitness is the same as raw fitness. Thus, when the raw fitness returns a sum of zero, the standardized fitness measure also returns zero.

In the currently preferred embodiment, a wrapper converts the arbitrary floating point numbers into one of the 128 color values used in the example. The number of fitness cases for which the value of the wrapperized program comes within a certain number of color values of the correct value is considered a hit. For instance, where 128 colors are in the color spectrum, the value may have to come within one color value to be considered a hit.

In the currently preferred embodiment for the problem, the typical population size for the problem described is approximately 2,000, while terminating at a maximum number of generations G=51 or when an individual scores a total number of hits equal to the total number of pixels in the screen. It should be noted that the population size and number of generations could be changed in accordance with the problem and the user's understanding of the problem.

Figure 22H:
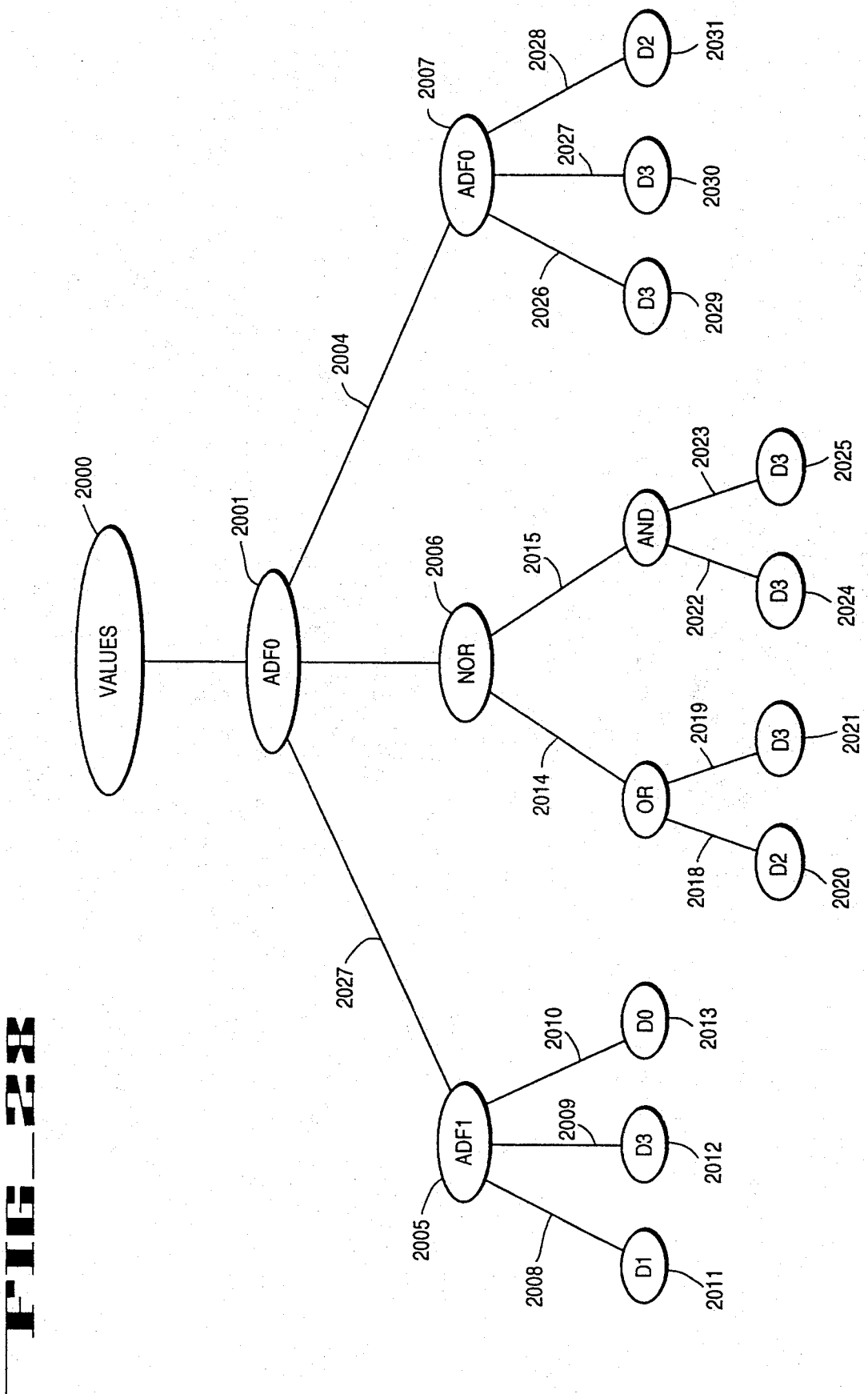
FIG. 22 illustrates a black and white diagram of a color image.

An example of applying the genetic process to image compression is shown in conjunction with FIG. 22. FIG. 22 illustrates a black and white diagram representing a color image consisting of concentric ellipses colored with a spectrum of different colors. Referring to FIG. 22, there are 30 pixels in the horizontal direction and 30 pixels in the vertical direction, totalling 900 pixels. The center of the color image is considered the origin (0, 0). The upper left corner is represented by the coordinates $(-1.0, +1.0)$. Each pixel in the display screen contains one of a multitude of colors. In the currently preferred embodiment, each pixel contains one of 128 different colors from a red, green, and blue (RGB, color spectrum). In the present example, each floating point number in the interval $[-1.0, +1.0]$ corresponds to one of the 128 colors. For example, $-1.0$ represents 100% red, while 0.0 represents 100% green, and $+1.0$ represents 100% blue. An intermediate color value has components of both of the colors between which its numeric value is positioned. For instance, an intermediate color value of $-0.75$ indicates that the pixel has a large red component and a small green component.

Referring back to the FIG. 22, the origin is colored red and the concentric ellipses surrounding the origin are various shades of red blended with shades of green. As the pixels spread out from the origin, the elliptical areas are colored green. Further from the origin, the ellipses are shaded with various shades of green blended with various shades of blue. Finally, the pixel areas on the outer fringes of the display are shaded blue. The pattern shown in FIG. 22 is produced by the expression:

$$3x^2 + 2y^2 - 0.85$$

whose output is suitably discretized so as to produce the specific colors in the respective pixels.

The terminal set for the problem presented by FIG. 22 consists of the horizontal pixel position X, the vertical pixel position Y, and the ephemeral random floating point constant R ranging over the interval $[-1.0, +1.0]$. Thus, the terminal set is:

T={X, Y, R}

The function set for the problem contains functions that might be needed to express the solution to the problem. In the currently preferred embodiment for this problem, the function set is:

F={+, −, *, %, IFLTE} where % represents zero-protected division, and where IFLTE is the conditional comparative function. ("IF Less Than or Equal").

The drawing in FIG. 22 shows the 900 combinations of X and Y and the associated pixel values from $-1.0$ to $+1.0$ representing one of the 128 colors. In the currently preferred embodiment, fitness is the sum, taken over the 900 pixels, of the absolute value of the difference between the color value for that pixel produced by the program and a correct color value for that pixel contained in the target image. The function set is closed; however, a particular program in the population may well return a numeric value outside the interval between $-1.0$ and $+1.0$. Therefore, a wrapper maps the value produced by a program into the desired range being between $-1.0$ and $+1.0$ and then in to the desired range of 128 color values from 0 to 127. The wrapper is shown below:

(* 64 (+1 (MAX −1.0 (MIN 1.0 s-exp))))

where s-exp is the value of the program for that pixel. A hit is defined as a fitness case for which the value of the wrapperized program is within 6 color values of the correct value out of the 128 possible. Since any value in the interval of size 1/128 is equated to a single color, great precision is not required in the calculations involving this problem. Therefore, considerable computer time can be saved with this problem by using the short float data type for floating point numbers available on many implementations of LISP.

During generation 0, the color images produced by the randomly generated programs bear little resemblance to the target (i.e., the expression which represents the image). In one run of the problem of programmatic image compression, the best-of-generation individual containing 17 points and having a fitness of 260.9 is shown below:

(* (* (− (* (% Y X) X) (% (* Y Y) (+0.0458984 −0.106705))) X) X)

FIG. 23 illustrates a black and white image representing the color image produced by the best-of-generation individual from generation 1 of one run. This best-of-generation individual from generation 1 of one run contains no red. However, the image does have a considerable amount of blue on the periphery and does have green in the middle of the image.

In this run, the best-of-generation individual in generation 6 contained 27 points, scored 900 hits, and had a raw fitness of 18.93. This best-of-run individual produces a color image which is virtually indistinguishable in appearance on the color screen from the target image and is equivalent to the expression:

(+ (* 2.9239 X X) (* 2 Y Y) −0.8724)

which is, in turn, a very close approximation to the expression that was actually used to create the target image. This best-of-run individual from generation 6 upon being retested using a 100×100 pixel version of the same problem, scored 10,000 hits out of a possible 10,000.

Thus, by invoking the process of the present invention, it is possible to encode a color image to a program. The program can be saved in less memory space than the individual color values for each pixel, thereby compressing the color image to a form which can be stored in a smaller amount of storage space and transmitted on a channel with less bandwidth.

Learning of Even-Parity Functions

We use the even-parity functions to illustrate the idea of automatic function definition.

The Boolean even-parity function of k Boolean arguments returns T (True) if an even number of its arguments are T, and otherwise returns NIL (False). Similarly, the odd-parity function of k Boolean arguments returns T (True) if an odd number of its arguments are T, and otherwise returns NIL (False).

The even-2-parity function is often called the equivalence function EQV since it returns (True) if both or neither of its two arguments are T, and returns NIL (False) if exactly one of its two arguments are T. The odd-2-parity function is often called the inequality function or the exclusive-or function XOR since returns T (True) if exactly one of its arguments is T, and otherwise returns NIL (False). Since the even-2-parity function is the negation of the exclusive-or, it is sometimes called NXOR.

In applying genetic programming to a particular Boolean function of k arguments, the $2^k$ combinations of the k Boolean arguments constitute the fitness cases. In respect to Boolean functions, the standardized fitness of a program is the sum, over the $2^k$ fitness cases, of the Hamming distance (error) between the value returned by the program and the correct value of the particular Boolean function. Standardized fitness ranges between 0 and $2^k$. Both raw fitness and hits are equal to the number of fitness cases for which the program is correct, namely $2^k$ minus the standardized fitness.

In the currently preferred embodiment the function set for all Boolean problems is:

$F_b$={AND, OR, NAND NOR}

The function set $F_b$ is computationally complete and is sufficient to solve any problem involving Boolean functions.

The parity functions are the most difficult Boolean functions to find using a blind random search of the space of programs composed using the function set $F_b$ and also the hardest to learn using genetic programming. The Boolean even-3-parity function, for example, is so difficult that blind random search failed to discovery it after randomly generating 10,000,000 individuals. Moreover, with the population size of 50, genetic programming must process 1,187,225 individuals in order to yield a solution to the even-3-parity problem with a 99% probability.

A basic understanding of the Boolean parity problem begins with the even-2-parity. The even-2-parity function is more commonly known as the equivalence function EQV or the not-exclusive-or function. In determining a solution to the even-2-parity problem, the terminal set $T_2$ consists of two Boolean terminals as shown below:

$T_2$={D0, D1}

In one run of the even-2-parity functions using a population of size 20, genetic programming generated a program containing 7 points and having a perfect raw fitness value (i.e., four out of four) in generation 3 as shown below:

(OR (NOR D1 D0) (AND D0 D1))

For the even-3-parity function, the terminal set is expanded to include a third terminal D2 and therefore consists of D0, D1, and D2. In one run of the even-3-parity problem using a population size of 4,000, genetic programming discovered the following program containing 45 points with the perfect value of raw fitness of 8 (out of 8) in generation 5, as shown below:

(AND (OR (OR D0 (NOR D2 D1)) D2) (AND (NAND (NOR (NOR D0 D2) (AND (AND D1 D1) D1)) (NAND (OR (AND D0 D1) D2) D0)) (OR (NAND (AND D0 D2) (OR (NOR D0 (OR D2 D0)) D1)) (NAND (NAND D1 (NAND D0 D1)) D2))))

For the even-4-parity function, the terminal set is expanded to include the fourth terminal D3. In generation 24 using a population size of 4,000, one run discovered a program containing 149 points having a perfect value of raw fitness 16 (out of 16), as shown below.

(AND (OR (OR (OR (NOR D0 (NOR D2 D1)) (NAND (OR (NOR (AND D3 D0) D2) (NAND D0 (NOR D2 (AND D1 (OR D3 D2))))) D3)) (AND (AND D1 D2) D0)) (NAND (NAND (NAND D3 (OR (NOR D0 (NOR (OR D3 D2) D2)) (NAND (AND (AND (AND D3 D2) D3) D2) D3))) (NAND (OR (NAND (OR D0 (OR D0 D1)) (NAND D0 D1)) D3) (NAND D1 D3))) D3)) (OR (OR (NOR (NOR (AND (OR (NOR D3 D0)) (NOR (NOR D3 (NAND (OR (NAND D2 D2) D2)) (AND D3 D2))) D1) (AND D3 D0)) (NOR D3 (OR D0 D2))) (NOR D1 (AND (OR (NOR (AND D3 D3) D2) (NAND D0 (NOR D2 (AND D1 D0)))) (OR (OR D0 D3) (NOR D0 (NAND (OR (NAND D2 D2) D2) D2)))))) (AND (AND D2 (NAND D1 (NAND (AND D3 (NAND D1 D3)) (AND D1 D1)))) (OR D3 (OR D0 (OR D0 D1))))))

For the even-3-parity function, using a population size of 4,000 and the maximum number of generations 51, 80,000 individuals had to be processed in order to yield a solution to the problem with a 99% probability. For the even-4-parity function, a total of 1,276,000 individuals had to be processed in order to yield a solution with a 99% probability.

In view of the above, symbolic regression on the parity function with an increasing number of arguments clearly requires an increasing amount of processing. For the even-3-parity function, a total of 52,000 individuals must be processed, while for the even-4-parity function, a total of 998,000 individuals must be processed. It progressively gets larger for the even-parity functions with a constant population size of 4,000.

When the even-5-parity function was run with a population size of 4,000, no solution occurred after 20 runs. After increasing the population size to 8,000, a solution wasn't found until the 8th run, suggesting the even-5-parity function is a very difficult function to learn. The solution appeared on generation 27 of run 8 and contained 347 points as shown below.

(NAND (NAND (OR (AND (AND (AND (OR D2 D3) (OR D4 D2)) (AND (OR D4 D0) (AND D1 D1))) (NOR (NOR D1 D4) (OR (NOR D3 D4) (NOR D0 D2)))) (NOR (NOR (NAND (AND (OR D1 D0) (OR D3 D2)) (OR D1 D3)) (NOR D1 D2)) (NOR (AND (NAND D4 D3) (NAND D4 D0)) (NAND (OR D2 D4) (OR D2 D1))))) (NOR

-continued (NOR (OR (NOR (AND D2 D0) (NOR D1 D4)) (AND (NOR (NOR (OR (NOR (AND D2 D0) (NOR D1 D4)) (AND (NOR D0 D2) (NAND D4 D0))) (AND (AND (NAND D4 D3) (OR D3 D0)) (OR D4 D3))) (NOR (NOR (AND (AND D1 D1) (AND D4 D2)) (NAND (NAND D0 D2) (NAND D4 D0))) (NAND (AND D0 D4) (NAND (NOR D1 D4) (OR D1 D0))))) (NAND (AND D4 D1) (OR D2 D0)))) (AND (AND (NAND D4 D3) (OR D3 D0)) (OR D2 D1))) (NOR (NOR (AND (AND D1 D1) (NOR (NAND (NAND D4 D2) (NAND D4 D4)) (OR (AND D2 D0) (AND D4 D1)))) (NAND (OR (AND (OR (AND D3 D0) (OR D4 (NAND (OR (NOR D1 D2) D3) D4))) (NAND (NAND D0 D1) (NAND D2 D2))) (NAND (AND (NOR D0 D1) (OR D3 D4)) (OR (NAND D3 D4) (AND D3 D1))))) (NAND D4 (AND (OR D1 D0) (OR D3 D2))))) (NAND (OR (NAND D1 D0) (NOR D2 D0)) (NAND D3 D2))))) (NAND (AND (NAND (OR (NOR (NAND (OR D1 D3) (AND D0 D4)) (NOR (AND D1 D4) (NOR D2 D2))) (AND (OR (NOR D1 D3) (NOR (AND (NOR D2 D2) (NOR (NOR D2 D2) (AND D2 D1))) (AND (NAND (NAND (NOR D4 D4) (NOR D0 D4)) (OR (AND D2 D3) (AND D4 D1))) (AND (OR (NOR D3 D4) D1) (AND (OR D1 D0) (OR D3 D2))))) (OR D2 D3)))) (OR (OR D2 D3) (NAND D3 D0)))) (NAND (AND (NOR (AND D0 D2) (OR D4 D0)) (AND D4 D1)) (OR (AND D1 D4) (NAND (NAND D1 D3) (OR D3 D1))))) (OR (OR D2 D3) (NAND D3 D0))) (AND (OR (NOR D3 D4) D3) (AND (OR D1 D0) (OR D3 D2)))))).

The fact that only one solution of the even-5-parity problem appeared after 8 runs suggests that a total of approximately 7,840,000 individuals are necessary to settle this problem with the probability of 99%.

As one would expect, the solutions shown above for parity problems with an increasing number of arguments contain an increasing number of points (i.e., 7, 45, 149 and 347 respectively).

As can be seen, finding a solution to the parity problems becomes increasing difficult as the number of arguments increases. Moreover, when solutions are found, they are increasing unwieldy as the number of arguments increases.

A human programmer faced with the problem of writing a program for the even-parity functions of increasing numbers of arguments would avoid this dramatic increase in computational effort and structural complexity by writing one or more helpful function definitions. He would then write the solution to the more complicated problem in terms of the these helpful defined functions.

For example, if a human programmer were writing a Boolean expression for the even-4-parity functions, he would probably first write a function definition for either the even-2-parity function (also known as the equivalence function EQV, the not-exclusive-or function NXOR), the odd-2-parity function (also known as the exclusive-or function XOR or the inequality function), or both. In writing the Boolean expression for the even-4-parity function, he would then call upon his defined functions for the even-2-parity function or the odd-2-parity function or both. The result would be a much shorter and simpler overall expression for the even-4-parity function.

Similarly, if a human programmer were writing a Boolean expression for the even-5-parity functions, he would probably first write a function definition for either either the even-3-parity, the odd-3-parity, or both or possibly the odd or even-2-parity functions.

Even-4-Parity Using Automatic Function Definition

Applying automatic function definition to the even-4-parity problem allows the problem to be decomposed into smaller problems with fewer arguments. It should again be noted that the reference to branches or a branch structure in conjunction with the automatically defined function sub-entities is only one embodiment, and it should be made clear that the branches (components) are unordered, much like a main program and its subroutines comprise an entire program package.

The problem-solving process of the present invention starts with an initial random population of entities. Each of these entities is created in a random way consistent with the nature of the problem.

In general, the number of result-producing sub-entities (i.e., branches) is usually fixed for a particular problem since each entity in the population is expected to produce certain results. In the even-4-parity problem, the number of result-producing branches is one for each entity. Moreover, the number of function-defining sub-entities and the number of dummy variables taken by each function-defining sub-entity is usually fixed. In this example, the number of function-defining branches is two. Since a Boolean problem is involved, arguments can take on only the two values of T (True) and NIL (False). Thus, for a Boolean valued problem, function-defining branches with no dummy variables are only capable of defining one of the two Boolean constants (T and NIL) and function-defining branches with one dummy variable are only capable of defining one of the four possible Boolean functions of one argument (two of which are constant-valued functions). Thus, for Boolean problems, it is sufficient to consider only function-defining branches with 2, ..., n dummy variables. For the number of different function-defining sub-entities with a particular number of dummy variables that may be useful for a particular problem varies with the problem. As mentioned previously, a practical approach is to provide an equal number of each. Specifically, for the problem of evolving the Boolean even-4-parity function, we would have two function-defining sub-entities (one with two dummy variables and one with three dummy variables) along with one result-producing sub-entity. One of the branches takes two dummy variables, while the other function-defining branch takes three dummy variables.

To summarize, for this particular problem, one distinct output value is to be produced. Thus, there is one result-producing sub-entity. For this particular problem, there are four actual variables of the problem, so that the argument set $T_4$ consists of the terminals D0, D1, D2, D3. The function set $F_b$ for this problem consists of the four functions AND, OR, NAND, and NOR. Thus the one result-producing sub-entity is a random composition of functions from the function set $F_b$ and terminals from the terminal set $T_4$ and references to ADF0 and ADF1.

Thus, the constrained syntactic structure for this problem consists of an overall template with three components that need to be defined. The first (leftmost) branch permits a two-argument function definition (defining a function called ADF0); the second (middle) branch permits a three-argument function definition (defining a function called ADF1); and the third (i.e., rightmost) branch is the value-returning branch that will compute the return value of the overall program.

The constrained syntactic structure for this problem is shown in FIG. 24. Referring to FIG. 24, the first automatically defined function rooted at 3202 would in this instance provide a 2-argument function definition named ADF0. The second automatically defined function 3203 would provide a 3-argument function definition named ADF1, and one result-producing branch 3211 would return values from the overall program via the VALUES function 3204. In this example, result-producing branch 3211 is composed of the four actual variables of the problem, D0, D1, D2 and D3, representing the four bits in the problem. The function set for the result-producing branch 3204 is comprised of Boolean functions from the basic function set $F_b$ and the two defined functions ADF0 and ADF1 created by the two functions-defining branches.

The first function definition rooted at 3202 of the program rooted by the PROGN 3201 is a composition of functions from the function set $F_b$ and the terminals from the set $T_2$ of the two dummy variables which define a function of two arguments: ARG0 and ARG1. The second function definition rooted at 3203 of the entity rooted by the PROGN 3201 is a composition of functions from the function set $F_b$ and terminals from the set of three dummy variables which define a function of three arguments: ARG0, ARG1 and ARG2. VALUES 3204 of the program rooted by the PROGN 3201 is the composition of the actual variables of the problem of the terminal set D0, D1, D2, and D3, as well as the function set, the two argument function ADF0 defined by the first branch 3202 and the three argument ADF1 defined by the second branch 3203. In summary, the function set for the result-producing branch 3211 of the even-4-parity problem is:

{AND, OR, NAND, NOR, ADF0, ADF1}

The tree structure rooted by PROGN 3201 is created using a template as described earlier. Using the template, each of the function definitions 3207 and 3210 are generated (grown) for ADF0 and ADF1 respectively. Similarly, the result-producing branch is generated.

In the currently preferred embodiment, growing each of the tree structures begins with selecting one of the functions from the function set $F_b$ at random (using a uniform probability distribution) to be the label for the root of the tree. By selecting a function as the root, a hierarchical structure is sure to be generated, not a degenerate structure consisting of a single terminal.

Whenever a point of the tree is labeled with a function from the function set $F_b$, then a preset number of lines, equal to the number of arguments taken by the function, are created to radiate from the point. Thus, for each such radiating line, an element from the combined set C of functions from the function set $F_b$ and terminals from the terminal set $T_4$ is randomly selected to be the label for the endpoint of the radiating line.

If a function is chosen to be the label for any such endpoint, the generating process then continues recursively as just described above. If a terminal is chosen to be the label for any point, that point becomes an endpoint of the tree and the generating process is terminated for that point. This process continues recursively from left to right until a completely labeled tree has been created.

This generative process can be implemented in several different ways resulting in initial random trees of different sizes and shapes. Two of the basic ways are called the "full" method and the "grow" method. The depth of a tree is defined as the length of the longest nonbacktracking path from the root to an endpoint.

The "full" method of generating the initial random population involves creating trees for which the length of every nonbacktracking path between an endpoint and the root is equal to the specified maximum depth. This is accomplished by restricting the selection of the label for points at depths less than the maximum to the function set $F_b$, and then restricting the selection of the label for points at the maximum depth to the terminal set $T_4$.

The "grow" method of generating the initial random population involves growing trees that are variably shaped. The length of a path between an endpoint and the root is no greater than the specified maximum depth. This is accomplished by making the random selection of the label for points at depths less than the maximum from the combined set C consisting of the union of the function set $F_b$ and the terminal set $T_4$, while restricting the random selection of the label for points at the maximum depth to the terminal set $T_4$. The relative number of functions in the function set $F_b$ and the number of terminals in the terminal set $T_4$ determine the expected length of paths between the root and the endpoints of the tree.

The generative method that appears best over a broad range of problems is called "ramped half-and-half." The ramped half-and-half generative method produces a wide variety of trees of various sizes and shapes. The "ramped half-and-half" generative method is a mixed method that incorporates both the full method and the grow method. The ramped half-and-half generative method involves creating an equal number of trees using a depth parameter that ranges between 2 and some maximum specified depth. For example, if the maximum specified depth is 6, 20% of the trees will have depth 2, 20% will have depth 3, and so forth up to depth 6. Then, for each value of depth, 50% of the trees are created via the full method and 50% of the trees are produced via the grow method.

Note that, for the trees created with the full method for a given depth, all paths from the root of the tree to an endpoint are the same length and therefore have the same shape. In contrast, for the trees created via the grow method for a given value of depth, no path from the root of the tree to an endpoint has a depth greater than the given value of depth. Therefore, for a given value of depth, these trees vary considerably in shape from one another.

Thus, the ramped half-and-half method creates trees having a wide variety of sizes and shapes.

Duplicate individuals in the initial random generation are unproductive deadwood; they waste computational resources and undesirably reduce the genetic diversity of the population. Thus, it is desirable, but not necessary, to avoid duplicates in the initial random population. Duplicate random individuals are especially likely to be created in the initial random generation when the trees are small (as it is for a certain percentage of population in the ramped half-and-half and grow methods). Thus, each newly created program is checked for uniqueness before it is inserted into the initial population. If a new program is a duplicate, the generating process is repeated until a unique program is created. Occasionally (e.g., for small trees), substituting a larger tree during the generative process is done when the set of possible trees of a given size has been exhausted.

After creation, the initial population undergoes the iterative evolution process.

The first automatically defined function rooted at 3202, in this example, contains a function definition for the 2-argument function ADF0. In one run, the best single individual evolved a definition for the first automatically defined function rooted at 3202 to be the even-2-parity function (i.e., the equivalence function EQV). ADF0 is expressed in terms of two dummy variables ARG0 and ARG1. This evolved definition for ADF0 rooted at 3202 can be said to be equivalent to the following function definition in COMMON LISP:

(defun ADF0 (ARG0 ARG1)
    (OR (AND ARG0 ARG1) (AND (NOT ARG0) (NOT ARG1))))

To reiterate, the above expression defines a function which is named ADF0. The defined function ADF0 has two dummy variables (formal parameters) consisting of ARG0 and ARG1 in parentheses. On the first line, the list (ARG0 ARG1) is the argument list of ADF0. The lower portion of the expression is the definition of the function.

ADF1 rooted at 3203 contains a function definition for the three-argument defined function, which happens in this individual to be the ordinary conjunction function of the three dummy variables ARG0, ARG1, and ARG2. The second branch plays a roll equivalent to the following function:

(defun ADF1 (ARG0 ARG1 ARG2)
    (AND ARG0 (AND ARG1 ARG2)))

Result-producing branch 3211 contains the actual variables of the problem D0, D1, D2, and D3 of the problem and three calls to the automatically defined function ADF0 (i.e., the equivalence function EQV) and no calls to the automatically defined function ADF1. Value-returning branch 3211 computes the following:

(EQV (EQV D0 D1) (EQV D2 D3))

The above program is the correct way of computing the even parity of four arguments (i.e., the even-4-parity). The value returned by the result-producing component (i.e., entire program) is the value of the even-4-parity function.

Figure 25:
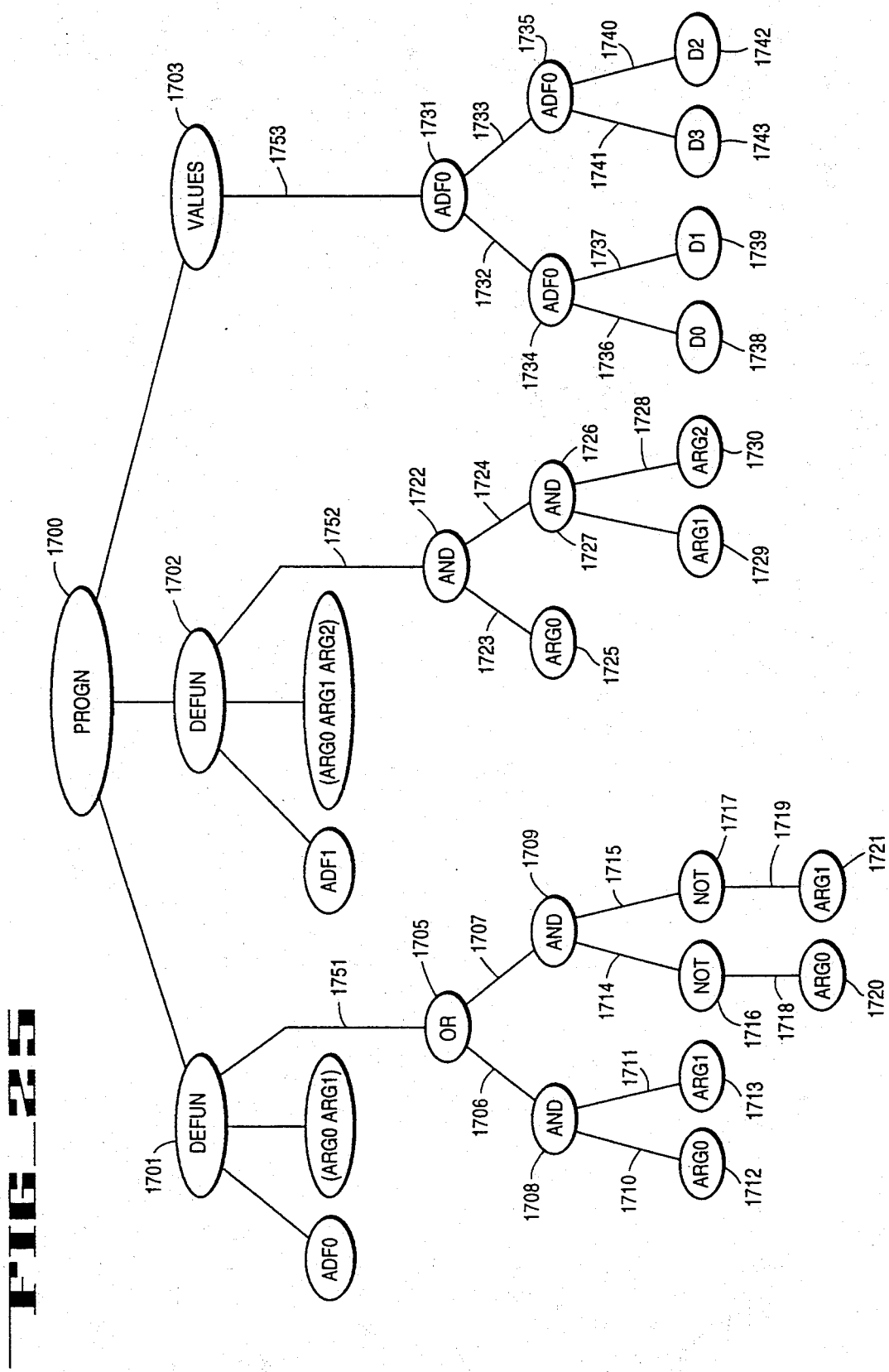
FIG. 25 illustrates the S-expression for the even-4-parity function generated according to the present invention.

FIG. 25 illustrates the program evolved for the even-4-parity. Referring to FIG. 25, PROGN 1700 is shown with two defined functions, ADF0 rooted at DEFUN 1701 and ADF1 rooted below 1702, and one result-producing branch rooted at VALUES 1703. The OR function, internal point 1705, has two branches 1706 and 1707 coupled to AND functions 1708 and 1709 respectively. The AND function 1708 operates on the ARG0 terminal (dummy variable) 1712 on branch 1710 and the ARG1 terminal 1713 on branch 1711. The AND operator 1709 is coupled to NOT operators 1716 and 1717 by branches 1714 and 1715 respectively. NOT operators 1716 and 1717 are coupled to terminals ARG0 1720 and ARG1 1721 branches 1718 and 1719 respectively.

AND operator 1722 is coupled to terminal ARG0 1725 and AND operator 1726 via branches 1723 and 1724. AND operator 1726 has two branches 1727 and 1728 for coupling terminals ARG1 1729 and ARG2 1730 respectively.

The call to defined functions ADF0 1731 has two branches 1732 and 1733 coupled to calls to defined functions ADF0 1734 and ADF0 1735 respectively. The call to ADF0 1734 has two arguments D0 1738 and D1 1739 coupled via branches 1736 and 1737 respectively. The call to ADF0 1735 has two argument arguments D2 1742 and D3 1743 coupled by branches 1740 and 1741 respectively. Thus, a program is evolved which represents the even-4-parity function incorporating a two-argument defined function and a three-function defined function with various subsets of D0, D1, D2, D3, ARG0, ARG1, and ARG2 as the terminal set of its respective components. As shown, the function set consists of various subsets of the internal points involved. That is, the function set consists of subsets of AND, OR, NAND, NOR, ADF0 and ADF1. The fitness cases consist of the 16 possible combinations of the four Boolean terminals D0, D1, D2 and D3 (i.e., due to the $2^4=16$ combinations of T and NIL for these variables). Raw fitness consists of the number of fitness cases for which the value returned by the program equals the correct value of the even-4-parity function. Standardized fitness comprises the maximum value of raw fitness (16) minus the measured raw fitness. The hits measure in this problem in the currently preferred embodiment are the same as raw fitness for this problem. There is no wrapper and the parameters are population equal to 4,000 with 51 generations. The result is generally a program which scores 16 hits.

It should be noted that the root 1700 is always the PROGN function of the appropriate number of arguments. The first, and leftmost, function-defining component depending from branch 1751 is comprised of the AND, OR, NAND and NOR functions and the dummy variables (formal parameters) ARG0 and ARG1. The second, and middle, function-defining depending from branch 1752 is comprised of the AND, OR, NAND and NOR functions and the dummy variables (formal parameters) ARG0, ARG1, and ARG2. The third, and right most, result-producing component depending from branch 1753 is comprised of the AND, OR, NAND and NOR functions, the two defined functions ADF0 and ADF1, and the terminals D0, D1, D2, and D3 (i.e., the actual variables of the problem).

In the currently preferred embodiment, the genetic programming of the present invention evolves a function definition in each of the two function-defining branches of each program and then, at its discretion, uses 1, 2, or none of the defined functions in the result-producing branch. It does not define what functions will be in the two function defining branches. Furthermore, it does not specify whether the defined functions will actually be used. This is true because it is possible to solve this problem without any function definition by evolving the correct computer program in the third branch. Moreover, it does not require that the function-defining branch use all the available dummy variables. It is possible, for example, for the second branch to define a two-argument function rather than a three-argument function, by ignoring one of the three available dummy variables.

In another run of the even-4-parity function, the best of generation individual from generation 0 scored only slightly better than 50% of the possible 16 hits. This individual containing 23 points scored 10 hits (out of 16) and is shown below:

In generation 8 of this run, the best-of-generation individual contains 145 points, as shown below:

```
(PROGN (DEFUN ADF0 (ARG0 ARG1)
           (AND (NAND (NOR (AND ARG0 ARG0) (NOR ARG1 ARG0)) (AND ARG1
           ARG1)) (OR (OR ARG1 ARG1) (AND (AND ARG1 ARG1) (OR ARG1
           ARG1)))))
       (DEFUN ADF1 (ARG0 ARG1 ARG2)
           (NOR (OR (AND (OR ARG1 ARG2) (OR ARG0 ARG1)) (OR (AND ARG0
           ARG1) (OR ARG0 ARG0))) (NOR (OR (NOR ARG2 ARG2) (NOR ARG1
           ARG2)) (NAND (NOR ARG0 ARG1) (NAND ARG0 ARG2)))))
       (VALUES (NOR (OR ADF1 (AND D3 D0) (OR D0 D2) (NOR D1 D3)) (ADF1
           (OR D3 D1) (ADF1 D0 D2 D3) (AND D0 D2))) (AND ADF0 (OR D3
           D0) (OR D2 D3)) (NOR (NOR D1 D1) (NOR (NOR (OR (ADF1 (AND D3
           D0) (OR D0 D2) (NOR D1 D3)) (ADF1 (OR D3 D1) (ADF1 D0 D2 D3)
           (NAND (OR (AND D3 D3) (AND D2 D2)) (OR (ADF0 D0 D2) (NAND D3
           D3))))) (AND (ADF0 (OR D3 D0) (OR D2 D2)) (NOR (NOR D1 D1)
           ADF1 D2 D2 D0)))) (NAND D0 D3))))))
```

```
(PROGN (DEFUN ADF0 (ARG0 ARG1)
           (OR (OR ARG0 ARG1) (OR ARG1 ARG0)))
       (DEFUN ADF1 (ARG0 ARG1 ARG2)
           (AND (OR ARG1 ARG0) (NAND ARG1 ARG0)))
       (VALUES (NAND (ADF1 DF D2 D2) (NOR D1 D0))))
```

The first function-defining branch of the above program defines the two-argument defined function ADF0 which is equivalent to (OR ARG0 ARG1). The defined function ADF0 is not used in the result-producing branch.

The second branch is a three-argument definition for defined function ADF1 that ignores one of the three arguments and is equivalent to (EQV ARG0 ARG1). The third branch is the result-producing branch (NAND (ADF1 D3 D2 D2) (NOR D1 D0)).

This branch is defined in terms of the actual variables of the problem (i.e., D0, D1, D2, and D3), two of the four primitive functions of the problem (i.e., NAND and NOR) from the function set $F_b$, and one of the two automatically defined functions (i.e., ADF1 taking three arguments).

Since we have seen that ADF1 is the EQV function, when EQV is substituted for ADF1, the value-returning branch becomes (NAND (EQV D3 D2) (NOR D1 D0)).

This function is manifestly the even-4-parity function. There is, of course, no reason to expect that a solution to a difficult problem such the even-4-parity would have been found on generation 0 (consisting of random initial individuals).

When EQV is substituted for ADF1 in the result-producing branch it becomes:

(NAND (EQV D3 D2) (NOR D1 D0))

The first branch of this program is a two-argument definition for defined function ADF0 that is equivalent to:

(AND ARG0 ARG1)

The second branch is a three-argument definition for defined function ADF1 and is equivalent to:

(NOR ARG0 ARG1 ARG2)

The result-producing branch uses both automatically defined function ADF0 and ADF1 and produces the score of 14 hits.

In generation 12, the following program containing 74 points and obtaining a perfect value of 16 for raw fitness was evolved:

```
(PROGN (DEFUN ADF0 (ARG0 (ARG1)
           (NAND (OR (AND (NOR ARG0 ARG1) (NOR (AND ARG1 ARG1) ARG1))
           (NOR (NAND ARG0 ARG0) (NAND ARG1 ARG1))) (NAND (NOR (NOR ARG1
           ARG1) (AND (OR (NAND ARG0 ARG0) (NOR ARG1 ARG0)) ARG0)) (AND
           (OR ARG0 ARG0) (NOR (OR (AND (NOR ARG0 ARG1) (NAND ARG1
           ARG1)) (NOR (NAND ARG0 ARG0) (NAND ARG1 ARG1))) ARG1)))))
       (DEFUN ADF1 (ARG0 ARG1 ARG2)
           (OR (AND ARG2 (NAND ARG0 ARG2)) (NOR ARG1 ARG1)))
       (VALUES (ADF0 (ADF0 D0 D2) (NAND (OR D3 D1) (NAND D1 D3)))))
```

The first branch of this best-of-run program is a function definition for the exclusive-or XOR function (i.e., the odd-2-parity function). This two-argument automatically defined function ADF0 is defined in terms of two dummy variables ARG0 and ARG1 and the functions in the function set $F_b$.

The second branch defines the three-argument defined function ADF1, but is not called by the result-producing branch, which contains calls to only the AND, NAND, NOR and ADF0 functions.

Upon substitution of XOR for ADF0, the result-producing branch reduces to:

(XOR (XOR D0 D2) (NAND (OR D3 D1) (NAND D1 D3)))

which is equivalent to:

(XOR (XOR D0 D2) (EQV D3 D1)), which is the even-4-parity function.

Thus, after processing 4,000 individuals for only 12 generations, we have obtained a solution to the rather difficult even-4-parity problem. The solution came about because a function useful in solving this problem (i.e., the exclusive-or) function was automatically defined "on the fly" as a result of the evolutionary process of the current invention.

Note that it was not specified that the exclusive-or function would be defined as opposed to the equivalence function, the if-then function, or some other function. It was not specified that the exclusive-or function would be defined in the first branch as opposed to the second branch. Genetic programming created the two-argument automatically defined function ADF0 on its own in the first branch to help solve this problem, and in doing so, genetic programming did not require the use for the three-argument defined function.

Figure 26:
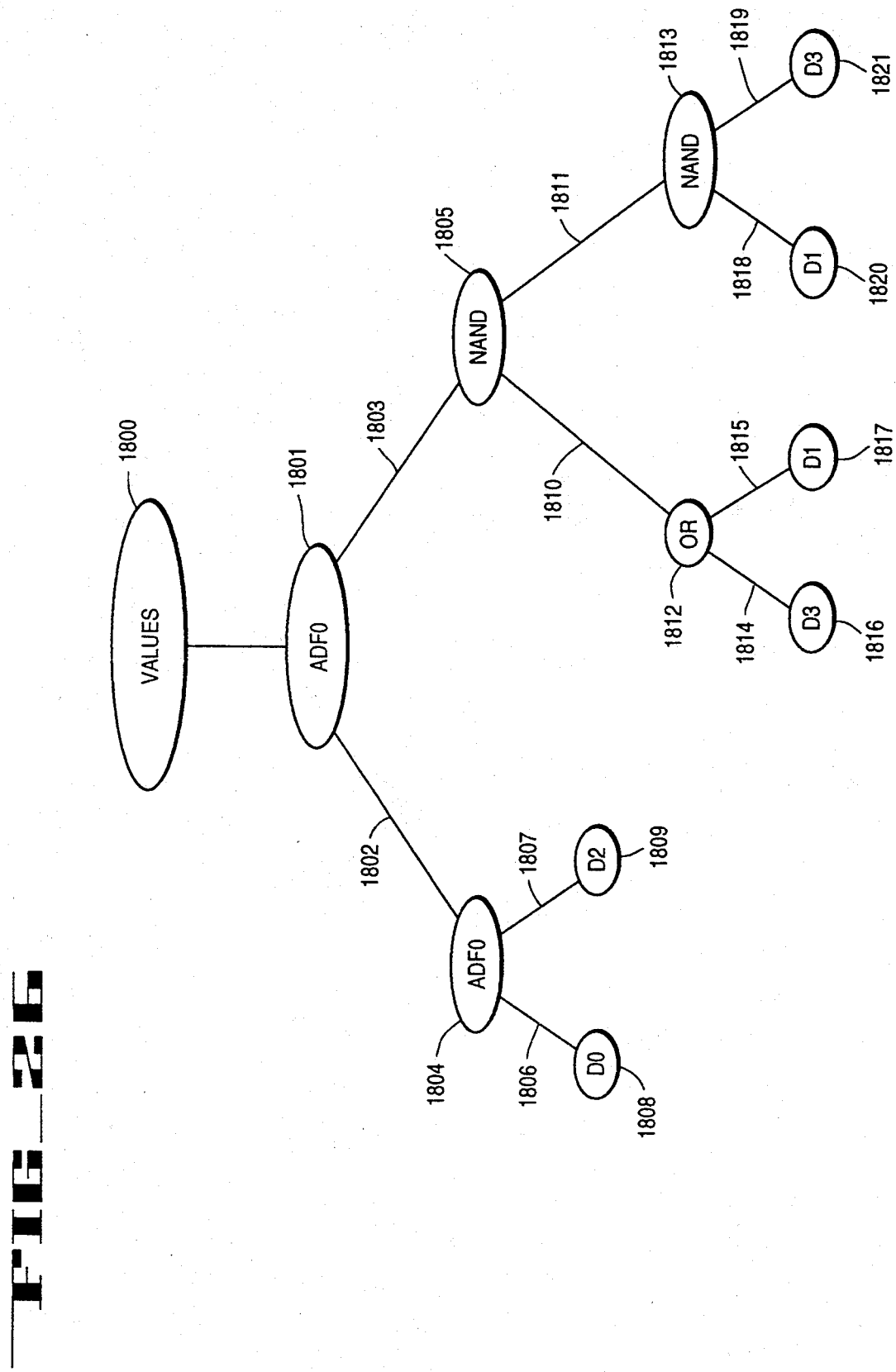
FIG. 26 illustrates the result producing component of the best-of-run individual from generation 12 for the even-4-parity problem using the present invention.

FIG. 26 depicts the result-producing branch of the best-of-run individual from generation 12. Referring to FIG. 26, VALUES 1800 receives results due to the execution of the result-producing branch coupled below it and hierarchically depicted with ADF0 at the highest level. The call to ADF0 1801 is shown having two branches 1802 and 1803 coupling to the call to ADF0 1804 and the NAND operator 1805. The call to ADF0 1804 has the terminals D0 1808 and D2 1809 as its arguments coupled via branches 1806 and 1807 respectively. The NAND operator 1805 has two arguments: the OR operator 1812 and the NAND operator 1813 coupled via branches 1810 and 1811 respectively. The OR operator 1812 has terminals D3 1816 and D1 1817 as its arguments coupled via branches 1814 and 1815 respectively. The NAND operator 1813 has terminals D1 1820 and D3 1821 as its arguments coupled via branches 1818 and 1819 respectively.

If a human programmer were to be programming the even-4-parity function and had the opportunity to define functions, that individual might well have decided to approach the problem by creating the exclusive-or XOR function as a building block. However, genetic programming does not proceed in the same logical order as a human programmer.

In a second run of the even-4-parity problem, the following 100% correct program containing 41 points emerged in generation 3:

```
(PROGN (DEFUN ADF0 (ARG0 ARG1)
    (OR (AND ARG0 ARG1) (NOR ARG1 ARG0)))
  (DEFUN ADF1 (ARG0 ARG1 ARG2)
    (NOR (AND ARG2 ARG0) (NOR (OR ARG0 ARG0) ARG2)))
  (VALUES (ADF1 (ADF0 D1 D0) AND (OR (ADF1 D1 D2 D0) (OR D2 D1))
    (OR (AND D0 D0) (AND D3 D0))) (ADF1 D3 D0 D2)))).
```

It should be noted that both of the function defining branches are function definitions for the exclusive-or XOR function and that the result-producing branch uses both defined functions ADF0 and ADF1. The three-argument defined function ADF1 ignores one of the three available dummy variables ARG1 and, thus, is defined only in terms of the dummy variables ARG0 and ARG2. Although a human programmer would not usually write two different function definitions for the same function, this solution is as good as the previous solution in light of the fitness measure for this problem.

In a third run of the even-4-parity problem, a 100%-correct program containing 120 points emerged in generation 5.

```
(PROGN (DEFUN ADF0 (ARG0 ARG1)
    (NOR (AND (AND (NAND ARG1 ARG0) (AND ARG0 ARG0)) (NAND (NAND
      ARG0 ARG0) (OR ARG1 (AND ARG0 ARG1)))) (NAND (NAND (OR ARG1
      ARG1) (NAND ARG1 ARG0)) (NOR (NAND ARG0 ARG1) (NOR ARG1
      ARG1)))))
  (DEFUN ADF1 (ARG0 ARG1 ARG2)
    (OR (AND (AND (NAND ARG1 ARG0) (AND ARG1 ARG0)) (NAND AND
      ARG1 ARG0) (OR ARG0 ARG2))) (AND (NAND (OR ARG1 ARG0) (NAND
      ARG0 ARG1)) (OR (OR ARG1 ARG2) (NOR ARG0 ARG2)))))
  (VALUES (ADF1 (OR (ADF0 (ADF0 (NAND D1 D0) (ADF1 D3 D2 D0))
    (NAND D0 D0)) (ADF1 D3 D2 D0)) (OR (ADF0 (ADF1 D3 D3 D1)
    (ADF0 D0 D1)) (AND (NAND (D3 D0) (ADF1 D1 D0 D1))) (NOR (NAND
    (NOR D1 D0) (AND D3 D3)) (OR (ADF0 (ADF1 D1 D0 D0) (ADF0 D3
    D2)) (NOR D2 D2))))))
```

The first branch of this program is a function definition for a two-argument AND function. Although the AND function is in the basic function set, the result-producing branch calls defined function ADF0. A human programmer would be unlikely to create a superfluous AND function definition, however, the solution is as good as both previous solutions from the point of view established by the fitness measure.

The second branch is available to define a three-argument function. However, as shown above, genetic programming defined the even-2-parity (i.e., EQV) function in terms of ARG0 and ARG1 in the second branch.

The 41, 120 and 74 points comprising these three particular programs created via the automatic function definition process are considerably fewer than the higher 149 points contained in the program cited earlier for the even-4-parity problem.

Performance measurements of the even-4-parity problem using automatic function definition show that 80,000 individuals must be processed to yield a solution with 99 percent probability. However, the 80,000 individuals needed to be processed using automatic function definition is less than a twelfth of the 980,000 individuals required to render a solution in the even-4-parity problem with 99 percent probability without automatic function definition as shown previously. Thus, automatic function definition achieves a considerable improvement in performance for the even-4-parity problem.

As has just been shown, the solution to the even-4-parity function came about with considerably less effort because of the "on the fly" automatic function definition of the present invention. Moreover, the solution was considerably smaller in size than the solution obtained without the "on the fly" automatic function definition of the present invention.

Automatic function definition also allows references to be made between function definitions. We now show the flexibility of the automatically defined function mechanism by evolving a solution to the even-4-parity problem where each program in the population has one result-producing branch and two-function defining branches, each permitting the definition of one function of three dummy variables.

In one run of the even-4-parity function, a 100% correct solution containing 45 points for the perfect value of raw fitness (i.e., 16 out of 16) appeared on generation 4 and is shown below:

```
(PROGN (DEFUN ADF0 (AGR0 ARG1 ARG2)
           (NOR (NOR ARG2 ARG0) (AND ARG0 ARG2)))
       (DEFUN ADF1 (ARG0 ARG1 ARG2)
           (NAND (ADF0 ARG2 ARG2 ARG0)
                 (NAND (ADF0 ARG2 ARG1 ARG2)
                       (ADF0 (OR ARG2 ARG1)
                             (NOR ARG0 ARG1)
                             (ADF0 ARG1 ARG0 ARG2)))))
       (VALUES (ADF0 (ADF1 D1 D3 D0) (NOR (OR D2 D3) (AND D3 D3))
                     (ADF0 D3 D3 D2))).
```

Figure 27:
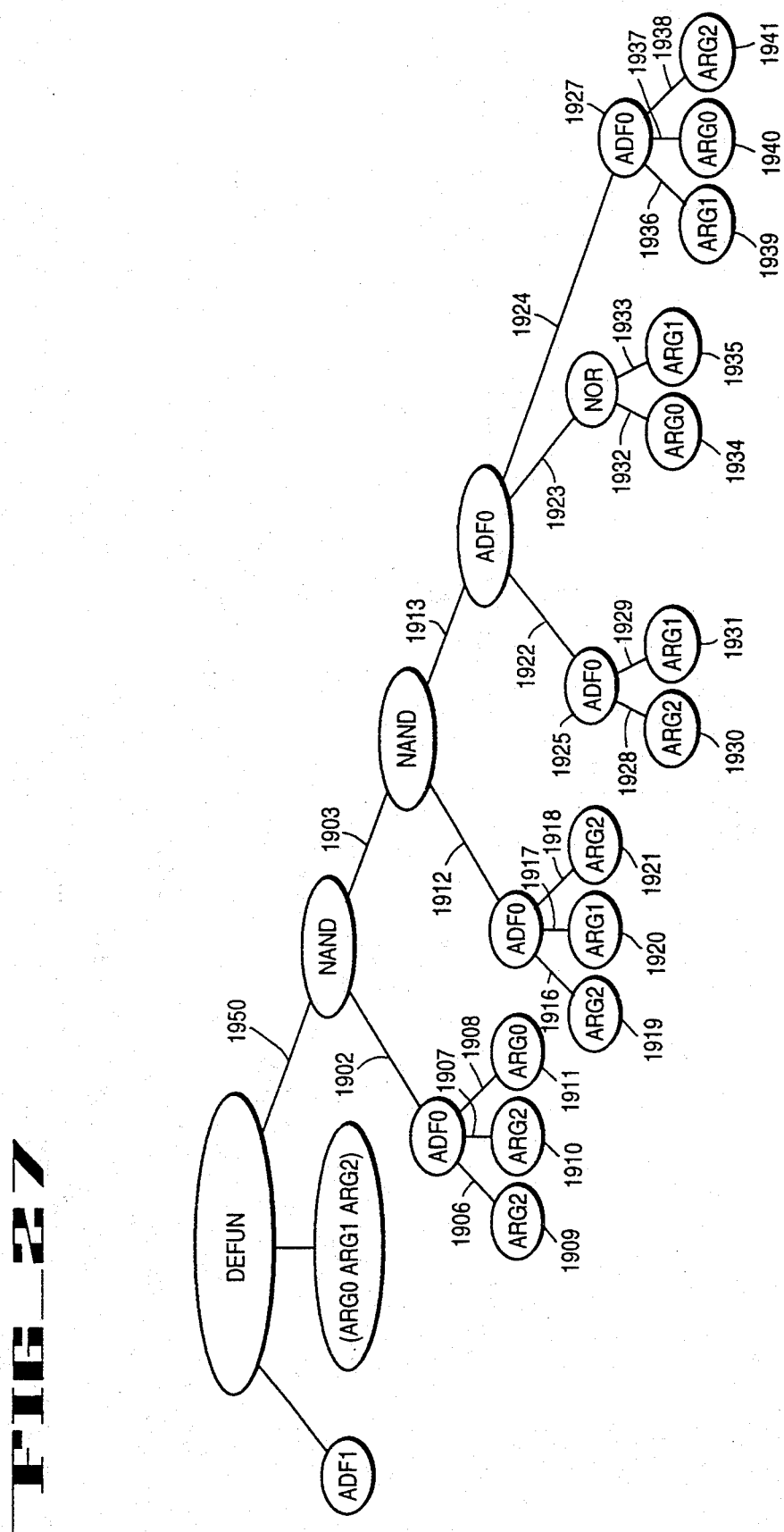
FIG. 27 depicts the second defined function evolved during a particular run for the even-4-parity example using the present invention.

The first branch of the above best-of-run program is a function definition establishing the defined function ADF0 as the two-argument exclusive-or XOR function having dummy variables ARG0 and ARG2. The definition of ADF0 ignores the dummy variable ARG1. FIG. 27 depicts the second branch of the above program, the definition of defined function ADF1, which calls upon the defined function ADF0 (i.e., XOR). Referring to FIG. 27, the definition of the function is coupled via branch 1950. The function definition includes NAND operator 1901 respectively having two arguments, a call to ADF0 1904 and NAND operator 1905 coupled using branches 1902 and 1903 respectively. The call to ADF0 1904 has arguments ARG2 1909, ARG2 1910 and ARG0 1911 coupled via branches 1906, 1907 and 1908 respectively. NAND operator 1905 has a call to ADF0 1914 and call to ADF0 1915 as its arguments coupled by branches 1912 and 1913 respectively. The call to ADF0 1914 has arguments ARG2 1919, ARG1 1920 and ARG2 1921 coupled via branches 1916, 1917 and 1918 respectively. The call to ADF0 1915 has three arguments, a call to ADF0 1925, NOR operator 1926 and a call to ADF0 1927 coupled via branches 1922, 1923, and 1924 respectively. The call to ADF0 1925 has arguments ARG2 1930 and ARG1 1931 coupled via branches 1928 and 1929 respectively. NOR operator 1926 has arguments ARG0 1934 and ARG1 1935 coupled via branches 1932 and 1933 respectively. Finally, the call to ADF0 1927 has arguments ARG1 1939, ARG0 1940 and ARG1 1941 coupled by branches 1936, 1937 and 1938 respectively.

The second branch appears to use all three available dummy variables. However, it reduces to:
(NOT (ADF0 ARG2 ARG0))

So therefore, the definition of ADF1 reduces to the two-argument equivalence function (EQV ARG0 ARG2).

FIG. 28 illustrates the result-producing branch (i.e., the third branch) coupled to VALUES 2000 and which uses all four actual variables of the problem and calls to both ADF0 and ADF1 to solve the even-4-parity problem. Referring to FIG. 28, the result-producing branch rooted below VALUES 2000 includes calls to ADF0 2001 having a call to ADF1 2005, NOR operator 2006 and a call to ADF0 2007 as its arguments coupled via branches 2002, 2003 and 2004 respectively. The call to ADF1 2005 has arguments D1 2011, D3 2012 and D0 2013 coupled via branches 2008, 2009 and 2010 respectively. Argument NOR 2006 has arguments OR operator 2016 and AND operator 2017 coupled via branches 2014 and 2015 respectively. OR operator 2016 has arguments D2 2020 and D3 2021 coupled via branches 2018 and 2019 respectively. AND operator 2017 has arguments D3 2024 and D3 2025 coupled by branches 2022 and 2023 respectively. The argument call to ADF0 2007 has arguments D3 2029, D3 2030 and D2 2031 coupled via branches 2026, 2027 and 2028 respectively.

The value returning branch reduces to:

(ADF0 (ADF1 D1 D0) (ADF0 D3 D2))

which is equivalent to:

(XOR (EQV D1 D2) (XOR D2 D3))

Thus, this solution found by genetic programming decomposes the even-4-parity program into two lower order parity expressions, the XOR and EQV functions. It should be noted that the second of the two functions in this decomposition, the EQV function, is defined in terms of the first. FIG. 29 shows the hierarchy (lattice) of function definition dependencies resulting from the solution to the even-4-parity problem. Referring to FIG. 29, each portion of the figure is shown according to the dependencies between them. Specifically, a function that depends on another function definition for its definition is shown higher in FIG. 29. ADF0 2101 was required by the most components and appears at the bottom of FIG. 29. ADF1 2102 which uses ADF0 2101, as depicted by arrow 2104, is dependent on ADF0 2101 and is, therefore, higher in FIG. 29 than ADF0 2101. Finally, even-4-parity solution 2103 was defined in terms of ADF0 2101 and ADF1 2102 as shown by arrows 2105 and 2106 respectively and is consequently shown at the top.

The exclusive-or XOR and equivalence EQV functions appear as defined functions ADF0 or ADF1 and sometimes both in many of the runs of the even-4-parity problem. However, in many other runs this was not the case. For example, in a particular other run of the even-4-parity problem, the following 100% correct solution containing 137 points with a perfect value of raw fitness (i.e., 16 out of 16) appeared on generation 6:

```
(PROGN (DEFUN ADF0 (ARG0 ARG1 ARG2)
           (NOR (NAND (AND (AND ARG0 ARG2) (AND ARG2 ARG0)) (AND (OR
           ARG2 ARG2) (AND ARG2 ARG0))) (OR (NOR (NOR ARG1 ARG2) (AND
           ARG2 ARG1)) (NAND (AND ARG2 ARG0) (OR ARG1 ARG2))))
```

```
-continued
(DEFUN ADF1 (ARG0 ARG1 ARG2)
    (OR (ADF0 (ADF0 (OR ARG2 ARG1) (AND ARG1 ARG2) (OR ARG0
        ARG1)) (ADF0 (ADF0 ARG1 ARG0 ARG0) (AND ARG1 ARG2) (AND ARG2
        ARG0)) (AND (NAND ARG1 ARG1) (NAND ARG0 ARG2))) (NAND (NOR
        (NOR ARG1 ARG2) (AND ARG1 ARG2)) (NAND (AND ARG2 ARG0) (OR
        ARG1 ARG1)))))
    (VALUES (ADF1 (AND (AND (NAND D0 D3) (ADF1 D1 D1 D3)) (OR (ADF0
        D2 D1 D3) (OR D3 D1))) (ADF1 (NAND (OR D2 D2) (NAND D2 D1))
        (ADF1 (AND D2 D3) (OR D3 D1) (ADF1 D0 D2 (ADF1 (AND D2 D3)
        (OR D3 D1) (ADF1 D0 D2 D3)))) (ADF1 (NOR D1 D3) (NOR D1 D2)
        (AND D0 D0))) (NAND D1 D2))))
```

The first function-defining branch of the above program is the ordinary conjunction:

(AND ARG2 ARG1 ARG0)

A call to the three-argument automatically defined function ADF0 disables the large subclause within the definition of automatically defined function ADF1, thereby reducing ADF1 to merely:

(EQV ARG2 ARG1)

The result-producing branch calls on the defined functions ADF0 and ADF1 and solves the problem.

Multiple runs for the even-4-parity problem show that 88,000 individuals must be processed to define the solution with 99 percent probability using hierarchical automatic function definition, where the population size is 4,000 and the maximum number of generations is 51. Once again, this is much less than the 980,000 required without automatic function definition.

Even-5-Parity Using Automatic Function Definition

Without automatic function definition, a solution was not found to the even-5-parity problem using a population size of 4,000 with the given function set $F_b$ after 20 runs. However, when automatic function definition is used, solutions to the even-5-parity problem, and as shown later, the even-6-parity can be found readily with a population size of 4,000.

In the currently preferred embodiment, for the even-5-parity problem, each program is comprised of four branches with three automatic definitions. The first three branches permit the creation of function definitions with 2, 3, and 4 dummy variables respectively. The result-producing branch (i.e., the fourth branch) is a program incorporating the four diadic Boolean functions from the function set $F_b$, the three defined functions ADF0, ADF1 and ADF2, and the five actual variables of the problem, terminals D0, D1, D2, D3 and D4.

In one run of the even-5-parity function, the following program producing 32 (out of 32) hits and containing 174 points was evolved on generation 11:

```
(PROGN (DEFUN ADF0 (ARG0 ARG1)
    (OR (NOR (NAND (NAND ARG0 ARG0) (AND ARG0 ARG0)) (NAND ARG0
        ARG0)) (OR (NAND ARG0 ARG0) (OR (NAND (NAND ARG1 ARG1) (AND
        ARG0 ARG1)) (AND ARG1 ARG1)))))
    (DEFUN ADF1 (ARG0 ARG1 ARG2)
        (NOR (AND (NAND (NAND ARG2 ARG2) (OR ARG1 ARG0)) (NOR (OR
            ARG2 ARG1) (NAND ARG0 ARG1))) (OR (NOR (AND ARG0 ARG0) (OR
            ARG0 ARG1)) (AND (NOR ARG0 ARG1) (NAND ARG1 (NAND ARG1
            ARG0))))))
    (DEFUN ADF2 (ARG0 ARG1 ARG2 ARG3)
        (NAND (NAND (NOR (OR ARG1 ARG2) (OR ARG3 ARG1)) (NAND (NOR
            ARG1 ARG0) (OR ARG2 ARG0))) (NOR (NOR (NAND ARG1 ARG2) (AND
            ARG1 ARG3)) (AND (NAND (NOR (NAND ARG1 ARG2) (NOR ARG3 ARG3))
            (OR (OR ARG3 ARG0) (OR ARG2 ARG2))) (OR (NOR (NAND ARG2 ARG1)
            (NOR ARG3 ARG2)) (NOR (NOR ARG3 ARG3) (NOR ARG1 ARG2))))))
    (VALUES (AND (OR (ADF0 (ADF2 D0 D2 D1 D0) (AND D1 D2)) (OR (OR
        D0 D1) (NAND D1 D0))) (ADF2 (AND (NAND D2 D4) (ADF2 D2 D3 D2
        D2)) (ADF0 (AND D1 D4) (ADF1 D3 D0 D0)) (NAND (NAND D0 D3)
        (ADF1 D0 D3 D1)) (NAND (ADF0 (AND D1 D4) (ADF1 D3 D0 D0))
        (ADF2 D2 D4 D1 D2)))))).
```

The two-argument defined function ADF0 created by the first branch is equivalent to the Boolean constant T ("True"). Genetic programming created this constant-valued function T and uses it in the result-producing branch. The three-argument defined function ADF1 created by the second branch is equivalent to the degenerate disjunction (OR ARG0 ARG1). Defined function ADF2 is a degenerate defined function containing the three dummy variables ARG1, ARG2 and ARG3 and is equivalent to:

(OR (AND (NOR ARG3) (EQV ARG1 ARG2))
    (AND ARG3(XOR ARG1 ARG2)))

It should be noted that ADF2 ignores its very first argument ARG0. The defined function ADF2 is, in fact, the even-3-parity function of ARG1, ARG2 and ARG3. Thus, the result-producing branch can be simplified to:

(XOR (XOR D3 D0) (NOT (ADF2 D2 D4 D1 D2)))

Since (ADF2 D2 D4 D1 D2) is equivalent to (even-3-parity D4 D1 D2), this result-producing branch becomes:

(XOR (XOR D3 D0) (NOT (EVEN-3-PARITY D4
    D1 D2)))

Therefore, in solving the even-5-parity problem, genetic programming created a function definition for a parity function of lower order (i.e., the even-3-parity function) and created the combination of operations in its result-producing branch equivalent to two occurrences of the odd-2-parity function (i.e., XOR). FIG. 30 illustrates the best-of-run individual from generation 11 wherein defined function ADF0 is equivalent to the even-3-parity function. Each of the simplified definitions of the automatically defined functions has been substituted into this expression so as to show the effective program that was evolved. Referring to FIG. 30, XOR operator 2201 has arguments XOR operator 2204 and NOT operator 2205 coupled via branches 2202 and 2203 respectively. XOR operator 2204 has arguments D3 2208 and D0 2209 coupled via branches 2206 and 2207 respectively. NOT operator 2205 has the even-3-parity 2210 as its argument coupled via branch 2217. Even-3-parity 2210 has arguments D4 2214, D1 2215 and D2 2216 coupled via branches 2211, 2212 and 2213 respectively.

In a second run of the even-5-parity function, the following 100%-correct program containing 74 points emerged in generation 9:

```
(PROGN (DEFUN ADF0 (ARG0 ARG1)
        (NAND (OR (OR (NAND ARG0 ARG1) (NOR ARG0 ARG1)) (AND (NOR
        ARG0 ARG1) (AND ARG0 ARG1))) (NAND (AND (NAND ARG1 ARG0) (NOR
        ARG1 ARG1)) (NOR (OR ARG0 ARG0) (OR ARG1 ARG0)))))
    (DEFUN ADF1 (ARG0 ARG1 ARG2)
        (AND (NAND ARG2 AGR0) (OR ARG0 ARG2)))
    (DEFUN ADF2 (ARG0 ARG1 ARG2)
        (OR (NAND (NAND ARG0 ARG2) (OR ARG2 ARG1)) (AND (AND ARG1
        ARG0) (NAND ARG2 ARG0))))
    (VALUES (ADF0 (NAND (ADF1 D1 D4 D4) (ADF1 D1 D4 D4)) (ADF1 (ADF0
        D2 D0) (NOR D2 D0) (AND D3 D3)))))
```

Referring to the above program, the two-argument defined function ADF0 created by the first branch is the two-argument equivalence function EQV. The three-argument defined function ADF1 created by the second branch is the three-argument equivalent of (XOR ARG2 ARG0). The four-argument defined function ADF2 created by the third branch is not used in the result-producing branch (i.e., the fourth branch). The value-returning branch calls only ADF1 and ADF0 to produce the desired overall even-5-parity function.

Using a population size of 4,000 and a maximum number of generations of 51, the cumulative probability of generating a solution is 100% by generation 37. Furthermore, only 152,000 individuals must be processed to yield the solution with automatic function definition. This is less than one sixth of the 980,000 individuals which must be run for the normal even-parity problem having only four arguments without the use of automatic function definition.

In the next example we allow automatic function definitions to use other automatic function definitions while evolving the even-5-parity function. In the currently preferred embodiment, each program for solving the even-5-parity function has one result-producing branch and two-function-defining branches, each permitting the definition of one function of four dummy variables. In one run of the even-5-parity functions, the following 100% correct solution containing 160 points with a perfect value of raw fitness (i.e., 64 out of 64) emerged on generation 12:

```
(PROGN (DEFUN ADF0 (ARG0 ARG1 ARG2 ARG3)
        (OR (OR (NOR (NOR ARG3 ARG1) (OR ARG1 ARG3)) (AND (NAND ARG1
        ARG3) (NOR ARG1 ARG2))) (NAND (AND (OR ARG1 ARG2) (NAND ARG1
        ARG2)) (NAND ARG1 (AND (NOR ARG3 ARG1) ARG0)))))
    (DEFUN ADF1 (ARG0 ARG1 ARG2 ARG3)
        (NAND (NAND (AND (NAND ARG1 ARG2) (ADF0 AGR0 ARG3 ARG0 ARG2))
        (NOR (NAND ARG3 ARG1) (AND ARG1 ARG1))) (AND (ADF0 ARG0 (NAND
        ARG1 ARG2) (ADF0 ARG3 ARG0 ARG3 ARG0) (AND ARG1 ARG1)) (ADF0
        (ADF0 ARG3 ARG2 ARG3 ARG0) (ADF0 ARG0 ARG2 ARG2 ARG1) (ADF0
        ARG3 ARG3 ARG3 ARG0) (NOR ARG3 ARG0)))))
    (VALUES (OR (OR (NOR (ADF0 D3 D1 D1 D3) (OR D0 D1)) (NOR (NAND
        D1 D2) (OR (OR D3 D2) (NOR D4 D4)))) (ADF1 (ADF1 D4 D0 D4 D1)
        (OR (OR (NOR (OR (NAND D1 D0) (ADF1 D1 D2 D3 D1)) (AND D4
        D0)) D2) (NOR (OR (NAND D1 D0) (ADF1 D1 D2 D3 D1)) (AND D4
        D0))) (NAND (ADF1 D1 D0 D0 D1) (NAND D0 D2)) (NAND (ADF1 D3
        D4 D0 D0) (ADF0 D3 D1 D1 D3))))).
```

The first branch ADF0 is equivalent to:

(EQV ARG2 ARG1)

The second branch ADF1 is equivalent to:

(OR (AND (NOT ARG2) (XOR ARG3 ARG0))
    (AND ARG 2 (XOR ARG3 (XOR ARG1 ARG0))))

The result-producing branch calls on defined functions ADF2 and ADF1 and solves the problem.

Therefore, allowing automatic function definitions to reference other automatic function definitions for the even-5-parity problem results in the processing of 144,000 individuals in order to yield a solution which is smaller than 152,000 which were required previously for the other example of the even-5-parity problem.

Odd-5-Parity Via Automatic Function Definition

One particular run of the odd-five-parity problem is worth nothing. In this run, genetic programming discovered the following 100%-correction program containing 153 points with a perfect value of raw fitness in generation 10:

```
(PROGN (DEFUN ADF0 (ARG0 ARG1)
        (NOR (AND (OR (NOR ARG0 ARG1) (OR ARG1 (OR (NOR ARG1 ARG1)
        (NAND ARG1 ARG0)))) (NAND (OR ARG1 ARG1) (NOR ARG0 ARG0)))
        (NOR (OR (AND ARG0 ARG0) (AND ARG1 ARG1)) (OR (AND ARG0 ARG1)
        (NOR ARG1 ARG1)))))
    (DEFUN ADF1 (ARG0 ARG1 ARG2)
        (NOR (NOR (OR (NOR (AND (NAND ARG2 ARG1) (NAND ARG1 ARG1))
        (NAND (NOR (NAND ARG1 ARG1) (NOR AGR0 ARG2)) (NOR ARG2
        ARG2))) (AND (AND ARG1 ARG2) (NAND ARG1 ARG0))) (NOR (NOR
        (AND (NAND ARG1 ARG2) (AND ARG2 ARG0)) (NOR (AND ARG2 ARG1)
        (OR ARG1 ARG2))) (NOR (NOR (AND ARG2 ARG2) (OR ARG2 ARG0))
        (NAND (NAND ARG0 ARG2) (NOR ARG1 ARG2))))) (NOR (NOR (AND
        ARG2 ARG2) (OR ARG2 ARG0)) (NAND (NAND ARG0 ARG2) (NOR ARG1
        ARG2)))))
    (DEFUN ADF2 (ARG0 ARG1 ARG2 ARG3)
        (NAND (AND (OR (OR ARG3 ARG2) (AND (NAND ARG1 ARG3) ARG0))
        (NOR (AND ARG0 ARG2) (OR ARG2 ARG2))) (NOR (AND (AND ARG1
        ARG1) (NAND ARG2 ARG3)) (AND (OR ARG2 ARG0) (NAND ARG2
        ARG0)))))
    (VALUES (ADF1 (ADF1 D1 D4 D0) D2 D3))).
```

The only function which the result-producing branch of this program calls is the three-argument defined function ADF1 established by the second branch. Defined function ADF1 is equivalent to the even-3-parity function. Therefore, in solving the odd-5-parity problem, genetic programming created a lower order parity function. FIG. 31 illustrates this best-of-run individual from generation 10 to the odd-5-parity problem using two even-3-parity functions as building blocks. Referring to FIG. 31, the odd-5-parity solution shows using even-3-parity 2301 which has arguments of the even-3-parity 2305, D2 2306 and D3 2307 coupled via branches 2302, 2303, and 2304 respectively. The even-3-parity argument 2305 has arguments D1 2311, D4 2312 and D0 2313 coupled via branches 2308, 2309 and 2310.

Furthermore, the odd-5-parity problem illustrates that 276,000 individuals must be processed to yield a solution with automatic function definition to this problem with 99% probability.

Even-6-Parity Via Automatic Function Definition

The Boolean even-6-parity function is one of $2^{2^6}$ equaling $2^{64}$ or approximately $10^{19}$ (i.e., 10 quintillion) possible functions of six arguments and is exceedingly difficult to learn.

In the currently preferred embodiment, the even-6-parity problem uses entities having five branches. The first four branches permit the creation of function definitions with 2, 3, 4 and 5 dummy variables. The result-producing branch (i.e. the fifth branch) is a program incorporating the four diadic Boolean functions of function set $F_b$, the four defined functions ADF0, ADF1, ADF2, and ADF3, and the six actual variables of the problem D0, D1, D2, D3, D4 and D5. For example, in one run of the even-6-parity problem, genetic programming discovered the following program containing 190 points with a perfect value of raw fitness (i.e., 64 out of 64) on generation 19:

```
(PROGN (DEFUN ADF0 (ARG0 ARG1)
        (AND (NAND (NOR (NOR ARG1 ARG0) (NAND ARG0 ARG1)) (OR (NOR
        ARG1 ARG0) (OR ARG1 ARG0))) (OR (NOR (NOR ARG1 ARG0) (AND
        ARG1 ARG1)) ARG1)))
    (DEFUN ADF1 (ARG0 ARG1 ARG2)
        (OR (NAND (NAND (AND ARG1 ARG2) (NOR ARG2 ARG0)) (OR (NAND
        ARG2 ARG2) (NOR ARG0 ARG1))) (AND (AND (NAND ARG1 ARG0) (NOR
        ARG0 ARG1)) (NAND (NAND (NOR ARG2 ARG0) ARG1) ARG2))))
    (DEFUN ADF2 (ARG0 ARG1 ARG2 ARG3)
        (OR (OR (OR (AND (ARG3 ARG0) (OR (OR ARG0 ARG2) (NOR ARG1
        ARG0))) (OR (OR ARG0 ARG2) (NOR ARG1 ARG0))) (NOR (OR (AND
        ARG2 ARG1) (NOR ARG2 ARG1)) (OR (AND ARG2 ARG1) (NOR ARG2
        ARG1)))))
    (DEFUN ADF3 (ARG0 ARG1 ARG2 ARG3 ARG4)
        (AND (NOR (NOR (OR ARG1 ARG3) (OR ARG2 ARG0)) (NOR (NAND ARG3
        ARG0) (OR ARG1 ARG2))) (NAND (OR ARG2 ARG1) (AND (AND ARG2
        ARG0) (AND ARG2 ARG0)))))
    (VALUES (ADF0 (ADF1 (ADF0 (NOR D5 D5) (AND D2 D0)) (ADF3 (NAND
        D0 D5) (NOR ADF0 D4 D1) (ADF2 D0 D3 D1 D0)) (NAND D0 D0)
        (ADF3 D5 D3 D0 D1 D4) (AND D2 D2)) (OR (NAND D5 D1) (NAND D1
        D4))) (ADF0 (ADF1 (ADF1 D1 D4 D1) (ADF1 D1 D4 D1) (ADF3 D3 D0
        D0 D2 D5)) (NAND (ADF3 D1 D4 D5 (NAND D0 D5) D0) (ADF2 D4 D0
        D1 D2)))))).
```

In the above program for the even-6-parity function, the first branch creates the two-argument defined function ADF0, which is equivalent to the two-argument exclusive-or function XOR. The second branch creates the three-argument defined function ADF1, which is equivalent to:

(OR (NAND ARG2 ARG1 ARG0) (AND ARG2
(NOR ARG1 ARG0)))

The third branch creates a four-argument defined function ADF2, which is equivalent to the constant Boolean function T (true). The fourth branch creates a five-argument defined function ADF3, and the result-producing branch solves the problem.

In a second run on generation 25, genetic programming discovered the following 100%-correct program containing 489 points:

```
(PROGN (DEFUN ADF0 (ARG0 ARG1)
          (NAND (AND (NOR (AND ARG1 ARG0) (AND ARG1 ARG0)) (AND (AND
          ARG0 ARG0) (OR ARG0 ARG0))) (AND (NOR (AND ARG1 ARG0) (NOR
          ARG0 ARG1)) (OR (NOR ARG1 ARG0) (AND ARG1 ARG0)))))
       (DEFUN ADF1 (ARG0 ARG1 ARG2)
          (AND (AND (OR (OR ARG1 ARG0) (NAND ARG2 ARG2)) (OR (NAND ARG1
          ARG0) (NAND ARG2 ARG1))) (AND (NAND (OR ARG0 ARG1) (NOR ARG0
          ARG1)) (NAND (OR ARG1 ARG1) (NAND ARG2 ARG2)))))
       (DEFUN ADF2 (ARG0 ARG1 ARG2 ARG3)
          (NAND (AND (AND (OR ARG3 ARG0) (NAND ARG2 ARG0)) (NOR ARG1
          (AND ARG2 ARG1))) (NAND (NAND (OR ARG0 ARG3) (NAND ARG2
          ARG0)) ARG2)))
       (DEFUN ADF3 (ARG0 ARG1 ARG2 ARG3 ARG4)
          (NAND (NOR (NAND (OR ARG0 ARG0) (OR ARG4 ARG2)) (NOR ARG4
          ARG0)) (NOR ARG4 ARG0)))
       (VALUES (NOR (ADF1 (ADF1 (ADF1 (NOR (ADF2 (ADF2 (ADF2 (ADF2 D2
          D5 D2 D0) (NOR D5 D3) (ADF3 D3 D5 D2 D0 D3) (ADF2 (NAND D3
          D4) (AND D2 D2) (OR D4 D1) (OR D5 D5))) (AND (ADF1 D5 D3 D4)
          (NOR D1 D2)) (OR (NAND D1 D1) (NOR (ADF2 (OR D5 D1) (ADF3 D1
          D4 D4 D4 D0) (ADF3 D3 D0 D3 D2 D4) (ADF0 D3 D3)) (NOR D3
          D1))) (ADF3 (AND D3 D5) (ADF1 D2 D1 D2) (NOR D2 D0) (NOR D2
          D2) (AND D3 D4))) (ADF2 (ADF2 (NAND D3 D4) (AND D2 D2) (ADF0
          D0 D5) (ADF3 D4 D1 D5 D0 D1)) (OR (ADF1 D5 D1 D3) (NOR D0
          D5)) (ADF0 (ADF1 D3 D1 D1) (AND D0 D0)) (ADF1 (ADF1 D1 D3 D1)
          (NAND D3 D2) (OR D0 D3))) (ADF0 (ADF1 D5 D2 D0) (OR D5 D1))
          (ADF0 (OR (NOR D5 D3) (ADF2 D3 D4 D4 D5)) (OR (NOR D3 D1)
          (NOR D0 D5)))) D4) (AND D1 D3) (NAND D3 D2)) (ADF1 (NOR D5
          D3) D4 D0) (ADF2 D1 D3 D2 D2)) (ADF1 (OR D0 D3) (NAND D3 D5)
          (NOR D5 D3)) (ADF2 (ADF2 (ADF2 (ADF2 D2 D5 D2 D0) (NOR D5 D3)
          (ADF3 D3 D5 D2 D0 D3) (ADF2 (NAND D3 D4) (AND D2 D2) (OR D4
          D1) (OR D5 D5))) (AND (ADF1 D5 D3 D4) (NOR D1 D2)) (OR (NAND
          D1 D1) (ADF3 D3 D0 D3 D2 D4)) (ADF3 (ADF2 (ADF2 D2 D5 D2 D0)
          (NOR D5 D3) (ADF3 D3 D5 D2 D0 D3) (ADF2 (NAND D3 D4) (AND D2
          D2) (OR D4 D1) (OR D5 D5))) (ADF1 D2 D1 D2) (NOR D2 D0) (NOR
          D2 D2) (AND D3 D4))) (ADF2 (ADF2 (NAND D3 D4) (AND D2 D2)
          (ADF0 D0 D5) (ADF3 D4 D1 D5 D0 D1)) (OR (ADF1 D5 D1 D3) (NOR
          D0 D5)) (ADF0 (ADF1 D3 D1 D1) (AND D0 D0)) (ADF1 (ADF1 D1 D3
          D1) (NAND D3 D2) (OR D0 D3))) (ADF0 (ADF3 D2 D2 D2 D1 D1)
          (NOR (ADF2 (OR D4 D1) (ADF3 D1 D4 D4 D4 D0) (ADF3 D3 D0 D3 D1
          D4) (ADF0 D3 D3)) (NOR D3 D1))) (ADF0 (OR (NAND D1 D5) (ADF2
          D3 D4 D4 D5)) (OR (NOR D3 D1) (NOR D0 D5))))) (NOR (ADF2 (OR
          D5 D1) (ADF3 D1 D4 D4 D4 D0) (ADF3 D3 D0 D3 D2 D4) (ADF0 D3
          D3)) (NOR D3 D1))))).
```

In the above program for the even-6-parity function, both the first branch and the fourth branch are equivalent to definitions of the constant Boolean function T. The second branch creates the three-argument defined function ADF2, which is equivalent to:

(OR (AND (NOT ARG2) (NOT ARG1)) (AND ARG2 (XOR ARG1 ARG0)))

It should be noted that this is a partial parity function.

The fourth branch creates the four-argument defined function ADF3 and the fifth branch creates the five-argument automatically defined function ADF4. Defined function ADF4 is never called. Finally, the result-producing branch calls upon defined functions ADF0, ADF1, ADF2 and ADF3 to produce the Boolean even-6-parity function.

In one embodiment, using automatic function definition, genetic programming was used to solve the even-6-parity problem producing entities (programs) having one result-producing branch and two function-defining branches, each permitting the definition of a function of five dummy variables.

In one run of the even-6-parity function, the following best-of-generation involving individual containing 106 points and attaining a perfect value of raw fitness of 64 (out of 64) was generated in generation 7:

```
(PROGN (DEFUN ADF0 (AGR0 ARG1 ARG2 ARG3 ARG4)
          (OR (AND (AND ARG1 ARG2) (NAND ARG0 ARG4)) (NAND (NAND (AND
          ARG0 ARG1) ARG2) (OR ARG2 ARG1))))
       (DEFUN ADF1 (ARG0 ARG1 ARG2 ARG3 ARG4)
          (OR (ADF0 ARG4 ARG4 ARG3 ARG4 ARG3) (NOR ARG1 (OR ARG3
          ARG4))))
       (VALUES (ADF0 (AND D4 D0) (ADF0 (AND D4 D5) (NAND D0 D2) (ADF1
          D3 D5 D5 D3 D1) (OR D2 D0) (ADF0 D0 D0 D5 D4 D0)) (ADF1 (AND
          D1 D3) (AND D2 D0) (NAND D5 D5) (ADF0 D4 (NOR D5 D5) D4 D2
          D2) (OR D2 D0)) (OR (AND D4 D1) (NAND D3 D5)) (ADF0 (NOR D1
          D3) (NAND D0 D5) (ADF0 D1 D5 D0 D0 D1) (ADF1 D3 D0 D3 D2 D1)
          (AND D5 D1))))).
```

The first branch of the above program defines a five-argument defined function ADF0 which reduces to:

(EQV ARG1 ARG2)

It should be noted that ADF0 ignores three of its five arguments. The second branch defines a five-argument defined function ADF1 which ignores three of its five arguments and is equivalent to:

(XOR ARG3 ARG4)

Substituting the definitions of the defined functions ADF0 and ADF1, the result-producing branch becomes:

(EQV (EQV (NAND D0 D2) (XOR D3 D1))
 (XOR (EQV (NOT D5) D4) (OR D2 D0))))

The above program is equivalent to the target even-6-parity function. Note that the fact that each of the defined functions utilizes five arguments means that the value-defining branch is relatively bushy and that several of the available dummy variables in both of the functions-defining branches are typically ignored in solving this problem. As the number of actual variables of the problem in the target function increases, it may be necessary to conserve computer resources by reducing the number of arguments taken by the two defined functions ADF0 and ADF1 to four.

Thus, the idea of creating a constrained syntactic structure for automatically generating a set of function definitions along with one or more final value-returning S-expressions which can call upon any combination of the defined functions to solve the problem is shown above. Neither the size, shape nor content of the function defining branches have to be specified nor are the result-producing branches specified. Instead, the present invention, using natural selection and genetics, driven by the fitness measure, caused the evolution of the necessary size, shape, and content of the solution to the problem. Furthermore, in using hierarchical automatic function definition, each program in the population containing a fixed number of function-defining branches could define an arbitrary function involving an identical number of arguments and be defined in terms of previously defined functions. The result-producing branches of the program then has access to the defined functions to help in solving the problem.

More than one result-producing branch can exist with automatic function definition or hierarchical automatic function definition. Thus, more than one value can be returned by an individual program and each of these values may, in fact, be a collection of values. Actual variables of the problem domain can appear in the function-defining branches with automatic function definition or hierarchical automatic function definition, just as do their dummy variables.

RECURSION IN GENETIC PROGRAMMING

Recursion is a technique well known in the art and is used frequently by human programmers when solving problems. Indeed there are certain classes of problems that cannot be solved without the use of recursion. What is needed is a means of evolving the solutions to recursive problems.

In the foregoing examples, a given automatically defined function never called on itself, either directly or indirectly by calling on one or more other functions which in turn eventually call on the given function. That is, self-reference (recursion) was explicitly avoided. However, recursion is necessary for solving some problems and it provides a more efficient or alternative way to solve many other problems.

First we will explain the use of recursion in the context of a simple problem, namely the recursive definition of the multiplication function. Although the multiplication function can be defined in other ways, using a recursive formulation will help to explain the principles behind recursion.

For example, suppose that the ordinary multiplication function was not available but one wanted to multiply A (the multiplicand) by a positive integer B (the multiplier). One could achieve the desired multiplication by adding A to itself B times to obtain the desired result (the product of A and B). A recursive definition of multiplication could be implemented in the LISP programming language by defining a function called RMULT as follows:

(DEFUN RMULT (ARGA ARGB)
 (IF (= ARGB 1)
  ARGA
  (+ ARGA (RMULT ARGA (− ARGB 1))))).

This function definition for RMULT is interpreted as follows: When the predicate on the second line "ARGB equals 1" [written in LISP as (=ARGB 1)] is not true, then execute the fourth line, which adds ARGA to the result of applying the function RMULT to ARGA and ARGB minus 1 [written in LISP as (+ARGA (RMULT ARGA (−ARGB 1)))]. In other words, if we had the result of multiplying ARGA times ARGB−1, we could obtain the result of multiplying ARGA times ARGB simply by adding ARGA to the result of multiplying ARGA times ARGB−1. Thus, the definition of the function RMULT refers to itself. This self reference is termed recursion. The call by RMULT on itself, of course, begs the question because we do not yet have the intermediate result of multiplying ARGA times ARGB−1. However, if we did have this intermediate result, we would have achieved the desired result of multiplying ARGA times ARGB. The potentially infinite looping implied by this circular self-referencing process is finally terminated by the third line in the above function definition. When the predicate "ARGB equals 1", i.e. the predicate on the second line is satisfied, we execute the third line, which specifies that the value ARGA is to be returned. The test as to whether ARGB equals 1 is called the "termination predicate" of the recursive definition. The value ARGA on the third line is the "base case" that is returned when the termination predicate is satisfied. When the termination predicate is not satisfied, i.e. whenever ARGB is not equal to 1, then the "non-base case" is executed as exemplified by the fourth line of the example above.

We can see a graphical representation of this function in FIG. 33. Referring to FIG. 33, the function definition for the function RMULT is rooted by the DEFUN function defining operator 3500. DEFUN 3500 has branches to each of its three arguments, namely RMULT 3510, the name of the function being defined, the list (ARG0 ARG1) 3520, i.e. the list containing the elements ARG0 and ARG1, which is the argument list of the function RMULT being defined, and the tree rooted at IF function 3530, which is the body of the function RMULT. The IF function 3530 itself has three arguments which represent the three important aspects of the definition of a recursive function. The first (leftmost) of the arguments to IF 3530 is the termination predicate rooted at the equality testing function=3540 and itself having arguments ARG1 3550 and the constant 1 3560. The second (middle) argument to IF 3530 is the terminal ARG0 3570. This represents the base case for the recursion. The third and rightmost argument to IF 3530 is the subtree rooted at addition function+3580, which represents the non-base case of the recursion. Addition function 3580 has two arguments, namely ARG0 3590 and the subtree rooted by the call to RMULT 3600, which is the recursive call to the function RMULT. The arguments to the recursive call to RMULT 3600 are the multiplicand ARG0 3610 and the simplified version of the multiplier rooted at subtraction function "−" 3620 and having two arguments, namely terminal ARG1 3630 and the constant 1 3640. The figure is divided by the line 3650. The components of the figure above line 3650, namely DEFUN 3500, the function name RMULT 3510, the argument list (ARG0 ARG1) 3520 and the IF function 3530 can together be viewed as the general structure (template) for this recursive function. The three arguments to the IF function 3530 are all below the line 3650 indicating that they are part of the specific definition of the function, as opposed to the general structure.

The process of recursion works by applying small operations to progressively simpler and simpler versions of the given problem. The point at which the problem becomes so simple that it must be handled specially is called the base case. In order for a recursive algorithm, such as that defined above, to terminate, there must always be a termination predicate that tests whether the recursion has arrived at the base case and there must also be the part of the algorithm, (i.e., the body of the base case) which handles this case. The body of the base case does not refer to the function itself. This is why the recursion terminates in the execution of the base case.

Specifically, suppose one wanted to multiply 7.1 (the multiplicand A) by the positive integer 3 (the multiplier B). We could accomplish this by evaluating (RMULT 7.1 3). That is, we apply the function RMULT to the arguments 7.1 and 3. The definition of the function RMULT would tell us that the result of multiplying 7.1 by 3 is the sum of 7.1 and the result of multiplying 7.1 by 2 (3 minus 1). Then, the definition of the function RMULT would further tell us that the result of multiplying 7.1 by 2 is the sum of 7.1 and the result of multiplying 7.1 by 1 (2 minus 1). Because the multiplier is 1 for this second call upon RMULT, the function RMULT would not give us the result of multiplying 7.1 by 1 in the same way as it previously did (i.e., in terms of an addition and a further call on itself). Instead, RMULT would tell us that the result of multiplying 7.1 (ARGA) by 1 is 7.1 (ARGA). That is, in the special "base" case when the multiplier is 1, the result produced by RMULT is just the multiplicand ARGA. Once we known the result of multiplying 7.1 by 1, the value of multiplying 7.1 by 2 is now firmly established (i.e., it is 7.1 plus 7.1 or 14.2). And, since we then know the result of multiplying 7.1 by 2 (i.e. 14.2), the value of multiplying 7.1 by 3 is now established (i.e., it is 7.1 plus 14.2 or 21.3).

Now let us consider how we provide specific mechanisms to support recursion in the present invention. First we will consider the case when the automatically defined function mechanism is not used. Later we will see that support for recursion easily can be generalized to be applicable in the case of automatic function definition. Because we know that a recursive function must have a termination predicate, a base case and a non-base case we can impose a syntactic structure that provides these three components to the entity being evolved. This avoids the problem of having to evolve this necessary three-part structure. What is more, because we wish to allow recursive references by the entity to itself, we must give it a way to invoke itself. A convenient way to do this is to give the entity a name, such as MAIN. Thus we impose a syntactic constraint on the entities that we create so that they conform to the template shown in FIG. 34. Referring to FIG. 34, the template specifies a function definition for a function called MAIN, rooted at DEFUN 3800. DEFUN 3800 has three arguments, namely the name of the function MAIN 3810, the argument list to the function 3820 and the subtree rooted at the IF function 3830. The name MAIN 3810 is the name that we choose to give to the entity during its activation by the external controller of the process, the argument list 3820 is the ordered set of variables external to the problem, namely the actual variables of the problem. The tree rooted at IF 3830 is the body of the definition of the function MAIN. The IF function 3830 has three arguments, namely the termination predicate 3840, the body of the base case 3850 and the body of the non-base case 3860. Note that the body of the base case 3850 cannot refer to the name of the function being defined, namely MAIN 3810, whereas the body of the non-base case 3860 can refer to MAIN 3810. The figure is divided into two parts by line 3870. The components of the entity above the line, namely DEFUN 3800, the name of the function being defined (the name of the entity) MAIN 3810, argument list 3820 and the IF function 3830 are the fixed structure of the template for the entity. The arguments to the IF function 3830 are the three distinct parts of the recursive function that must be evolved.

In the preferred embodiment, therefore, we would invoke an entity of this type by calling the function MAIN with arguments that are the currently desired values of the actual variables of the problem.

In the preferred embodiment, the function set for the termination predicate, i.e. the first argument to the IF in the template specifying the structure of the entity, should produce a Boolean (i.e., true or false) result. This can be accomplished, for example, by using Boolean functions (such as IF, AND, OR, NOT, WHEN) or comparison functions (such as =, <, >) in the function set for this branch. Alternatively, if the result of this branch is not Boolean, the result can be wrapped in a wrapper which returns either true or false. For example, it might interpret values less than zero as false and other values as true. This requirement can be established when the entities in the initial population are created. It is then maintained by virtue of a restriction on the crossover operation that limits crossover happening within the termination predicate to items of the same type in other entities.

The function set for the body of the base case (the second argument to the IF function in the template) should not contain the name of the function being defined. That is, the base case should ground out to actions and material that do not refer to the function being defined. In the example above, the body of the base case contained the terminal ARG0, but did not contain the function RMULT. This requirement can be initially established when the entities in the initial population are created. It is then maintained by virtue of a restriction on the crossover operation that limits crossover happening within the body of the base case to items of the same type in other entities.

The function set of the non-base case need not be constrained in this way. Note that the non-base-case body of the entity for the function RMULT in the example above contains a reference to the function RMULT. This is the self-reference that makes this function definition directly recursive. It is also possible for a recursion to be indirect in the sense that the given function refers to another function which eventually refers to the given function. This can commonly be the case when recursion is used in conjunction with the automatically defined function mechanism described below.

It should be noted that recursive functions need not have exactly one base case, non base case or termination predicate. The present invention admits multiple base cases, non-base cases and termination predicates easily by substituting the IF function in the general structure (template) with a suitable multi-branched function, such as the LISP functions CASE and COND. The structure-preserving crossover operation would then preserve these structures as appropriate.

Thus we can aid the discovery of recursive entities by the use of an overlayed syntactic structure. This mechanism can also be used with the automatically defined function mechanism. What is done in the preferred embodiment is to include this same syntactic structure comprised of the elements, the IF function, a termination predicate, a body for the base case and a body for the non-base case into the body of each ADF that is to be allowed to be recursive. Then all that needs to be done is to add the name of the ADF to the function set allowed in the body of the non-base case. If it is desired that the externally invoked sub-entities themselves be recursive then they can systematically be named MAIN1, MAIN2, for example and given the same syntactic structure as that described above. Then the entity can be invoked by calls to the functions representing the externally invoked sub-entities using the appropriate values of the actual variables of the problem as arguments.

In implementing recursion in the context of the overall problem solving process of the current invention, the termination predicate of many entities in the population (particularly in the initial random generation) will be poorly formed and will not terminate recursion in a correct or in a timely fashion. In particular, it will be common that many entities will not terminate the self-referencing within a reasonable amount of time. Therefore, whenever resources are limited (e.g., on a serial computer), it is a practical necessity when implementing recursion to establish an overall limit on the amount of resources (e.g. computer time) that can be expended on the attempted evaluation of any one sub-entity or any entire entity in the population. We establish two limits on the amount of recursion that any entity can exhibit, one for the maximum allowed depth of any single set of recursive calls and second for the total number of recursive calls that are allowed during the activation of the entity. If the first limit is exceeded then the external controller of the process can terminate the recursion by making the call that exceeded this first limit behave as if it has arrived at a base case, that is it would return some suitable domain-specific value, such as zero. If the second limit is exceeded then activation of the entity is aborted. The value assigned to that entity for purposes of selection and application of the operations of crossover and reproduction is then typically set to some arbitrary unfavorable value.

It is theoretically possible to successfully solve a problem involving recursion (self-referencing) within the context of genetic programming without the above described structure; however, it is very unlikely that such a solution would be produced within any reasonable amount of time and effort. The preferred embodiment provides a structure that significantly facilitates the solution of the problem involving recursion.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather it is limited only by the appended claims.

Thus, a non-linear genetic process for solving problems using automatically defined functions and for encoding data has been described.

We claim:

1. In a computing system having at least one processor and at least one memory, a computer implemented process for solving a problem comprising the steps of:
creating a population of programmatic entities having sub-entities, wherein at least one of said sub-entities is externally invocable and at least one of said programmatic entities in the population has at least one internally invocable sub-entity, said at least one externally invocable sub-entity including at least one invocation of an internally invocable sub-entity; and
evolving said population, including the step of executing the population of programmatic entities, wherein said at least one externally invocable sub-entity invokes said at least one internally invocable sub-entity to produce results and, wherein said step of evolving further includes the step of generating at least one new programmatic entity in response to the results.

2. The process defined in claim 1 wherein said step of evolving comprises a series of iterative steps, wherein said series of iterative steps includes executing each of said programmatic entities to produce a result, thereafter subjecting at least one of said programmatic entities to an operation for evolving said at least one of said programmatic entities to generate a new programmatic entity, and adding said new programmatic entity to said population.

3. The process defined in claim 1 wherein the step of creating a population includes the step of creating at least one internally invocable sub-entity within at least one of said programmatic entities that references another internally invocable sub-entity within said at least one of said programmatic entities.

4. The process defined in claim 1 wherein said at least one externally invocable sub-entity includes at least one action.

5. The process defined in claim 1 wherein said at least one externally invocable sub-entity includes material.

6. The process defined in claim 5 wherein material comprises material provided to said at least one externally invocable sub-entity.

7. The process defined in claim 5 wherein material comprises material provided to said at least one internally invocable sub-entity.

8. The process defined in claim 1 wherein said at least one internally invocable sub-entity includes material.

9. The process defined in claim 1 wherein said at least one internally invocable sub-entity includes at least one action.

10. In computing system having at least one processor and at least one memory, a computer implemented process for problem solving using a population of programmatic entities, wherein each of said programmatic entities includes sub-entities, wherein at least one of said sub-entities is externally invocable and at least one of said programmatic entities in the population has at least one internally invocable sub-entity, said at least one externally invocable sub-entity including at least one invocation of an internally invocable sub-entity, said process comprising iterations of a series of steps, each iteration comprising the steps:

executing each said programmatic entity to produce a result;

selecting at least one programmatic entity from said population using selection criteria, said selection criteria based on a fitness associated with each said programmatic entity, said selection criteria preferring each said programmatic entity having a relatively high associated fitness over each said programmatic entity having a relatively low associated fitness;

choosing and performing an operation wherein each chosen operation is one of the operations of crossover or reproduction;

retaining said selected programmatic entity such that said selected programmatic entity remains unchanged if said chosen operation is reproduction;

creating at least one new programmatic entity by crossover using a group of programmatic entities if said chosen operation is crossover, said group of programmatic entities comprising said selected programmatic entity and at least another programmatic entity, wherein a portion of the selected programmatic entity and a portion of said at least another programmatic entity are designed, such that the new programmatic entity created by crossover comprises said portion of said selected programmatic entity other than said designed portion and said designated portion of said at least another programmatic entity, said new programmatic entity differing in size and shape from said selected programmatic entity and said at least another programmatic entity when the designated portion of said selected programmatic entity and said designated portion of said at least another programmatic entity differ in size and shape; and adding said new programmatic entity to said population.

11. The process defined in claim 4 wherein said crossover operation is restrained such that said designated portion of said at least another programmatic entity in said new programmatic entity includes only those actions, material and references to internally invocable sub-entities that have been given a meaning by the other than the designed portion of said selected programmatic entity.

12. The process defined in claim 11 further comprising the step of determining actions, materials and references to internally invocable sub-entities that have meaning to said selected programmatic entity.

13. The process defined in claim 10 wherein said step of creating includes creating at least one programmatic entity having a first internally invocable sub-entity referring to a second internally invocable sub-entity within that programmatic entity, such that said internally invocable sub-entity invokes said second internally invocable sub-entity within said at least one programmatic entity when executed.

14. The process defined in claim 10 wherein the step of executing includes the step of said at least one internally invocable sub-entity invoking itself recursively.

15. The process defined in claim 10 wherein the step of executing includes executing one of said programmatic entities having at least one internally invocable sub-entity, such that said at least one internally invocable sub-entity invokes itself by referring to another internally invocable sub-entity in said one of said programmatic entities.

16. The process defined in claim 10 wherein said step of selecting at least one programmatic entity further comprises selection criteria based on a probability that is proportional to said fitness associated with said programmatic entity.

17. The process defined in claim 10 wherein said step of choosing and performing an operation further comprises the operation of mutation such that if said chosen operation is mutation, a step of mutation occurs before said adding step, wherein said selected programmatic entity is mutated, such that at least one designated portion of said selected programmatic entity is replaced by a randomly generated portion, such that the randomly generated portion contains only actions, material and references to internally invocable sub-entities that have been given meaning by the other than said designated portion of said selected programmatic entity.

18. The process defined in claim 10 further comprising a step of removing at least one programmatic entity having a relatively low associated fitness.

19. The process defined in claim 10 further including the steps of determining if an individual programmatic entity in said population attains a pre-established fitness with respect to a solution to the problem and designating said individual programmatic entity as the solution to the problem.

20. The process defined in claim 10 wherein the initial population of programmatic entities includes programs created by randomly generating programs of various sizes and structures, said programmatic entities consisting of hierarchical sub-entities, said hierarchical sub-entities including at least either actions and material available for the problem.

21. The process defined in claim 10 wherein the steps of executing includes executing more than one programmatic entity simultaneously.

22. The process defined in claim 10 wherein said step of executing includes selecting more than one programmatic entity simultaneously.

23. The process defined in claim 10 wherein said step of choosing and performing is performed simultaneously for more than one programmatic entity.

24. The process defined in claim 10 wherein if said operation of reproduction is chosen for at least one of said programmatic entities then said step of executing is not repeated for said at least one of said programmatic entities.

25. In a computing system having at least one processor and a memory, a computer implemented process for solving a problem comprising the steps of:

creating an initial population of programmatic entities having sub-entities, wherein at least one of said sub-entities produces a result upon execution and at least one of said programmatic entities in the population has at least one function defining sub-entity, said one of said at least one sub-entity capable of including at least one invocation of a function defining sub-entity; and evolving said population to generate a solution to said problem, wherein said step of evolving includes the step of executing each said programmatic entity to produce a result, wherein the function defining sub-entity is invoked by said one of the programmatic entities that produces results, such that the solution to said problem is derived from results produced by evolving said population.

26. The process defined in claim 25 wherein the step of creating an initial population includes the step of creating at least one programmatic entity having a function defining sub-entity that remains constant, such that the function defining sub-entity does not undergo evolution.

27. The process defined in claim 25 wherein said function defining sub-entity includes at least one action.

28. The process defined in claim 25 wherein said function defining sub-entity includes material.

29. The process defined in claim 28 wherein material comprises material provided to said one of said programmatic entities that produces results.

30. The process defined in claim wherein material comprises material provided to said function defining sub-entity.

31. A computing system for solving problems comprising a processor and a memory means coupled to said processor for storing a population of programmatic entities, wherein each of said programmatic entities is comprised of sub-entities, wherein at least one of said sub-entities is externally invocable and at least one of said programmatic entities in the population has at least one internally invocable sub-entity, said at least one externally invocable sub-entity including at least one invocation of an internally invocable sub-entity, said computing system further comprising:

means for executing each said programmatic entity to produce a result, said means for executing coupled to said memory means;

means for selecting at least one programmatic entity from said population using selection criteria, said selection criteria based on a fitness associated with each said programmatic entity, said selection criteria preferring each said programmatic entity having a relatively high associated fitness over each said programmatic entity having a relatively low associated fitness, said means for selecting coupled to said memory means;

means for choosing and performing an operation wherein each chosen operation is one of the operations of crossover or reproduction, said means for choosing and performing coupled to said memory means;

means for creating at least one new programmatic entity by crossover using a group of programmatic entities if said chosen operation is crossover, said group of programmatic entities comprising said selected programmatic entity and at least another programmatic entity, wherein a portion of the selected programmatic entity and a portion of said at least another programmatic entity are designated, such that said new programmatic entity created by crossover comprises the portion of said selected programmatic entity other than said designated portion and said designated portion of said at least another programmatic entity, wherein said crossover operation is restrained such that said designated portion of said at least another programmatic entity in said new programmatic entity includes only those actions, material and references to internally invocable sub-entities that have been given a meaning by the other than the designated portion of said selected programmatic entity, said new programmatic entity differing in size and shape from said selected programmatic entity and said at least another programmatic entity when the designated portion of said selected programmatic entity and said designated portion of said at least another programmatic entity differ in size and shape, said means for creating coupled to said memory means;

means for retaining said selected programmatic entity such that said selected programmatic entity remains unchanged if said chosen operation is reproduction, said means for retaining coupled to said memory means;

means for adding said new programmatic entity to said population, said means for adding coupled to said memory means.

32. The computing system defined in claim 31 wherein the means for executing includes means for invoking said sub-entities wherein at least one internally invocable sub-entity refers to and invokes another internally invocable sub-entity, such that said another internally invocable sub-entity is executed.

33. The computing system defined in claim 31 further comprising means for selecting at least one programmatic entity further comprising selection criteria based on a probability that is proportional to said fitness associated with said program.

34. The computing system defined in claim 31 further comprising means for choosing and performing the operation of mutation, such that if said chosen operation is mutation, a step of mutation occurs before said adding step, wherein said selected programmatic entity is mutated, wherein at least one portion of said selected programmatic entity is replaced by a randomly generated portion, such that said randomly generated portion contains only actions, material and references to internally invocable sub-entities having meaning in said selected programmatic entity.

35. The computing system defined in claim 31 further comprising means for removing at least one programmatic entity having a relatively low associated value.

36. The computing system defined in claim 31 further comprising means for removing said group from said population.

37. The computing system defined in claim 31 further including means for designating the solution coupled to the processor, wherein said means for designating the solution designates an individual programmatic entity in said population attaining a pre-established fitness is designated as the solution to the problem.

38. The computing system defined in claim 31 further comprising means for creating the initial population of programmatic entities by randomly generating programmatic entities of various size and structures, said programmatic entities having hierarchical sub-entities that include at least one action and material available for the problem.

39. The computing system defined in claim 31 wherein said means for executing executes said at least one programmatic entity, wherein at least one internally invocable sub-entity invokes itself recursively.

40. The computing system defined in claim 31 wherein means for executing executes said at least one programmatic entity, wherein at least one internally invocable sub-entity in one of said programmatic entities invokes itself by referring to another internally invocable sub-entity in said one of said programmatic entities.

41. In a computing system having at least one processor and a memory, a computer implemented process for automatically encoding a set of data values into a procedure for at least approximating said set of data values, using a population of programmatic entities of various sizes and shapes, wherein each programmatic entity is a hierarchical arrangement of actions and material, said process comprising iterations of a series of steps which generate said procedure, each iteration comprising the steps:

executing each said programmatic entity to produce a result;

selecting at least one programmatic entity from said population using selection criteria, said selection criteria based on a fitness associated with each said programmatic entity, said selection criteria preferring each said programmatic entity having a relatively high associated fitness over each said programmatic entity having a relatively low associated fitness;

choosing and performing an operation wherein each chosen operation is one of the operations of crossover or reproduction;

creating at least one new programmatic entity by crossover using a group of programmatic entities if said chosen operation is crossover, said group of programmatic entities comprising said selected programmatic entity and at least another programmatic entity, such that any new programmatic entity created by crossover comprises at least a portion of said selected programmatic entity and at least a portion of said at least another programmatic entity, said new programmatic entity differing in size and shape from said selected programmatic entity and said at least another programmatic entity when said at least a portion of said selected programmatic entity and said at least a portion of said at least another programmatic entity differ in size and shape;

retaining said selected programmatic entity such that said selected programmatic entity remains unchanged if said chosen operation is reproduction;

adding said new programmatic entity to said population.

42. The process defined in claim 41 wherein said set of data values corresponds to an image, wherein the step of executing each said programmatic entity produces a result approximating the image, and wherein the process further comprises the step of designating the programmatic entity that represents the image as having a relatively high associated fitness over each said programmatic entity having a relatively low associated fitness, such that said process performs image compression.

43. The process defined in claim 41 wherein said set of data values corresponds to an image, wherein the step of executing each said programmatic entity produces a result approximating the image, and wherein the process further comprises the step of designating the programmatic entity that represents the image as having a relatively high associated fitness over each said programmatic entity having a relatively low associated fitness, such that said process performs image encoding.

44. The process defined in claim 42 or claim 43 wherein each of said set of data values is a data structure, such that each data structure represents a plurality of components, and further wherein the step of designating that program having a relatively high associated fitness selects based on the quality of the approximation to the data values produced by said selected programmatic entity.

45. The process defined in claim 41 wherein each of said set of data values is a data structure, such that each data structure represents a plurality of components, and further wherein a programmatic entity having a relatively high associated fitness is selected based on the quality of the approximation to the data values produced by said selected programmatic entity.

46. The process defined in claim 41 further comprising the step of designating an individual programmatic entity in said population attaining a pre-established value of fitness with respect to encoding said data as an encoding that represents said data, said process including the step of translating said programmatic entity representing an encoding of said data into an executable form while maintaining the logical consistency of said programmatic entity representing said encoding of said data.

47. The process defined in claim 41 wherein said step of executing executes more than one programmatic entity simultaneously.

48. The process defined in claim 41 wherein said executing step is performed simultaneously for more than one element of said set of data for at least one programmatic entity.

49. The process defined in claim 41 wherein said iterating a series of steps is performed simultaneously for more than one programmatic entity.

50. A computing system for automatically encoding a set of data values into a procedure for at least approximating said set of data values comprising a processor and a memory means coupled to said processor for storing a population of programmatic entities of various sizes and shapes, wherein each programmatic entity is a hierarchical arrangement of actions and material appropriate to the domain of data values, said computing system further comprising:

means for executing each said programmatic entity to produce a result by performing said hierarchical arrangement of functions, said means for executing coupled to said memory means;

means for selecting at least one programmatic entity from said population using selection criteria, said selection criteria based on a fitness associated with each said programmatic entity, said selection criteria preferring each said programmatic entity having a relatively high associated fitness over each said programmatic entity having a relatively low associated fitness, said means for selecting coupled to said memory means;

means for choosing and performing an operation wherein each chosen operation is one of the operations of crossover or reproduction, said means for choosing and performing coupled to said memory means;

means for creating at least one new programmatic entity by crossover using a group of programmatic entities if said chosen operation is crossover, said group of programmatic entities comprising said selected programmatic entity and at least another programmatic entity, such that any new programmatic entity created by crossover comprises at least a portion of said selected programmatic entity and at least a portion of said at least another programmatic entity, said new programmatic entity differing in size and shape from said selected programmatic entity and said at least another programmatic entity when said at least a portion of said selected program and said at least a portion of said at least another program differ in size and shape, said means for creating coupled to said memory means;

means for retaining said selected programmatic entity such that said selected programmatic entity remain unchanged if said chosen operation is reproduction, said means for retaining coupled to said memory means;

means for adding said new programmatic entity to said population, said means for adding coupled to said memory means, wherein said computing system generates a computer program representing said data, such that said data is encoded.

51. In a computing system having at least one processor and at least one memory, a computer implemented process for solving a problem using a population of named programmatic entities of various sizes and shapes, wherein each programmatic entity has a hierarchical arrangement of actions and material, at least one programmatic entity containing at least one reference to itself by use of said name, said process comprising iterations of a series of steps, each iteration comprising the steps:

executing each said programmatic entity to produce a result, wherein at least one of the programmatic entities invokes itself recursively;

selecting at least one programmatic entity from said population using selection criteria, said selection criteria based on a fitness associated with each said programmatic entity, said selection criteria preferring each said programmatic entity having a relatively high associated fitness over each said programmatic entity having a relatively low associated fitness;

choosing and performing an operation wherein each chosen operation is one of the operations of crossover or reproduction;

creating at least one new programmatic entity by crossover using a group of programmatic entities if said chosen operation is crossover, said group of programmatic entities comprising said selected programmatic entity and at least another programmatic entity, wherein a portion of the selected programmatic entity and a portion of said at least another programmatic entity are designated, such that the new programmatic entity created by crossover comprises said portion of said selected programmatic entity other than said designated portion and said designated portion of said at least another programmatic entity, said new programmatic entity differing in size and shape from said selected programmatic entity and said at least another programmatic entity when the designated portion of said selected programmatic entity and said designated portion of said at least another programmatic entity differ in size and shape;

retaining said selected programmatic entity such that said selected programmatic entity remains unchanged if said chosen operation is reproduction;

adding said new programmatic entity to said population.

52. The process defined in claim 51 wherein the step of executing includes executing more than one programmatic entity is activated simultaneously.

53. The process defined in claim 51 wherein said iterating a series of steps is performed simultaneously for more than one programmatic entity.

54. A computing system for solving a problem comprising at least one processor and at least one memory means coupled to said at least one processor for storing a population of named programmatic entities of various sizes and shapes, wherein each programmatic entity has a hierarchical arrangement of actions and material, said programmatic entity containing at least one reference to itself by use of a name, said computing system comprising:

means for executing each said programmatic entity to produce a result by performing said hierarchical arrangement of functions, wherein at least one programmatic entity invokes itself recursively, said means for executing coupled to said memory means;

means for selecting at least one programmatic entity from said population using selection criteria, said selection criteria based on a fitness associated with each said programmatic entity, said selection criteria preferring each said programmatic entity having a relatively high associated fitness over each said programmatic entity having a relatively low associated fitness, said means for selecting coupled to said memory means;

means for choosing and performing an operation wherein each chosen operation is one of the operations of crossover or reproduction, said means for choosing and performing coupled to said memory means;

means for creating at least one new programmatic entity by crossover using a group of programmatic entities if said chosen operation is crossover, said group of programmatic entities comprising said selected programmatic entity and at least another programmatic entity, wherein a portion of the selected programmatic entity and a portion of said at least another programmatic entity are designated, such that the new programmatic entity created by crossover comprises said portion of said selected programmatic entity other than said designated portion and said designated portion of said at least another programmatic entity, said new programmatic entity differing in size and shape from said selected programmatic entity and said at least another programmatic entity when the designated portion of said selected programmatic entity and said designated portion of said at least another programmatic entity differ in size and shape;

means for retaining said selected programmatic entity such that said selected programmatic entity remains unchanged if said chosen operation is reproduction, said means for retaining coupled to said memory means;

means for adding said new programmatic entity to said population, said means for adding coupled to said memory means, wherein said computing system generates a computer program representing said data, such that said data is encoded.

55. In a computing system, a computer implemented process for solving an original problem comprising the stages of:

(a) decomposing said original problem into at least one subproblem;
(b) finding at least one solution to said at least one subproblem; and
(c) assembling said at least one solution to said at least one subproblem into a solution to said original problem;

wherein stages (a)–(c) are implemented using a series of steps including creating a population of programmatic entities having sub-entities, wherein at least one of said sub-entities is externally invocable and at least one of said programmatic entities in the population has at least one internally invocable sub-entity, said at least one externally invocable sub-entity including at least one invocation of internally invocable sub-entities; and evolving said population, including the step of executing the programmatic entities, wherein said at least one externally invocable sub-entity performing said at least one invocation of at least one of said internally invocable sub-entities to produce results and, wherein said step of evolving further includes the step of generating at least one new programmatic entity in response to the results, such that at least one of the programmatic entities in said population is designated a solution to the problem.

56. The process defined in claim 55 wherein said at least one externally invocable sub-entity includes at least one action.

57. The process defined in claim 55 wherein said at least one externally invocable sub-entity includes material.

58. The process defined in claim 57 wherein material comprises material provided to said at least one externally invocable sub-entity.

59. The process defined in claim 57 wherein material comprises material provided to said at least one internally invocable sub-entity.

60. The process defined in claim 55 wherein said at least one internally invocable sub-entity includes material.

61. The process defined in claim 55 wherein said at least one internally invocable sub-entity includes at least one action.

* * * * *